(12) United States Patent
Sasaki et al.

(10) Patent No.: US 10,141,557 B2
(45) Date of Patent: Nov. 27, 2018

(54) ADHESIVE FOR LITHIUM ION SECONDARY BATTERIES, SEPARATOR FOR LITHIUM ION SECONDARY BATTERIES, AND LITHIUM ION SECONDARY BATTERY

(71) Applicant: ZEON CORPORATION, Tokyo (JP)

(72) Inventors: Tomokazu Sasaki, Tokyo (JP); Junnosuke Akiike, Tokyo (JP); Yasuhiro Wakizaka, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 419 days.

(21) Appl. No.: 14/900,741

(22) PCT Filed: Jun. 27, 2014

(86) PCT No.: PCT/JP2014/067200
§ 371 (c)(1),
(2) Date: Dec. 22, 2015

(87) PCT Pub. No.: WO2015/005145
PCT Pub. Date: Jan. 15, 2015

(65) Prior Publication Data
US 2016/0141581 A1    May 19, 2016

(30) Foreign Application Priority Data

Jul. 10, 2013   (JP) .................................. 2013-144859
Aug. 16, 2013   (JP) .................................. 2013-169194
Nov. 28, 2013   (JP) .................................. 2013-246477

(51) Int. Cl.
*H01M 2/16*       (2006.01)
*H01M 10/0525*    (2010.01)

(52) U.S. Cl.
CPC .......... *H01M 2/1686* (2013.01); *H01M 2/16* (2013.01); *H01M 2/168* (2013.01); *H01M 10/0525* (2013.01)

(58) Field of Classification Search
None
See application file for complete search history.

(56) References Cited

U.S. PATENT DOCUMENTS 8,211,574 B2   7/2012  Suzuki et al.
8,852,788 B2   10/2014 Wakizaka et al.
(Continued)

FOREIGN PATENT DOCUMENTS

CN   18844327 A    12/2006
JP   H11-149929 A   6/1999
(Continued)

OTHER PUBLICATIONS

International Search Report—PCT/JP2014/067200 dated Aug. 12, 2014.
(Continued)

*Primary Examiner* — Jonathan Crepeau
(74) *Attorney, Agent, or Firm* — Studebaker & Brackett PC

(57) ABSTRACT

An adhesive for a lithium ion secondary battery, for bonding members for constituting a lithium ion secondary battery, the adhesive including a particulate polymer, wherein the particulate polymer has a core-shell structure including a core portion and a shell portion that partially covers an outer surface of the core portion, the core portion is formed from a polymer having a swelling degree in an electrolytic solution of 5 times or more and 30 times or less, and the shell portion is formed from a polymer having a swelling degree in an electrolytic solution of more than 1 time and 4 times or less.

9 Claims, 1 Drawing Sheet

(56) References Cited

U.S. PATENT DOCUMENTS

| | | |
|---|---|---|
| 2009/0239147 A1 | 9/2009 | Itou et al. |
| 2010/0173196 A1 | 7/2010 | Itou et al. |
| 2014/0248537 A1 | 9/2014 | Hayashi et al. |
| 2015/0333310 A1 | 11/2015 | Choi et al. |

FOREIGN PATENT DOCUMENTS

| | | |
|---|---|---|
| JP | 2002-050405 A | 2/2002 |
| JP | 2005-011822 A | 1/2005 |
| JP | 2006-092847 A | 4/2006 |
| JP | 2007-059271 A | 3/2007 |
| JP | 2010-146871 A | 7/2010 |
| JP | 2010-219335 A | 9/2010 |
| JP | 2012-104406 A | 5/2012 |
| JP | 2013-012357 A | 1/2013 |
| WO | 2005/029614 A1 | 3/2005 |
| WO | 2007/088979 A1 | 8/2007 |
| WO | 2011/001848 A1 | 1/2011 |
| WO | 2011/040474 A1 | 4/2011 |
| WO | 2011/068215 A1 | 6/2011 |
| WO | 2013/042720 A1 | 3/2013 |
| WO | 2013/080946 A1 | 6/2013 |

OTHER PUBLICATIONS

Translation of the Written Opinion of the International Searching Authority; PCT/JP2014/067200; dated Aug. 12, 2014.
Submission of publication or the like in corresponding Japanese Patent Application No. 2015-526260 (dated Jun. 19, 2018) with the brief description of relevancy thereof.

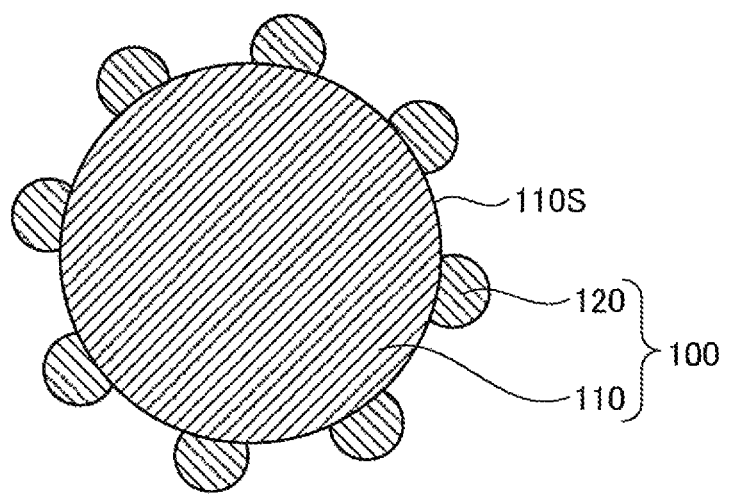

ADHESIVE FOR LITHIUM ION SECONDARY BATTERIES, SEPARATOR FOR LITHIUM ION SECONDARY BATTERIES, AND LITHIUM ION SECONDARY BATTERY

FIELD

The present invention relates to an adhesive for a lithium ion secondary battery, and a separator for a lithium ion secondary battery and a lithium ion secondary battery using the same.

BACKGROUND

In recent years, mobile terminals such as notebook computers, cellular phones, and personal digital assistants (PDAs) are increasingly widespread. As secondary batteries used as a power source for these mobile terminals, lithium ion secondary batteries are frequently used.

In the lithium ion secondary battery, a separator is generally provided to prevent short circuit between a positive electrode and a negative electrode. This separator may be provided with a porous membrane on a separator substrate, if necessary. As an example of such a porous membrane, there has been known a membrane including non-conductive particles such as alumina, and a binder that binds the non-conductive particles (See Patent Literature 1).

In addition, techniques in Patent Literatures 2 to 7 have also been known.

CITATION LIST

Patent Literature

Patent Literature 1: International Publication No. WO2011/040474
Patent Literature 2: International Publication No. WO2005/029614
Patent Literature 3: International Publication No. WO2011/068215
Patent Literature 4: Japanese Patent Application Laid-Open No. 2005-11822 A
Patent Literature 5: Japanese Patent Application Laid-Open No. 2012-104406 A
Patent Literature 6: Japanese Patent Application Laid-Open No. 2013-012357 A
Patent Literature 7: International Publication No. WO2007/088979

SUMMARY

Technical Problem

In a conventional lithium ion secondary battery having a separator, the adhesion property between the separator and an electrode in an electrolytic solution tends to decrease, and the battery thus has problems of low-temperature output property.

The present invention has been made in view of the aforementioned problems. It is an object of the present invention to provide an adhesive for a lithium ion secondary battery that makes it possible to achieve a lithium ion secondary battery having excellent adhesion property in an electrolytic solution and excellent low-temperature output property; a separator for a lithium ion secondary battery that makes it possible to achieve a lithium ion secondary battery having excellent adhesion property to an electrode in the electrolytic solution and excellent low-temperature output property; and a lithium ion secondary battery having excellent low-temperature output property.

Solution to Problem

The present inventor has intensively studied to solve the aforementioned problems. As a result, the inventor has found out that the use of an adhesive that is formed from a polymer capable of swelling at a specific swelling degree in an electrolytic solution and contains a particulate polymer having a core-shell structure including a core portion and a shell portion that partially covers the outer surface of the core portion can achieve a lithium ion secondary battery having excellent adhesion property in the electrolytic solution and excellent low-temperature output property. The present invention has thus been accomplished.

Accordingly, the present invention is as follows.

(1) An adhesive for a lithium ion secondary battery, for bonding members for constituting a lithium ion secondary battery,
  the adhesive comprising a particulate polymer, wherein
  the particulate polymer has a core-shell structure including a core portion and a shell portion that partially covers an outer surface of the core portion,
  the core portion is formed from a polymer having a swelling degree in an electrolytic solution of 5 times or more and 30 times or less, and
  the shell portion is formed from a polymer having a swelling degree in an electrolytic solution of more than 1 time and 4 times or less.

(2) The adhesive for a lithium ion secondary battery according to (1), wherein
  the polymer of the core portion has a glass transition temperature of 0° C. or higher and 150° C. or lower, and
  the polymer of the shell portion has a glass transition temperature of 50° C. or higher and 200° C. or lower.

(3) The adhesive for a lithium ion secondary battery according to (1) or (2), wherein the shell portion includes particles of the polymer having a swelling degree in the electrolytic solution of more than 1 time and 4 times or less.

(4) The adhesive for a lithium ion secondary battery according to any one of (1) to (3), further comprising non-conductive fibers, wherein
  the non-conductive fibers have a fiber diameter of 0.01 μm or more and 1 μm or less.

(5) The adhesive for a lithium ion secondary battery according to any one of (1) to (4), wherein the adhesive is for bonding a separator and an electrode together.

(6) A separator for a lithium ion secondary battery, comprising a separator substrate and an adhesive layer, wherein
  the adhesive layer includes a particulate polymer,
  the particulate polymer has a core-shell structure including a core portion and a shell portion that partially covers an outer surface of the core portion,
  the core portion is formed from a polymer having a swelling degree in an electrolytic solution of 5 times or more and 30 times or less, and
  the shell portion is formed from a polymer having a swelling degree in an electrolytic solution of more than 1 time and 4 times or less.

(7) The separator for a lithium ion secondary battery according to (6), further comprising a porous membrane provided on a surface of the separator substrate, wherein
  the porous membrane has a surface on which the adhesive layer is provided.

(8)n The separator for a lithium ion secondary battery according to (6) or (7), wherein the adhesive layer further includes non-conductive fibers, and the non-conductive fibers have a fiber diameter of 0.01 μm or more and 1 μm or less.

(9) A lithium ion secondary battery comprising a positive electrode, a negative electrode, an electrolytic solution, and a separator, wherein the separator is the separator for a lithium ion secondary battery according to any one of (6) to (8).

Advantageous Effects of Invention

The adhesive for a lithium ion secondary battery of the present invention makes it possible to achieve a lithium ion secondary battery having excellent adhesion property in an electrolytic solution and excellent low-temperature output property.

The separator for a lithium ion secondary battery of the present invention makes it possible to achieve the lithium ion secondary battery having excellent adhesion property in the electrolytic solution and excellent low-temperature output property.

The lithium ion secondary battery of the present invention has excellent low-temperature output property.

BRIEF DESCRIPTION OF DRAWINGS

FIG. 1 is a cross-sectional view schematically illustrating an example of a particulate polymer.

DESCRIPTION OF EMBODIMENTS

The present invention will be described hereinbelow in detail by referring to embodiments and examples. However, the present invention is not limited to the following embodiments and examples, which can be optionally modified without departing from the scope of claims equivalents thereto.

In the following description, (meth)acrylic acid includes acrylic acid and methacrylic acid. Also, (meth)acrylate includes acrylate and methacrylate. Furthermore, (meth) acrylonitrile includes acrylonitrile and methacrylonitrile. Also, (meth)acrylamide includes acrylamide and methacrylamide.

Furthermore, that a substance is water-soluble means that, when 0.5 g of the substance is dissolved in 100 g of water at 25° C., insoluble matter is not less than 0% by weight and less than 1.0% by weight". Also, that a substance is water-insoluble means that, when 0.5 g of the substance is dissolved in 100 g of water at 25° C., insoluble matter is 90% by weight or more and 100% by weight or less.

In a polymer produced by copolymerizing a plurality of types of monomers, the ratio of a structural unit formed by polymerizing a certain monomer relative to the polymer is, unless otherwise stated, usually equal to the ratio (charge ratio) of the certain monomer relative to total monomers used for the polymerization of the polymer.

A "monomer composition" refers to not only a composition containing two or more types of monomers but also one type of monomer.

[1. Adhesive for Lithium Ion Secondary Battery]

The adhesive for a lithium ion secondary battery of the present invention (this may be referred to hereinbelow as "adhesive" as appropriate) is an adhesive for bonding members for constituting the lithium ion secondary battery, and contains a particulate polymer.

[1.1. Particulate Polymer]

FIG. 1 is a cross-sectional view schematically illustrating an example of the particulate polymer. As shown in FIG. 1, a particulate polymer 100 has a core-shell structure including a core portion 110 and a shell portion 120. The core portion 110 is a portion that is inside the shell portion 120 in the particulate polymer 100. The shell portion 120 is a portion that covers an outer surface 110S of the core portion 100, and is usually an outermost portion in the particulate polymer 100. However, the shell portion 120 does not cover the entire outer surface 110S of the core portion 110, but partially covers the outer surface 110S of the core portion 110.

In the particulate polymer, the core portion and the shell portion are each formed from a polymer having a specific swelling degree in an electrolytic solution. The adhesive layer produced using the adhesive containing this particulate polymer has excellent adhesion property between the members for constituting the battery, such as a separator for a lithium ion secondary battery (this may be referred to hereinbelow as "separator" as appropriate) and an electrode, in the electrolytic solution. When the separator and the electrode in a lithium ion secondary battery having a separator are bonded using the adhesive of the present invention, low-temperature output property of the lithium ion secondary battery can be improved. In addition thereto, high-temperature cycle property of the lithium ion secondary battery can be usually improved. A separator may be stored and transported in a wound shape. Even when the separator having an adhesive layer formed using the adhesive of the present invention on the outermost surface is wound, blocking is unlikely to occur, and handlingability is excellent. The reason why such excellent effects are obtained is not necessarily clear, but the investigation of the present inventor leads to the following inferences. However, the present invention is not limited to the following inferred reasons.

i. Adhesion Property:

The polymer constituting the shell portion of the particulate polymer swells in the electrolytic solution. At that time, for example, a functional group in the swelled polymer of the shell portion is activated, and chemically or electrically interacts with a functional group on a surface of the members for constituting the battery (for example, separator and electrode). This interaction and other factors allow the shell portion to be be tightly bonded to the members for constituting the battery. That is inferred to be the reason why the adhesive containing the particulate polymer allows the members for constituting the battery to be tightly bonded to each other in the electrolytic solution. Because of these reasons, it is inferred that, when the adhesive layer containing the particulate polymer according to the present invention is provided between the separator and the electrode, the adhesive layer allows the separator and the electrode to be tightly bonded in the electrolytic solution.

ii. Low-Temperature Output Property:

In the lithium ion secondary battery, the separator is generally provided between a positive electrode and a negative electrode. Conventionally, when the lithium ion secondary battery is charged and discharged, an electrode active material (particularly, a negative electrode active material) expands and shrinks, and a gas is generated in the electrolytic solution. As a result, a gap may be generated between the separator and the electrode.

Such a phenomenon increases a distance between the positive electrode and the negative electrode, to increase the internal resistance of the battery or make a reaction field of lithium ions with the electrode active material uneven. Accordingly, the low-temperature output property may be deteriorated.

On the other hand, the adhesive layer formed using the adhesive according to the present invention exhibits high adhesion property to the separator and the electrode in a state where the shell portion of the particulate polymer swells in the electrolytic solution, as described above. Therefore, even when charging and discharging are performed, the gap is unlikely to be generated between the separator and the electrode.

This leads to low tendency of widening of the distance between the positive electrode and the negative electrode. Thus, the internal resistance of the battery can be decreased, and the reaction field of lithium ions with the electrode active material is unlikely to be made uneven.

Further, the polymer of the core portion of the particulate polymer largely swells in the electrolytic solution. In a state where the polymer largely swells in the electrolytic solution, a gap between molecules of the polymer increases, and ions easily pass through the gap between the molecules. The polymer of the core portion of the particulate polymer is not entirely covered with the shell portion. For this reason, ions easily pass through the core portion in the electrolytic solution. Therefore, the particulate polymer can exhibit high ion diffusivity. Accordingly, an increase in resistance due to the adhesive layer can be suppressed.

It is inferred that by a combination of these factors, the low-temperature output property of the lithium ion secondary battery having the adhesive layer formed using the adhesive according to the present invention can be improved.

iii. High-Temperature Cycle Property:

When the lithium ion secondary battery is repeatedly charged and discharged, a gas may be generated by, for example, decomposition of the electrolytic solution and an additive. Further, as described above, when the lithium ion secondary battery is charged and discharged, the electrode active material may expand and shrink. Therefore, when the lithium ion secondary battery is repeatedly charged and discharged, a gap is generated between the separator and the electrode. That gradually widens the distance between the positive electrode and the negative electrode, and may cause decrease in battery capacity.

On the other hand, since the adhesive layer formed using the adhesive according to the present invention contains the particulate polymer, the adhesive layer has excellent adhesion property between the separator and the electrode in the electrolytic solution, as described above. Therefore, with the lithium ion secondary battery having the adhesive layer, even when charging and discharging are repeated, the gap is unlikely to be generated between the separator and the electrode, and the battery capacity is unlikely to decrease. That is inferred to be the reason for the capability of achieving excellent high-temperature cycle property.

iv. Blocking Resistance:

In a state where the polymer of the shell portion does not swell in the electrolytic solution, the polymer does not usually have the adhesion property. When the polymer swells in the electrolytic solution, the adhesion property is exhibited. Therefore, in a state where the particulate polymer does not swell in the electrolytic solution, the particulate polymer does not usually exhibit adhesion property. Therefore, in a state where the adhesive layer containing the particulate polymer does not swell in the electrolytic solution, the adhesive layer does not usually exhibit high adhesion property. That is inferred to be the reason why the separator including the adhesive layer is unlikely to cause blocking even when stacked. Even in a state where the particulate polymer does not swell in the electrolytic solution, the adhesion property may be exhibited by heating at a temperature equal to or higher than a certain temperature (for example, 60° C. or higher).

[1.1.1. Core Portion]

The core portion is formed from the polymer having a specific swelling degree in the electrolytic solution. Specifically, the swelling degree of the polymer of the core portion in the electrolytic solution is usually 5 times or more, preferably 6 times or more, and more preferably 7 times or more, and is usually 30 times or less, preferably 25 times or less, and more preferably 20 times or less. When the swelling degree of the polymer of the core portion falls within the aforementioned range, ion diffusivity of the adhesive layer can be enhanced. Therefore, low-temperature output property of the lithium ion secondary battery can be improved. When the swelling degree of the polymer of the core portion is equal to or more than the lower limit of the aforementioned range, low-temperature output property can usually be improved. When it is equal to or less than the upper limit thereof, adhesion property of the adhesive layer in the electrolytic solution can be enhanced.

Herein, as an electrolytic solution used in measurement of swelling degree of the polymer of the core portion, a solution in which $LiPF_6$ as a supporting electrolyte is dissolved in a mixed solvent of ethylene carbonate, diethyl carbonate, and vinylene carbonate (volume mixing ratio of ethylene carbonate/diethyl carbonate/vinylene carbonate=68.5/30/1.5; SP value=12.7 $(cal/cm^3)^{1/2}$) at a concentration of 1 mol/L relative to the solvent is used.

The swelling degree of the polymer of the core portion may be specifically measured as follows.

Firstly a polymer of the core portion of the particulate polymer is prepared. For example, a polymer obtained by the same step as the step of producing the core portion in the method for producing the particulate polymer is prepared.

From the prepared polymer, a film is then produced. For example, when the polymer is a solid, the polymer is dried under conditions of 25° C. and 48 hours, and molded into a film shape to obtain a film with a thickness of 0.5 mm. For example, when the polymer is a solution or a dispersion liquid such as latex, the solution or dispersion liquid is placed in a polytetrafluoroethylene dish, and dried under conditions of 25° C. and 48 hours to obtain a film with a thickness of 0.5 mm.

The produced film is cut into a 1-cm square piece to obtain a sample piece. The weight of the sample piece is measured, and the weight is defined as W0.

The sample piece is immersed in the electrolytic solution at 60° C. for 72 hours, and taken out of the electrolytic solution. The electrolytic solution on the surface of the taken sample piece is wiped off, and weight W1 of the sample piece after the immersion test is measured.

The swelling degree S (times) is calculated using the weights W0 and W1 by S=W1/W0.

Examples of the method for adjusting the swelling degree of the polymer of the core portion may include appropriately selecting the type and amount of the monomer for producing the polymer of the core portion in consideration of the SP value of the electrolytic solution. In general, when the SP value of the polymer is close to the SP value of the electrolytic solution, the polymer tends to swell in the electrolytic solution. On the other hand, when the SP value of the polymer is away from the SP value of the electrolytic solution, the polymer is unlikely to swell in the electrolytic solution.

Herein, the SP value means a solubility parameter.

The SP value can be calculated by a method introduced in Hansen Solubility Parameters A User's Handbook, 2nd Ed (CRC Press).

The SP value of an organic compound can be estimated from the molecular structure of the organic compound. Specifically, the SP value can be calculated by a simulation software of calculating an SP value by formulae in SMILEs (for example, "HSPiP" (http://www.hansen-solubility.com)). By the simulation software, the SP value can be determined on the basis of a theory described in Hansen SOLUBILITY PARAMETERS A User's Handbook Second Edition. Charles M. Hansen.

As the monomer used for producing the polymer of the core portion, a monomer with which the swelling degree of the polymer falls within the aforementioned range may be used. Examples of the monomer may include vinyl chloride-based monomers such as vinyl chloride and vinylidene chloride; vinyl acetate-based monomers such as vinyl acetate; aromatic vinyl monomers such as styrene, α-methylstyrene, styrenesulfonic acid, butoxystyrene, and vinylnaphthalene; vinylamine-based monomers such as vinylamine; vinylamide-based monomers such as N-vinylformamide and N-vinylacetamide; (meth)acrylic acid derivatives such as 2-hydroxyethyl methacrylate; (meth)acrylic acid ester monomers such as methyl acrylate, ethyl acrylate, methyl methacrylate, ethyl methacrylate, and 2-ethylhexyl acrylate; (meth)acrylamide monomers such as acrylamide and methacrylamide; (meth)acrylonitrile monomers such as acrylonitrile and methacrylonitrile; fluorine-containing acrylate monomers such as 2-(perfluorohexyl)ethyl methacrylate and 2-(perfluorobutyl)ethyl acrylate; maleimide; maleimide derivatives such as phenyl maleimide; and diene-based monomers such as 1,3-butadiene and isoprene. One type of them may be solely used, and two or more types thereof may also be used in combination at any ratio.

Among the aforementioned monomers, the (meth)acrylic acid ester monomer or the (meth)acrylonitrile monomer is preferably used, and the (meth)acrylic acid ester monomers are more preferably used. A (meth)acrylic acid ester monomer unit represents a structural unit having a structure that is formed by polymerization of the (meth)acrylic acid ester monomer. A (meth)acrylonitrile monomer unit represents a structural unit having a structure that is formed by polymerization of (meth)acrylonitrile. With these monomers, swelling degree of the polymer is easily controlled. In addition, ion diffusivity of the adhesive layer can also be further enhanced.

The ratio of the total of the (meth)acrylic acid ester monomer unit and the (meth)acrylonitrile monomer unit in the polymer of the core portion is preferably 50% by weight or more, more preferably 55% by weight or more, further preferably 60% by weight or more, and particularly preferably 70% by weight or more, and is preferably 99% by weight or less, more preferably 95% by weight or less, and particularly preferably 90% by weight or less. When the ratio of the (meth)acrylic acid ester monomer unit and the (meth)acrylonitrile monomer unit falls within the aforementioned range, the swelling degree is easily controlled within the aforementioned range. Further, ion diffusivity of the adhesive layer can be enhanced. Further, low-temperature output property of the lithium ion secondary battery can be improved.

The "total of the (meth)acrylic acid ester monomer unit and the (meth)acrylonitrile monomer unit" means that it may contain only the (meth)acrylic acid ester monomer unit, only the (meth)acrylonitrile monomer unit, or a combination of the (meth)acrylic acid ester monomer unit and the (meth)acrylonitrile monomer unit.

The polymer of the core portion may contain an acid group-containing monomer unit. As an acid group-containing monomer, the acid group-containing monomer which is the same as one that may be contained in the shell portion is used. In particular, it is preferable that the acid group-containing monomer is a monomer having a carboxylic acid group, preferably a monocarboxylic acid, and more preferably (meth)acrylic acid.

As the acid group-containing monomer, one type thereof may be solely used, and two or more types thereof may also be used in combination at any ratio.

The ratio of the acid group-containing monomer unit in the polymer of the core portion is preferably 0.1% by mass or more, more preferably 1% by mass or more, and further preferably 3% by mass or more, and is preferably 20% by mass or less, more preferably 10% by mass or less, and further preferably 7% by mass or less. When the ratio of the acid group-containing monomer unit falls within the aforementioned ratio, dispersibility of the polymer of the core portion is enhanced, and the shell portion that partially covers the outer surface of the core portion is easily formed on the outer surface of the polymer of the core portion.

It is preferable that the polymer of the core portion contains a crosslinkable monomer unit. The crosslinkable monomer unit is a structural unit having a structure that is formed by polymerization of a crosslinkable monomer. The crosslinkable monomer is a monomer in which a crosslinking structure may be formed during or after polymerization by heating or irradiation with energy rays. When the polymer contains the crosslinkable monomer unit, swelling degree of the polymer is easily allowed to fall within the aforementioned range.

Examples of the crosslinkable monomer may include a multifunctional monomer having two or more polymerization reactive groups in the molecule. Examples of the multifunctional monomer may include divinyl compounds such as divinylbenzene; di(meth)acrylic acid ester compounds such as ethylene dimethacrylate, diethylene glycol dimethacrylate, ethylene glycol dimethacrylate, diethylene glycol diacrylate, and 1,3-butylene glycol diacrylate; tri(meth)acrylic acid ester compounds such as trimethylolpropane trimethacrylate and trimethylolpropane triacrylate; and ethylenically unsaturated monomers having an epoxy group such as allyl glycidyl ether and glycidyl methacrylate. Among them, the dimethacrylic acid ester compound and the ethylenically unsaturated monomer having an epoxy group are preferable, and the dimethacrylic acid ester compound is more preferable for easy control of the swelling degree of the polymer of the core portion. One type of them may be solely used, and two or more types thereof may also be used in combination at any ratio.

In general, when the ratio of the crosslinkable monomer unit in the polymer is increased, the swelling degree of the polymer in the electrolytic solution tends to decrease. It is therefore preferable that the ratio of the crosslinkable monomer unit is determined with consideration of the type and amount of the monomer to be used. Specifically, the ratio of the crosslinkable monomer unit in the polymer of the core portion is preferably 0.1% by weight or more, more preferably 0.2% by weight or more, and particularly preferably 0.5% by weight or more, and is preferably 5% by weight or less, more preferably 4% by weight or less, and particularly preferably 3% by weight or less. When the ratio of the crosslinkable monomer unit is equal to or more than the lower limit of the aforementioned range, adhesion property of the adhesive layer can be enhanced. When it is equal to or less than the upper limit thereof, lifetime of the secondary battery can be extended.

The glass transition temperature of the polymer of the core portion is preferably 0° C. or higher, more preferably 10° C. or higher, further preferably 20° C. or higher, even more preferably 30° C. or higher, and particularly preferably 60° C. or higher, and is preferably 150° C. or lower, more preferably 130° C. or lower, further preferably 110° C. or lower, even more preferably 100° C. or lower, particularly preferably 90° C. or lower, and very particularly preferably 80° C. or lower. When the glass transition temperature of the polymer of the core portion is equal to or more than the lower limit of the aforementioned range, adhesion property of the adhesive layer in the electrolytic solution can be enhanced. When it is equal to or less than the upper limit thereof, lifetime of the lithium ion secondary battery can be extended. When the glass transition temperature of the polymer of the core portion falls within the aforementioned range, low-temperature output property of the lithium ion secondary battery can be usually improved. Herein, the glass transition temperature may be measured in accordance with JIS K7121.

The diameter of the core portion relative to a volume average particle diameter of the particulate polymer being 100% is preferably 50% or more, more preferably 60% or more, further preferably 70% or more, and particularly preferably 80% or more, and is preferably 99% or less, more preferably 98.5% or less, and particularly preferably 98% or less. When the diameter of the core portion is equal to or more than the lower limit of the aforementioned range, ion conductivity can be enhanced. When it is equal to or less than the upper limit thereof, adhesion property of the adhesive layer can be enhanced.

The diameter of the core portion may be measured as the volume average particle diameter of the particulate polymer before formation of the shell portion obtained during a process of producing the particulate polymer. The particulate polymer before formation of the shell portion is the particulate polymer constituting the core portion. The volume average particle diameter represents a particle diameter at which a cumulative volume calculated from a small-diameter side in a particle diameter distribution measured by a laser diffraction method reaches 50%.

[1.1.2. Shell Portion]

The shell portion is formed from the polymer having a specific swelling degree in the electrolytic solution that is smaller than the swelling degree of the core portion. Specifically, the swelling degree of the polymer of the shell portion in the electrolytic solution is usually more than 1 time, preferably 1.05 times or more, more preferably 1.1 times or more, and further preferably 1.2 times or more, and is usually 4 times or less, preferably 3.5 times or less, and more preferably 3 times or less. When the swelling degree of the polymer of the shell portion falls within the aforementioned range, adhesion property of the adhesive layer in the electrolytic solution can be enhanced. Therefore, internal resistance of the lithium ion secondary battery can be decreased. Accordingly, the battery properties can be favorably maintained. When the swelling degree of the polymer of the shell portion is equal to or more than the lower limit of the aforementioned range, low-temperature output property of the lithium ion secondary battery can be usually improved. When it is equal to or less than the upper limit thereof, adhesion property of the adhesive layer can be usually enhanced.

As the electrolytic solution used for measuring the swelling degree of the polymer of the shell portion, the same electrolytic solution as one used in measurement of the swelling degree of the polymer of the core portion is used.

The swelling degree of the polymer of the shell portion may be specifically measured as follows.

Firstly a polymer of the shell portion of the particulate polymer is prepared. For example, the polymer is produced in the same manner as in the method for producing the core portion except that a monomer composition used in production of the shell portion is used in place of the monomer composition used in production of the core portion in the method for producing the particulate polymer.

After that, a film is produced from the polymer of the shell portion, a sample piece is obtained from the film, and the swelling degree S is measured by the same method as the method for measuring the swelling degree of the polymer of the core portion.

Examples of the method for adjusting the swelling degree of the polymer of the shell portion may include appropriately selecting the type and amount of the monomer for producing the polymer of the shell portion in consideration of the SP value of the electrolytic solution.

As the monomer used for producing the polymer of the shell portion, a monomer with which the swelling degree of the polymer falls within the aforementioned range may be used. Examples of such a monomer may include those exemplified by examples of the monomer used for producing the polymer of the core portion. As such a monomer, one type thereof may be solely used, and two or more types thereof may also be used in combination at any ratio.

Among the monomers, an aromatic vinyl monomer is preferable. That is, it is preferable that the polymer of the shell portion contains an aromatic vinyl monomer unit. The aromatic vinyl monomer unit herein represents a structural unit having a structure that is formed by polymerization of an aromatic vinyl monomer. Of the aromatic vinyl monomer, styrene and a styrene derivative such as styrenesulfonic acid are more preferable. When the aromatic vinyl monomer is used, swelling degree of the polymer is easily controlled. In addition, adhesion property of the adhesive layer can be further enhanced.

The ratio of the aromatic vinyl monomer unit in the polymer of the shell portion is preferably 20% by weight or more, more preferably 40% by weight or more, further preferably 50% by weight or more, even more preferably 60% by weight or more, and particularly preferably 80% by weight or more, and is preferably 100% by weight or less, more preferably 99.5% by weight or less, and further preferably 99% by weight or less. When the ratio of the aromatic vinyl monomer unit falls within the aforementioned range, swelling degree is easily controlled within the aforementioned range. In addition, adhesion force of the adhesive layer in the electrolytic solution can be further enhanced.

The polymer of the shell portion may contain an acid group-containing monomer unit. The acid group-containing monomer unit is a structural unit having a structure that is formed by polymerization of a monomer having an acid group. Examples of the acid group-containing monomer may include a monomer having a carboxylic acid group, a monomer having a sulfonic acid group, a monomer having a phosphoric acid group, and a monomer having a hydroxyl group.

Examples of the monomer having a carboxylic acid group may include a monocarboxylic acid and a dicarboxylic acid. Examples of the monocarboxylic acid may include acrylic acid, methacrylic acid, and crotonic acid. Examples of the dicarboxylic acid may include maleic acid, fumaric acid, and itaconic acid.

Examples of the monomer having a sulfonic acid group may include vinylsulfonic acid, methylvinylsulfonic acid, (meth)allylsulfonic acid, ethyl(meth)acrylate-2-sulfonate, 2-acrylamide-2-methylpropanesulfonic acid, and 3-allyloxy-2-hydroxypropanesulfonic acid.

Examples of the monomer having a phosphoric acid group may include 2-(meth)acryloyloxyethyl phosphate, methyl-2-(meth)acryloyloxyethyl phosphate, and ethyl-(meth)acryloyloxyethyl phosphate.

Examples of the monomer having a hydroxyl group may include 2-hydroxyethyl acrylate, 2-hydroxypropyl acrylate, 2-hydroxyethyl methacrylate, and 2-hydroxypropyl methacrylate.

Among them, the monomer having a carboxylic acid group is preferable, a monocarboxylic acid is further preferable, and (meth)acrylic acid is particularly preferable.

As the acid group-containing monomer, one type thereof may be solely used, and two or more types thereof may also be used in combination at any ratio.

The ratio of the acid group-containing monomer unit in the polymer of the shell portion is preferably 0.1% by weight or more, more preferably 1% by weight or more, and further preferably 3% by weight or more, and is preferably 20% by weight or less, more preferably 10% by weight or less, and further preferably 7% by weight or less. When the ratio of the acid group-containing monomer unit falls within the aforementioned range, dispersibility of the particulate polymer in the adhesive can be improved, and favorable adhesion property over the entire surface of the adhesive layer can be exhibited.

The polymer of the shell portion may contain a crosslinkable monomer unit. Examples of the crosslinkable monomer may include those exemplified as the examples of the crosslinkable monomer used for the polymer of the core portion. As the crosslinkable monomer, one type thereof may be solely used, and two or more types thereof may also be used in combination at any ratio.

The ratio of the crosslinkable monomer unit in the polymer of the shell portion is preferably 0.1% by weight or more, more preferably 0.2% by weight or more, and particularly preferably 0.5% by weight or more, and is preferably 5% by weight or less, more preferably 4% by weight or less, and particularly preferably 3% by weight or less.

The glass transition temperature of the polymer of the shell portion is preferably 50° C. or higher, more preferably 60° C. or higher, and particularly preferably 70° C. or higher, and is preferably 200° C. or lower, more preferably 180° C. or lower, further preferably 150° C. or lower, and particularly preferably 120° C. or lower. When the glass transition temperature of the polymer of the shell portion is equal to or higher than the lower limit of the aforementioned range, blocking of the separator of the present invention having the adhesive layer can be suppressed, and low-temperature output property of the lithium ion secondary battery can be further improved. When it is equal to or lower than the upper limit thereof, adhesion property of the adhesive layer in the electrolytic solution can be further enhanced. When the glass transition temperature of the polymer of the shell portion falls within the aforementioned range, cycle property of the lithium ion secondary battery can be usually improved.

The shell portion partially covers the outer surface of the core portion. That is, the shell portion covers the outer surface of the core portion, but does not cover the entire outer surface of the core portion. Even when the outer surface of a core portion appears to be completely covered with the shell portion, when a pore penetrating the shell portion from the inside to the outside is formed, the shell portion is the shell portion according to the present invention that partially covers the outer surface of the core portion. Therefore, for example, a particulate polymer having a shell portion having a micropore that penetrates the shell portion from the outer surface of the shell portion (i.e., a circumferential surface of the particulate polymer) to the outer surface of the core portion is included in the scope of the particulate polymer according to the present invention.

The average ratio of the outer surface of the core portion that is covered with the shell portion is preferably 10% or more, more preferably 30% or more, further preferably 40% or more, and particularly preferably 60% or more, and is preferably 99.9% or less, more preferably 98% or less, further preferably 95% or less, even more preferably 90% or less, and particularly preferably 85% or less. When the average ratio of the outer surface of the core portion that is covered with the shell portion falls within the aforementioned range, ion diffusivity and adhesion property of the adhesive layer can be well balanced.

The average ratio of the outer surface of the core portion that is covered with the shell portion may be measured from a result of observation of the cross-sectional structure of the particulate polymer. Specifically, the measurement was performed by the following method.

First, the particulate polymer is sufficiently dispersed in a normal temperature-setting epoxy resin, and embedded to produce a block piece containing the particulate polymer. The block piece is cut into a thin section with a thickness of 80 nm to 200 nm by a microtome equipped with a diamond blade, to obtain a sample for measurement. If necessary, the sample for measurement is then subjected to a dyeing treatment using, for example, ruthenium tetroxide or osmium tetraoxide.

Subsequently, this sample for measurement is placed on a transmission electron microscope (TEM) and the cross-sectional structure of the particulate polymer is photographed. The magnification of the electron microscope is preferably a magnification at which the cross section of one particle of the particulate polymer is set in a visual field, and is specifically about 10,000.

In the cross-sectional structure of the photographed particulate polymer, a length D1 of circumference corresponding to the outer surface of the core portion, and a length D2 of a portion where the outer surface of the core portion is into contact with the shell portion are measured. The ratio Rc of the outer surface of the core portion that is covered with the shell portion in the particulate polymer is calculated by the following equation (1) using the measured lengths D1 and D2.

$$\text{Covering ratio } Rc\ (\%) = D2/D1 \times 100 \qquad (1)$$

Covering ratios Rc of 20 or more particles of the particulate polymer are measured, and the average thereof is calculated as the average ratio of the outer surface of the core portion that is covered with the shell portion.

The covering ratio Rc may be manually calculated from the cross-sectional structure, and may also be calculated by a commercially available image analysis software. As the commercially available image analysis software, for example, "AnalySIS Pro" (manufactured by Olympus Corporation) may be used.

It is preferable that the shell portion has an average thickness falling within a certain range relative to the volume average particle diameter of the particulate polymer. Specifically, the average thickness of the shell portion relative to the volume average particle diameter of the particulate polymer is preferably 1% or more, more preferably 2% or more, and particularly preferably 5% or more, and is preferably 30% or less, more preferably 25% or less, and particularly preferably 20% or less. When the average thickness of the shell portion is equal to or more than the lower limit of the aforementioned range, adhesion force of the adhesive layer can be further enhanced. When it is equal to or less than the upper limit thereof, low-temperature output property of the lithium ion secondary battery can be further enhanced.

The average thickness of the shell portion is determined by observing the cross-sectional structure of the particulate polymer by the transmission electron microscope (TEM). Specifically, the maximum thickness of the shell portion in the cross-sectional structure of the particulate polymer is measured. The average of maximum thicknesses of shell portions of randomly selected 20 or more particles of the particulate polymer is the average thickness of the shell portion. When the shell portion is composed of particles of the polymer and the particles constituting the shell portion form the shell portion in a single layer shape without overlap of the particles in a radial direction of the particulate polymer, the number average particle diameter of the particles constituting the shell portion is the average thickness of the shell portion.

The shape of the shell portion is not particularly limited, and it is preferable that the shell portion is composed of the particles of the polymer. When the shell portion is composed of the particles of the polymer, the particles constituting the shell portion may be overlapped in layers in the radial direction of the particulate polymer. However, it is preferable that the particles constituting the shell portion form the shell portion in a single layer shape without overlap of the particles in the radial direction of the particulate polymer.

The number average particle diameter of the particles constituting the shell portion is preferably 10 nm or more, more preferably 20 nm or more, and particularly preferably 30 nm or more, and is preferably 200 nm or less, more preferably 150 nm or less, and particularly preferably 100 nm or less. When the number average particle diameter falls within the aforementioned range, ion diffusivity and adhesion property of the adhesive layer can be well balanced.

The number average particle diameter of the particles constituting the shell portion is determined by observing the cross-sectional structure of the particulate polymer by the transmission electron microscope (TEM). Specifically, the longest diameter of the particles constituting the shell portion in the cross-sectional structure of the particulate polymer is measured. The average of longest diameter of particles constituting the shell portions of randomly selected 20 or more particles of the particulate polymer is the number average particle diameter of the particles constituting the shell portion.

[1.1.3. Optional Component]

The particulate polymer may contain an optional component in addition to the core portion and the shell portion as long as the effects of the present invention are not significantly impaired.

For example, the particulate polymer may have a portion in the core portion that is formed from a polymer different from the polymer of the core portion. Specifically, seed particles used in production of the particulate polymer by a seed polymerization method may remain inside the core portion.

However, from the viewpoint of markedly exerting the effects of the present invention, it is preferable that the particulate polymer includes only the core portion and the shell portion.

[1.1.4. Size of Particulate Polymer]

The volume average particle diameter of the particulate polymer is preferably 0.01 µm or more, more preferably 0.1 µm or more, and particularly preferably 0.3 µm or more, and is preferably 10 µm or less, more preferably 5 µm or less, and particularly preferably 1 µm or less. When the volume average particle diameter of the particulate polymer is equal to or more than the lower limit of the aforementioned range, dispersibility of the particulate polymer in the adhesive and the adhesive layer can be improved. When it is equal to or less than the upper limit thereof, adhesion force of the adhesive layer can be enhanced.

[1.1.5. Amount of Particulate Polymer]

It is preferable that the amount of the particulate polymer in the adhesive is set so that the ratio of the particulate polymer in the adhesive layer falls within a specific range. Specifically, the ratio of the particulate polymer in the adhesive layer is preferably 50% by weight or more, more preferably 60% by weight or more, further preferably 70% by weight or more, and particularly preferably 80% by weight or more, and is preferably 99.9% by weight or less, more preferably 99% by weight or less, further preferably 98% by weight or less, and particularly preferably 96% by weight or less. When the amount of the particulate polymer falls within the aforementioned range, adhesion property of the adhesive layer can be enhanced, and ion diffusivity can also be enhanced.

[1.1.6. Method for Producing Particulate Polymer]

The particulate polymer may be produced by, for example, stepwise polymerization of the monomer of the polymer of the core portion and the monomer of the polymer of the shell portion with alteration of the ratio thereof with the lapse of time. For example, the particulate polymer may be obtained by continuously performing a multi-step emulsion polymerization method or a multi-step suspension polymerization method, in which a polymer of a prior step is sequentially covered with a polymer of a later step.

One example of a case where the particulate polymer having a core-shell structure is obtained by the multi-step emulsion polymerization method will be described.

In the polymerization, as an emulsifier, for example, an anionic surfactant such as sodium dodecylbenzenesulfonate or sodium dodecylsulfate, a nonionic surfactant such as polyoxyethylene nonyl phenyl ether or sorbitan monolaurate, or a cationic surfactant such as octadecylamine acetate may be used in accordance with a conventional method. As a polymerization initiator, a peroxide such as tert-butyl peroxy-2-ethylhexanoate, potassium persulfate, or cumene peroxide, or an azo compound such as 2,2'-azobis(2-methyl-N-(2-hydroxyethyl)-propionamide) or 2,2'-azobis(2-aminodipropane)hydrochloride may be used.

In the polymerization procedure, the monomer forming the core portion and the emulsifier are first mixed in water as a solvent, and the polymerization initiator is then added to perform emulsion polymerization, to obtain a particulate polymer constituting the core portion. Then, in the presence of this particulate polymer constituting the core portion, the monomer forming the shell portion is polymerized, to obtain the particulate polymer having a core-shell structure.

From the viewpoint of effecting the partial covering of the outer surface of the core portion with the shell portion, it is preferable that the monomer of the polymer of the shell portion is supplied to a polymerization system as a plurality of divided batches or continuously. When the monomer of the polymer of the shell portion is supplied to the polymerization system as divided batches or continuously, the polymer constituting the shell portion is formed in a particle shape, and the particles are bound to the core portion. Thus, the shell portion with which the core portion is partially covered can be formed.

When the monomer of the polymer of the shell portion is supplied in divided batches, the particle diameter of particles constituting the shell portion and the average thickness of the shell portion can be controlled by the ratio of divided batches of the monomer. When the monomer of the polymer of the shell portion is supplied continuously, the particle diameter of particles constituting the shell portion and the average thickness of the shell portion can be controlled by adjusting the supplying amount of the monomer per unit time.

When a monomer having lower affinity to the solvent for polymerization is used as the monomer forming the polymer of the shell portion, the polymerization tends to form the shell portion that partially covers the core portion. When the polymerization solvent is water, it is preferable that the monomer forming the polymer of the shell portion contains a hydrophobic monomer, and particularly preferably contains an aromatic vinyl monomer.

When the amount of the emulsifier to be used is reduced, the polymerization tends to form the shell portion that partially covers the core portion. By appropriately adjusting the amount of the emulsifier, the shell portion that partially covers the core portion can be formed.

The volume average particle diameter of the particulate polymer constituting the core portion, the volume average particle diameter of the particulate polymer after formation of the shell portion, and the number average particle diameter of the particles constituting the shell portion can be adjusted within desired ranges by, for example, adjusting the amount of the emulsifier, the amounts of the monomers, and the like.

The average ratio of the outer surface of the core portion that is covered with the shell portion can be adjusted within a desired range by, for example, adjusting the amount of the emulsifier and the amount of the monomer of the polymer of the shell portion in accordance with the volume average particle diameter of the particulate polymer constituting the core portion.

[1.2. Non-Conductive Fiber]

It is preferable that the adhesive of the present invention contains non-conductive fibers in addition to the particulate polymer. When the adhesive of the present invention contains the non-conductive fibers, one or more of the following advantages can be usually obtained.

a. Swelling of the adhesive layer produced by using the adhesive of the present invention in an electrolytic solution can be suppressed.

b. Mechanical strength of an adhesive layer produced by using the adhesive of the present invention can be improved.

c. Low-temperature output property of the lithium ion secondary battery can be further improved.

d. High-temperature cycle property of the lithium ion secondary battery can be further improved.

The reason why such excellent effects are obtained is not necessarily clear, but the investigation of the present inventor leads to the following inferences. However, the present invention is not limited to the following inferred reasons.

a. Suppression of Swelling of Adhesive Layer in Electrolytic Solution:

When the adhesive contains non-conductive fibers, the adhesive layer is unlikely to be deformed by entanglement of the non-conductive fibers and entanglement of the non-conductive fibers and the particulate polymer. Therefore, even when the polymer in the adhesive layer is swelled during immersion of the adhesive layer in an electrolyte, the non-conductive fibers function to suppress the deformation of the adhesive layer. That is inferred to be the reason why the adhesive layer is unlikely to be swelled in the electrolytic solution.

b. Mechanical Strength of Adhesive Layer:

When the adhesive contains non-conductive fibers, the non-conductive fibers get entangled and the non-conductive fibers and the particulate polymer get entangled usually in the adhesive layer as described above. That is inferred to be the reason why the mechanical strength of the adhesive layer is improved.

c. Low-Temperature Output Property:

When the adhesive layer between the separator and the electrode is swelled in the electrolytic solution, internal resistance of the battery may increase to decrease low-temperature output property of the lithium ion secondary battery.

In contrast, when the adhesive contains non-conductive fibers, the adhesive layer is usually unlikely to be swelled in the electrolytic solution by an action of the non-conductive fibers. That hinders widening of the distance between the positive electrode and the negative electrode in the lithium ion secondary battery, and the internal resistance of the battery can thereby be reduced.

When the adhesive layer is unlikely to be swelled, a gap is unlikely to be generated between the separator and the electrode. Therefore, the reaction field of lithium ions with the electrode active material is unlikely to be made uneven.

When the adhesive layer contains non-conductive fibers, the diffusivity of the electrolytic solution in the adhesive layer is usually improved. In particular, when a material having high affinity to the electrolytic solution, such as cellulose, is used as the non-conductive fibers, the diffusivity of the electrolytic solution in the adhesive layer can be particularly improved.

In addition, lithium ions easily pass through the adhesive layer, the deposition of lithium in the electrolytic solution can be prevented. Therefore, an increase in resistance caused by deposited lithium can be suppressed.

It is inferred that a combination of these factors can further improve the low-temperature output property of the lithium ion secondary battery when the adhesive containing non-conductive fibers is used.

d. High-Temperature Cycle Property:

When the adhesive contains non-conductive fibers, the deposition of lithium in the electrolytic solution can be usually suppressed, as described above. Therefore, an increase in resistance caused by repeating charging and discharging is unlikely to occur. That is inferred to be the reason why excellent high-temperature cycle property can be achieved when the adhesive containing non-conductive fibers is used.

The non-conductive fibers are fibers having non-conductivity. The non-conductive fibers are not dissolved in the adhesive, and a fiber shape can be maintained. The non-conductive fibers are not dissolved in the electrolytic solution, and the fiber shape can be maintained. Such non-conductive fibers may be formed from an organic material, from an inorganic material, or from a combination of an organic material and an inorganic material. In particular, non-conductive fibers formed from an organic material are preferable since elution of metal does not occur and the organic material is readily available.

It is preferable that the material for the aforementioned non-conductive fibers is a material that has non-conductivity, and is electrochemically stable and stable in the electrolytic solution. From this viewpoint, preferable examples of the material for the non-conductive fibers may include polysaccharides such as cellulose, modified cellulose, chitin, and chitosan, and polymers such as polypropylene, polyester, polyacrylonitrile, polyaramide, polyamideimide, and polyimide. Among them, a polysaccharide is preferable, and cellulose is more preferable since the heat resistance is excellent and the diffusivity of the electrolytic solution is excellent. As the material for the non-conductive fibers, one type thereof may be solely used, and two or more types thereof may also be used in combination at any ratio. In addition to the aforementioned constituent material, the non-conductive fibers may contain an optional additive as a component, if necessary.

The fiber diameter of the non-conductive fibers is usually 0.01 µm or more, preferably 0.015 µm or more, and more preferably 0.02 µm or more, and is usually 1 µm or less, preferably 0.5 µm or less, and more preferably 0.1 µm or less. When non-conductive fibers having a fiber diameter falling within such a range are used, swelling of the adhesive layer in the electrolytic solution can be effectively suppressed. When the fiber diameter is equal to or more than the lower limit of the aforementioned range, dispersibility of the non-conductive fibers can be improved. When it is equal to or less than the upper limit thereof, internal resistance of the battery can be decreased.

The fiber diameter of the aforementioned non-conductive fibers represents the fiber thickness of the non-conductive fibers. The aforementioned fiber diameter may be measured by a scanning electron microscope (SEM). Specifically, the non-conductive fibers are photographed as a SEM photograph at a magnification of 50,000, two lines are drawn at arbitrary positions on the photograph so as to cross the photograph, the diameters of all the non-conductive fibers that intersect the lines are each measured, and the average value (n=20 or more) thereof is calculated. Thus, the fiber diameter can be determined. How to draw lines is not particularly limited as long as the number of the fibers that intersect the lines is 20 or more. When the fibers are fibers having a largest fiber diameter of more than 1 µm, the fiber diameter may be calculated from a SEM photograph of a magnification of 5,000.

The fiber length of the non-conductive fibers is preferably 50 µm or more, more preferably 60 µm or more, and particularly preferably 70 µm or more, and is preferably 1,000 µm or less, more preferably 500 µm or less, and particularly preferably 200 µm or less. When the fiber length falls within the aforementioned range, the non-conductive fibers easily get entangled and the non-conductive fibers and the particulate polymer easily get entangled. Therefore, mechanical strength of the adhesive layer can be improved, and swelling of the adhesive layer during immersion in the electrolytic solution can be suppressed, which lead to improvement in low-temperature output property and cycle property of the secondary battery. Herein, the fiber length of the non-conductive fibers represents the length per fiber of the non-conductive fibers.

The amount of the non-conductive fibers relative to 100 parts by weight of the particulate polymer is preferably 0.1 parts by weight or more, more preferably 0.2 parts by weight or more, further preferably 0.5 parts by weight or more, and particularly preferably 1 part by weight or more, and is preferably 100 parts by weight or less, more preferably 50 parts by weight or less, and further preferably 40 parts by weight or less. When the amount of the non-conductive fibers falls within the aforementioned range, mechanical strength of the adhesive layer can be enhanced. In addition, when the adhesive layer is immersed in the electrolytic solution, widening in the distance between electrode plates by swelling of the particulate polymer can be suppressed. Therefore, internal resistance of the secondary battery can be decreased, and low-temperature property and cycle property of the secondary battery can be improved.

[1.3. Binder for Adhesive Layer]

It is preferable that the adhesive of the present invention contains a binder for an adhesive layer in addition to the particulate polymer. Use of the binder for an adhesive layer allows the particulate polymers to be bonded both in a state where the polymers swell in the electrolytic solution and in a state where the polymers do not swell in the electrolytic solution. When the adhesive contains the non-conductive fibers, the binder for an adhesive layer allows the non-conductive fibers to be bonded, and allows the particulate polymer and the non-conductive fibers to be bonded. Therefore, the adhesive layer can be easily formed, and mechanical strength of the adhesive layer can be enhanced.

As the binder for an adhesive layer, a water-insoluble polymer is preferably used. In particular, thermoplastic elastomers such as a styrene-butadiene copolymer, a styrene-acrylonitrile copolymer, and a (meth)acrylic acid ester polymer are preferably used.

In particular, it is preferable that the binder for an adhesive layer is a (meth)acrylic acid ester polymer. The (meth)acrylic acid ester polymer refers to a polymer containing a (meth)acrylic acid ester monomer unit. The (meth)acrylic acid ester polymer is suitable because of its high ionic conductivity that can improve rate property of the secondary battery, and its electrochemical stability that can improve high-temperature cycle property of the battery.

Examples of the (meth)acrylic acid ester monomer corresponding to the (meth)acrylic acid ester monomer unit may include acrylic acid alkyl esters such as methyl acrylate, ethyl acrylate, n-propyl acrylate, isopropyl acrylate, n-butyl acrylate, tert-butyl acrylate, pentyl acrylate, hexyl acrylate, heptyl acrylate, octyl acrylate, 2-ethylhexyl acrylate, nonyl acrylate, decyl acrylate, lauryl acrylate, n-tetradecyl acrylate, and stearyl acrylate; and methacrylic acid alkyl esters such as methyl methacrylate, ethyl methacrylate, n-propyl methacrylate, isopropyl methacrylate, n-butyl methacrylate, tert-butyl methacrylate, pentyl methacrylate, hexyl methacrylate, heptyl methacrylate, octyl methacrylate, 2-ethylhexyl methacrylate, nonyl methacrylate, decyl methacrylate, lauryl methacrylate, n-tetradecyl methacrylate, and stearyl methacrylate. One type of them may be solely used, and two or more types thereof may also be used in combination at any ratio. Among them, n-butyl acrylate and 2-ethylhexyl acrylate are preferable in terms of excellent flexibility.

The ratio of the (meth)acrylic acid ester monomer unit in the polymer as the binder for an adhesive layer is preferably 50% by weight or more, more preferably 70% by weight or more, and particularly preferably 90% by weight or more, and is preferably 99% by weight or less, more preferably 98% by weight or less, and particularly preferably 97% by weight or less. When the ratio of the (meth)acrylic acid ester monomer unit is equal to or more than the aforementioned lower limit, flexibility of the adhesive layer can be enhanced and adhesion property of the adhesive layer can be enhanced. When the ratio of the (meth)acrylic acid ester monomer unit is equal to or less than the aforementioned upper limit, the rigidity of the adhesive layer can be enhanced, which can also enhance adhesion property of the adhesive layer.

It is preferable that the polymer as the binder for an adhesive layer contains an amide monomer unit. Herein, the amide monomer unit is a structural unit having a structure that is formed by polymerization of an amide monomer. The amide monomer is a monomer having an amido group, and includes not only an amide compound but also an imide compound.

The polymer including the amide monomer unit can capture halide ions in the electrolytic solution. Such an action can suppress decomposition of the electrolytic solution and SEI (solid electrolyte interphase) by the halide ions. Therefore, generation of gas caused by charging and discharging can be suppressed. The polymer including the amide monomer unit can capture transition metal ions in the electrolytic solution. For example, metal ions eluted from the positive electrode can be captured by the polymer including the amide monomer unit. Therefore, deposition of transition metal on the negative electrode caused by charging and discharging can be suppressed. Accordingly, a degree of decrease in the battery capacity caused by charging and discharging can be made smaller by using the polymer including the amide monomer unit as the binder for an adhesive layer, and cycle property of the lithium ion secondary battery can be improved.

The generation of gas caused by charging and discharging as described above can be suppressed by using the polymer including the amide monomer unit. Therefore, the generation of gap by the gas can be suppressed. Accordingly, low-temperature output property of the lithium ion secondary battery can be further improved.

Herein, the amount of generated gas can be evaluated by change in the volume of cell of the lithium ion secondary battery that is caused by repeated charging and discharging.

Examples of the amide monomer may include a carboxylic acid amide monomer, a sulfonic acid amide monomer, and a phosphoric acid amide monomer.

The carboxylic acid amide monomer is a monomer having an amido group bound to a carboxylic acid group. Examples of the carboxylic acid amide monomer may include unsaturated carboxylic acid amide compounds such as (meth)acrylamide, α-chloroacrylamide, N,N'-methylenebis(meth)acrylamide, N,N'-ethylenebis(meth)acrylamide, N-hydroxymethyl(meth)acrylamide, N-2-hydroxyethyl(meth)acrylamide, N-2-hydroxypropyl(meth)acrylamide, N-3-hydroxypropyl(meth)acrylamide, crotonic acid amide, maleic acid diamide, fumaric acid diamide, and diacetone acrylamide; and N-aminoalkyl derivatives of unsaturated carboxylic acid amides such as N-dimethylaminomethyl(meth)acrylamide, N-2-aminoethyl(meth)acrylamide, N-2-methylaminoethyl(meth)acrylamide, N-2-ethylaminoethyl(meth)acrylamide, N-2-dimethylaminoethyl(meth)acrylamide, N-2-diethylaminoethyl(meth)acrylamide, N-3-aminopropyl(meth)acrylamide, N-3-methylaminopropyl(meth)acrylamide, and N-3-dimethylaminopropyl(meth)acrylamide.

The sulfonic acid amide monomer is a monomer having an amido group bound to a sulfonic acid group. Examples of the sulfonic acid amide monomer may include 2-acrylamide-2-methylpropanesulfonic acid and N-tert-butylacrylamidesulfonic acid.

The phosphoric acid amide monomer is a monomer having an amido group bound to a phosphoric acid group. Examples of the phosphoric acid amide monomer may include acrylamide phosphonic acid and an acrylamide phosphonic acid derivative.

Among the amide monomers, the carboxylic acid amide monomer is preferable from the viewpoints of enhancement of the durability of the adhesive layer. Further, the unsaturated carboxylic acid amide compound is more preferable, and (meth)acrylamide and N-hydroxymethyl(meth)acrylamide are particularly preferred.

As the amide monomer and the amide monomer unit, one type thereof may be solely used, and two or more types thereof may also be used in combination at any ratio.

The ratio of the amide monomer unit in the polymer as the binder for an adhesive layer is preferably 0.1% by weight or more, more preferably 0.2% by weight or more, and particularly preferably 0.5% by weight or more, and is preferably 20% by weight or less, more preferably 15% by weight or less, and particularly preferably 10% by weight or less. When the ratio of the amide monomer unit is equal to or more than the lower limit of the aforementioned range, generation of gas in the lithium ion secondary battery can be effectively suppressed, and transition metal ions in the electrolytic solution can be effectively captured. When it is equal to or less than the upper limit thereof, cycle property of the lithium ion secondary battery can be enhanced.

The polymer as the binder for an adhesive layer may contain an acid group-containing monomer unit. As the acid group-containing monomer unit, for example, one selected from the same range as described as those used for the particulate polymer may be used. As the acid group-containing monomer, one type thereof may be solely used, and two or more types thereof may also be used in combination at any ratio.

The ratio of the acid group-containing monomer unit in the polymer as the binder for an adhesive layer is preferably 0.2% by weight or more, more preferably 0.4% by weight or more, and particularly preferably 0.6% by weight or more, and is preferably 10.0% by weight or less, more preferably 6.0% by weight or less, and particularly preferably 4.0% by weight or less. When the ratio of the acid group-containing monomer unit falls within the aforementioned range, cohesive failure of the adhesive layer can be suppressed, and adhesion force of the adhesive layer can be improved.

Further, the polymer as the binder for an adhesive layer may contain a (meth)acrylonitrile monomer unit. In this case, as a (meth)acrylonitrile monomer corresponding to the (meth)acrylonitrile monomer unit, acrylonitrile may be used, methacrylonitrile may also be used, and acrylonitrile and methacrylonitrile may also be used in combination.

The ratio of the (meth)acrylonitrile monomer unit in the polymer as the binder for an adhesive layer is preferably 0.2% by weight or more, more preferably 0.5% by weight or more, and particularly preferably 1.0% by weight or more, and is preferably 20.0% by weight or less, more preferably 10.0% by weight or less, and particularly preferably 5.0% by weight or less. When the ratio of the (meth)acrylonitrile monomer unit is equal to or more than the aforementioned lower limit, lifetime of the secondary battery can be especially extended. When the ratio of the (meth)acrylonitrile monomer unit is equal to or less than the aforementioned upper limit, mechanical strength of the adhesive layer can be enhanced.

The polymer as the binder for an adhesive layer may contain a crosslinkable monomer unit. Examples of the crosslinkable monomer corresponding to the crosslinkable monomer unit may include those exemplified in the description of the particulate polymer. N-hydroxymethyl(meth) acrylamide exemplified as the carboxylic acid amide monomer can act as both the amide monomer and the crosslinkable monomer. Therefore, N-hydroxymethyl(meth) acrylamide may be used as the crosslinkable monomer. As the crosslinkable monomer, one type thereof may be solely used, and two or more types thereof may also be used in combination at any ratio.

The ratio of the crosslinkable monomer unit in the polymer as the binder for an adhesive layer is preferably 0.2% by weight or more, more preferably 0.6% by weight or more, and particularly preferably 1.0% by weight or more, and is preferably 5.0% by weight or less, more preferably 4.0% by weight or less, and particularly preferably 3.0% by weight or less. When the ratio of the crosslinkable monomer unit is equal to or more than the aforementioned lower limit, mechanical strength of the adhesive layer can be enhanced. When it is equal to or less than the upper limit thereof, flexibility of the adhesive layer can be prevented from deteriorating to be fragile.

The polymer as the binder for an adhesive layer may contain an optional structural unit in addition to the aforementioned structural units. For example, the polymer as the binder for an adhesive layer may contain a structural unit having a structure formed by polymerization of styrene (styrene unit), a structural unit having a structure formed by polymerization of butadiene (butadiene unit), and a structural unit having a structure formed by polymerization of acrylonitrile (acrylonitrile unit), in combination with the aforementioned structural units. As the optional structural unit, one type thereof may be solely used, and two or more types thereof may also be used in combination at any ratio.

The glass transition temperature of the polymer as the binder for an adhesive layer is preferably $-100°$ C. or higher, more preferably $-90°$ C. or higher, and particularly preferably $-80°$ C. or higher, and is preferably $0°$ C. or lower, more preferably $-5°$ C. or lower, and particularly preferably $-10°$ C. or lower. When the glass transition temperature of the polymer as the binder for an adhesive layer is equal to or more than the lower limit of the aforementioned range, adhesion property of the adhesive layer can be enhanced. When it is equal to or less than the upper limit thereof, flexibility of the adhesive layer can be enhanced.

The form of the binder for an adhesive layer may be a particulate form or a non-particulate form. In particular, a binder having a particulate form is preferably used from the viewpoint of providing fine pores in the adhesive layer to enhance ion diffusivity.

When the binder for an adhesive layer is particulate, the volume average particle diameter of the binder for an adhesive layer is preferably 0.01 µm or more, more preferably 0.02 µm or more, and particularly preferably 0.05 µm or more, and is preferably 1 µm or less, more preferably 0.9 µm or less, and particularly preferably 0.8 µm or less. When the volume average particle diameter of the binder for an adhesive layer is equal to or more than the lower limit of the aforementioned range, dispersibility of the binder for an adhesive layer can be enhanced. When it is equal to or less than the upper limit thereof, adhesion property of the adhesive layer can be enhanced.

Examples of the method for producing the binder for an adhesive layer may include a solution polymerization method, a suspension polymerization method, and an emulsion polymerization method. Among them, the emulsion polymerization method and the suspension polymerization method are preferable since polymerization can be performed in water and the product as it is can be used as a material for the adhesive. It is preferable that a reaction system for production of the binder for an adhesive layer contains a dispersant. Usually, the binder for an adhesive layer is substantially formed of the polymer that constitutes the binder, but may be accompanied with an optional component such as an additive used in polymerization.

The amount of the binder for an adhesive layer relative to 100 parts by weight of the particulate polymer is preferably 0.1 parts by weight or more and more preferably 0.2 parts by weight or more, and is preferably 30 parts by weight or less, more preferably 20 parts by weight or less, and particularly preferably 15 parts by weight or less. When the amount of the binder for an adhesive layer is equal to or more than the lower limit of the aforementioned range, strength of the adhesive layer can be enhanced. When it is equal to or less than the upper limit thereof, ion diffusivity of the particulate polymer can be sufficiently exerted.

[1.4. Solvent]

The adhesive of the present invention usually contains a solvent. As the solvent, water is preferably used. The particulate polymer and the binder for an adhesive layer are usually water-insoluble. Therefore, when water is used as the solvent, the particulate polymer and the binder for an adhesive layer are dispersed in water in particle shapes. Further, the non-conductive fibers are usually water-insoluble. Therefore, when water is used as the solvent, the non-conductive fibers are dispersed in water in fiber shapes.

As the solvent, water may be used in combination with a solvent other than water. Examples of the solvent to be used in combination with water may include cyclic aliphatic hydrocarbons such as cyclopentane and cyclohexane; aromatic hydrocarbons such as toluene and xylene; ketones such as ethyl methyl ketone and cyclohexanone; esters such as ethyl acetate, butyl acetate, γ-butyrolactone, and ε-caprolactone; nitriles such as acetonitrile and propionitrile; ethers such as tetrahydrofuran and ethylene glycol diethyl ether; alcohols such as methanol, ethanol, isopropanol, ethyleneglycol, and ethylenegylcol monomethyl ether; and amides such as N-methylpyrrolidone (NMP), and N,N-dimethylformamide. One type of them may be solely used, and two or more types thereof may also be used in combination at any ratio. However, it is preferable to use water alone as the solvent.

It is preferable that the amount of the solvent in the adhesive is set so that the solid content concentration of the adhesive falls within a specific range. Specifically, the solid content concentration of the adhesive is preferably 10% by weight or more, more preferably 15% by weight or more, and particularly preferably 20% by weight or more, and is preferably 80% by weight or less, more preferably 75% by weight or less, and particularly preferably 70% by weight or less. Herein, the solid content of a composition refers to a substance that remains after drying the composition.

[1.5. Non-Conductive Particles]

The adhesive of the present invention may further contain non-conductive particles. For example, the adhesive may further contain particles selected from the non-conductive particles that the porous membrane may contain, which will be described later. Since the non-conductive particles usually have high rigidity, inclusion of the non-conductive particles in the adhesive layer can enhance mechanical strength of the adhesive layer.

The amount of the non-conductive particles relative to 100 parts by weight of the particulate polymer is preferably 0.1 parts by weight or more, more preferably 1 part by weight or more, and particularly preferably 5 parts by weight or more, and is preferably 100 parts by weight or less, more preferably 80 parts by weight or less, and particularly preferably 50 parts by weight or less.

[1.6. Water-Soluble Polymer]

The adhesive of the present invention may further contain a water-soluble polymer. The water-soluble polymer usually functions as a viscosity modifier in the adhesive. In particular, when the adhesive contains water as the solvent, a part of the water-soluble polymer in the adhesive exists as a free form in the solvent, and another part of the water-soluble polymer is adsorbed on the surfaces of the particulate polymer. Thus, the surfaces of the particulate polymer are covered with a layer of the water-soluble polymer. Therefore, dispersibility of the particulate polymer in water can be improved.

Examples of the water-soluble polymer may include cellulose-based polymers such as carboxymethyl cellulose, methyl cellulose, and hydroxypropyl cellulose, and ammonium salts and alkali metal salts thereof; (modified) poly (meth)acrylic acid and ammonium salts and alkali metal salts thereof; polyvinyl alcohol compounds such as (modified) polyvinyl alcohol, a copolymer of acrylic acid or acrylic acid salt and vinyl alcohol, and a copolymer of maleic anhydride, maleic acid, or fumaric acid and vinyl alcohol; polyethylene glycol, polyethylene oxide, polyvinylpyrrolidone, modified polyacrylic acid, oxide starch, phosphoric acid starch, casein, and a variety of starches. Herein, "(modified) poly-" includes both "unmodified poly-" and "modified poly-."

The amount of the water-soluble polymer relative to 100 parts by weight of the particulate polymer is preferably 0.1 parts by weight or more, more preferably 0.2 parts by weight or more, and particularly preferably 0.5 part by weight or more, and is preferably 15 parts by weight or less, more preferably 10 parts by weight or less, and particularly preferably 5 parts by weight or less. When the amount of the water-soluble polymer is equal to or more than the lower limit of the aforementioned range, dispersibility of the particulate polymer in the adhesive can be enhanced. When it is equal to or less than the upper limit thereof, ion diffusivity of the particulate polymer can be sufficiently exerted.

[1.7. Optional Component]

The adhesive of the present invention may contain an optional component in addition to the particulate polymer, the non-conductive fibers, the binder for an adhesive layer, the solvent, the non-conductive particles, and the water-soluble polymer. As such an optional component, one that does not excessively exert undesired effects on a battery reaction may be used. As the optional component, one type thereof may be solely used, and two or more types thereof may also be used in combination at any ratio.

For example, the adhesive may contain an isothiazoline-based compound, a chelate compound, a pyrithione compound, a dispersant, a leveling agent, an antioxidant, a thickener, an antifoaming agent, a wetting agent, and an electrolytic solution additive having a function of suppressing decomposition of electrolytic solution.

[1.8. Properties of Adhesive]

The adhesive of the present invention is usually a fluid slurry composition. In the adhesive of the present invention, each component contained in the adhesive has high dispersibility. Therefore, the viscosity of the adhesive of the present invention can be usually decreased with ease.

[1.9. Method for Producing Adhesive]

The method for producing the adhesive is not particularly limited. Usually, the adhesive is obtained by mixing the aforementioned components.

The order of mixing the respective components is not particularly limited. The mixing method therefor is not either particularly limited. As a mixer, a disperser is usually used for mixing in order to rapidly disperse the particles.

It is preferable that the disperser is a device capable of uniformly dispersing and mixing the aforementioned components. Examples thereof may include a ball mill, a sand mill, a pigment disperser, a grinder, an ultrasonic disperser, a homogenizer, and a planetary mixer. Among them, high dispersion devices such as a bead mill, a roll mill, and FILMIX are particularly preferred since they are capable of applying high dispersion share.

[1.10. Usage of Adhesive]

The adhesive of the present invention may be used for adhesion of the members constituting the lithium ion secondary battery. For example, the adhesive may be used for adhesion of the separator and the electrode, and may also be used for adhesion of a current collector and an electrode active material layer. In particular, it is preferable that the adhesive of the present invention is used for adhesion of the separator and the electrode. At that time, the adhesive of the present invention may be used for usage of adhesion of a separator including a separator substrate and the electrode. In a lithium ion secondary battery provided with a separator including a separator substrate and a porous membrane and the electrode, it is more preferable that the adhesive of the present invention is used for adhesion of the porous membrane and the electrode.

[2. Adhesive Layer for Lithium Ion Secondary Battery]

The adhesive of the present invention may be applied onto an appropriate substrate, and, if necessary, dried to produce an adhesive layer as a membrane formed from a solid content of the adhesive. For example, the adhesive layer can be produced by a production method including steps of applying the adhesive onto a substrate to obtain a layer of the adhesive, and, if necessary, drying the layer to remove the solvent such as water from the layer.

The thus obtained adhesive layer contains the particulate polymer according to the present invention. The particulate polymer exhibits adhesion property by swelling of the shell portion in the electrolytic solution. Therefore, with the adhesive layer, members constituting the battery can be tightly bonded in the electrolytic solution. Since the core portion of the particulate polymer has high ion diffusivity, an increase in the resistance by the adhesive layer is small. Further, when the adhesive layer contains the non-conductive fibers, swelling of the adhesive layer in the electrolytic solution can be suppressed. Accordingly, the lithium ion secondary battery having this adhesive layer has excellent battery properties.

The adhesive layer preferably has porosity. Since the adhesive layer contains the particulate polymer, pores are easily formed in the adhesive layer. Therefore, the adhesive layer has excellent ion diffusivity.

In a state where the shell portion of the particulate polymer does not swell in the electrolytic solution, adhesion property is not usually exhibited. Therefore, in this state where the adhesive layer does not swell in the electrolytic solution, the adhesive layer does not usually exhibit adhesion property. Accordingly, in the state where the adhesive layer does not swell in the electrolytic solution, the adhesive layer has excellent blocking resistance.

Examples of the method of applying the adhesive may include a doctor-blade method, a dip coating method, a reverse roll method, a direct roll method, a spray-coating method, a gravure method, an extrusion method, and a brush method.

Examples of the drying method may include a drying method by air such as warm air, hot air, and low humid air; vacuum drying; and a drying method by irradiation with energy rays such as infrared ray, far infrared ray, and electron beam. Specifically, it is preferable that the drying method is selected in accordance with the type of solvent to be used.

In the method for producing the adhesive layer, an optional operation other than the aforementioned operations may be performed.

For example, a heating treatment may be performed. By the heating treatment, a thermal crosslinking group in the polymer component can be crosslinked.

The application amount of the adhesive in terms of the solid content amount of the adhesive applied per unit area is preferably 0.1 g/m$^2$ or more, and is preferably 1.5 g/m$^2$ or less. When the application amount is equal to or more than the lower limit of the aforementioned range, adhesion property of the adhesive layer can be enhanced. When it is equal to or less than the upper limit thereof, it is possible to prevent excessive increase in the resistance by the adhesive layer, to thereby prevent decrease in cycle property.

The thickness of the adhesive layer is preferably 0.1 μm or more, more preferably 0.2 μm or more, and particularly preferably 0.5 μm or more, and is preferably 5 μm or less, more preferably 4 μm or less, and particularly preferably 3 μm or less. When the thickness of the adhesive layer is equal to or more than the lower limit of the aforementioned range, adhesion property of the adhesive layer can be enhanced. When it is equal to or less than the upper limit thereof, it is possible to prevent excessive increase in the resistance by the adhesive layer, to thereby prevent decrease in cycle property.

[3. Separator for Lithium Ion Secondary Battery]

The separator of the present invention has a separator substrate and the adhesive layer. The adhesive layer may be provided directly on a surface of the separator substrate without another layer interposed therebetween, or provided indirectly on a surface of the separator substrate with an optional layer interposed therebetween. It is particularly preferable that the porous membrane is provided on the surface of the separator substrate and the adhesive layer is provided on a surface of the porous membrane. In the separator of the present invention, adhesion property between the porous membrane and the electrode in the electrolytic solution can be improved since the adhesive layer contains the particulate polymer according to the present invention. Therefore, low-temperature output property of the lithium ion secondary battery can be improved, and high-temperature cycle property can be usually improved. In addition, when the adhesive layer contains the non-conductive fibers, swelling of the adhesive layer in the electrolytic solution can be suppressed. Therefore, a further improvement in low-temperature output property and high-temperature cycle property can be expected. In a state where the aforementioned adhesive layer does not swell in the electrolytic solution, adhesion property is not usually exhibited. Therefore, even in a wound shape, blocking is unlikely to occur, and handlingability is excellent.

[3.1. Separator Substrate]

As the separator substrate, for example, a porous substrate having fine pores may be used. When such a separator substrate is used, short circuit in the secondary battery can be prevented without preventing charging and discharging of the battery. In particular, a porous substrate formed of an organic material is preferably used as the separator substrate. When there is a rise in temperature inside the battery, the porous substrate formed of an organic material can be molten to seal fine pores, to prevent movement of lithium ions and block the electric current. Therefore, the safety of the lithium ion secondary battery can be enhanced.

Examples of the separator substrate may include a porous substrate formed from a resin containing polyolefin (for example, polyethylene, polypropylene, polybutene, polyvinyl chlorides) or a mixture thereof, or a copolymer thereof; a porous substrate formed from a resin containing polyethylene terephthalate, polycycloolefin, polyether sulfone, polyamide, polyimide, polyimideamide, polyaramide, nylon, polytetrafluoroethylene, or cellulose; a woven fabric made from fibers of the aforementioned resins; a non-woven fabric made from fibers of the aforementioned resins; and collection of insulating particles. As the separator substrate, a layered body of multilayer structure having any combination of two or more layers may be used.

The thickness of the separator substrate is preferably 0.5 μm or more, and more preferably 1 μm or more, and is preferably 40 μm or less, more preferably 30 μm or less, and particularly preferably 10 μm or less. When the thickness falls within this range, an increase in the resistance by the separator substrate in the secondary battery is reduced, and workability during production of the battery is superior.

[3.2. Porous Membrane]

The porous membrane is a porous membrane provided on a surface of the separator substrate, and may be provided on one face of the separator substrate, or on both faces. This porous membrane contains non-conductive particles, and further contains a binder for a porous membrane. In such a porous membrane, the non-conductive particles are bonded via the binder for a porous membrane. Therefore, gaps between the non-conductive particles constitute pores in the porous membrane. The binder for a porous membrane has a function of bonding the porous membrane to the separator substrate.

When a porous substrate formed from an organic material is used as the separator substrate, overheating of the battery may generally cause shrinkage of the separator substrate. On the other hand, when the porous membrane is provided on the surface of the separator substrate, the porous membrane withstands the shrinking stress by the separator substrate. Therefore, the shrinkage of the separator substrate can be prevented. Accordingly, short circuit by the shrinkage of the separator substrate can be prevented, and safety of the lithium ion secondary battery can be enhanced.

[3.2.1. Non-Conductive Particle]

As the non-conductive particles, particles formed from an electrochemically stable material are preferably used. As the non-conductive particles, inorganic particles may be used, and organic particles may also be used.

The inorganic particles have excellent dispersion stability in a solvent, and are unlikely to be settled in a slurry for a porous membrane used for manufacturing a porous membrane. Therefore, the slurry for a porous membrane can maintain a uniform slurry state for extended periods of time. When the inorganic particles are used, heat resistance of the porous membrane can be usually enhanced. Examples of the material for inorganic particles may include oxide particles such as aluminum oxide (alumina), a hydrate of aluminum oxide (boehmite (AlOOH)), gibbsite (Al(OH)$_3$), silicon oxide, magnesium oxide (magnesia), magnesium hydroxide, calcium oxide, titanium oxide (titania), BaTiO$_3$, ZrO$_2$, and alumina-silica complex oxide; nitride particles such as aluminum nitride and boron nitride; covalent crystal particles such as silicon and diamond; insoluble ionic crystal particles such as barium sulfate, calcium fluoride, and barium fluoride; and clay fine particles such as talc and montmorillonite. Among them, from the viewpoints of stability in the electrolytic solution and electric potential stability, oxide particles are preferable. In particular, from the viewpoints of low water absorption property and excellent heat resistance (for example, resistance to high temperature of 180° C. or higher), titanium oxide, aluminum oxide, a hydrate of aluminum oxide, magnesium oxide, and magnesium hydroxide are more preferable. Aluminum oxide, a hydrate of aluminum oxide, magnesium oxide, and magnesium hydroxide are further preferred, and aluminum oxide is particularly preferred. One type of them may be solely used, and two or more types thereof may also be used in combination at any ratio.

As the organic particles, polymer particles are usually used. In the organic particles, when the type and amount of functional group on a surface of the organic particles are adjusted, affinity to water can be controlled, and further the moisture amount contained in the porous membrane can be controlled. The organic particles are usually excellent in small amount of metal ion elution. Examples of the material for such organic particles may include a variety of types of polymer compounds such as polystyrene, polyethylene, polyimide, a melamine resin, and a phenolic resin. As the polymer compounds forming the particles, for example, a mixture, a modified product, a derivative, a random copolymer, an alternating copolymer, a graft copolymer, a block copolymer, a crosslinked product, or the like may also be used. The organic particles may be formed from a mixture of two or more types of polymer compounds.

When the organic particles are used as the non-conductive particles, the organic particles may not have a glass transition temperature. However, when a polymer compound forming the organic particles has a glass transition temperature, the glass transition temperature is preferably 150° C. or higher, more preferably 200° C. or higher, and particularly preferably 250° C. or higher, and is usually 500° C. or lower.

If necessary, the non-conductive particles may be subjected to element substitution, surface treatment, or solid solution treatment, for example. Each particle of the non-conductive particles may contain one type of the aforementioned material alone, and may also contain a combination of two or more types thereof at any ratio. Further, two or more types of particles formed from different materials may be used in combination as the non-conductive particles.

Examples of shapes of the non-conductive particles may include spherical, ellipsoidal, polygonal, tetrapod (registered trademark)-like, plate, and scale shapes. Among them, the tetrapod (registered trademark)-like, plate, and scale shapes are preferred since a decrease in ion conductivity by the porous membrane can be suppressed by an increase in porosity of the porous membrane.

The volume average particle diameter D50 of the non-conductive particles is preferably 0.1 µm or more, and more preferably 0.2 µm or more, and is preferably 5 µm or less, more preferably 2 µm or less, and particularly preferably 1 µm or less. When non-conductive particles having such a volume average particle diameter D50 is used, a uniform porous membrane can be obtained even with thin thickness of the porous membrane. Therefore, battery capacity can be increased.

The BET specific surface area of the non-conductive particles is, for example, preferably 0.9 m$^2$/g or more, and more preferably 1.5 m$^2$/g or more. It is preferable that the BET specific surface area is not too large and, for example, is 150 m$^2$/g or less from the viewpoints of suppressing aggregation of the non-conductive particles and optimizing fluidity of the slurry for a porous membrane.

The amount of the non-conductive particles in the porous membrane is preferably 70% by weight or more, and more preferably 80% by weight or more, and is preferably 97% by weight or less, and more preferably 95% by weight or less. When the amount of the non-conductive particles falls within the aforementioned range, it is possible to form a gap between the non-conductive particles to an extent wherein the non-conductive particles has area for contacting to each other, while movement of ions is not inhibited. Therefore, when the amount of the non-conductive particles falls within the aforementioned range, strength of the porous membrane can be improved, and short circuit of the secondary battery can be stably prevented.

[3.2.2. Binder for Porous Membrane]

As the binder for a porous membrane, for example, a binder selected from the same range as described in the binder for an adhesive layer may be used. Among them, a polymer containing an amide monomer unit is preferably used since cycle property of the lithium ion secondary battery can be further improved. As the binder for a porous membrane, one type thereof may be solely used, and two or more types thereof may also be used in combination at any ratio.

The amount of the binder for a porous membrane relative to 100 parts by weight of the non-conductive particles is preferably 0.1 parts by weight or more, and more preferably 0.2 parts by weight or more, and is preferably 30 parts by weight or less, and more preferably 20 parts by weight or less. When the amount of the binder for a porous membrane is equal to or more than the lower limit of the aforementioned range, adhesion property of the porous membrane to the separator substrate can be enhanced. When it is equal to or less than the upper limit thereof, lifetime of the lithium ion secondary battery can be extended.

[3.2.3. Water-Soluble Polymer]

The porous membrane may further contain a water-soluble polymer in addition to the non-conductive particles and the binder for a porous membrane. The water-soluble polymer usually functions as a viscosity modifier in the slurry for a porous membrane. In particular, when the slurry for a porous membrane contains water as the solvent, a part of the water-soluble polymer in the slurry for a porous membrane exists as a free form in the solvent, and another part of the water-soluble polymer is adsorbed on the surfaces of the non-conductive particles. Thus, the surfaces of the non-conductive particles are covered with a layer of the water-soluble polymer. Therefore, dispersibility of the non-conductive particles in water can be improved. Further, dispersibility of the non-conductive particles in the porous membrane can be improved. In addition, the water-soluble polymer has a function of bonding the non-conductive particles.

As the water-soluble polymer, for example, a water-soluble polymer selected from the same range as described as those contained in the adhesive may be used. As the water-soluble polymer, one type thereof may be solely used, and two or more types thereof may also be used in combination at any ratio.

The amount of the water-soluble polymer relative to 100 parts by weight of the non-conductive particles is preferably 0.1 parts by weight or more, and more preferably 0.2 parts by weight or more, and is preferably 10 parts by weight or less, and more preferably 5 parts by weight or less. When the amount of the water-soluble polymer is equal to or more than the lower limit of the aforementioned range, adhesion property of the porous membrane to the separator substrate can be enhanced. When it is equal to or less than the upper limit thereof, lifetime of the lithium ion secondary battery can be extended.

[3.2.4. Optional Component]

The porous membrane may contain an optional component in addition to the non-conductive particles, the binder for a porous membrane, and the water-soluble polymer. As such an optional component, one that does not excessively exert undesired effects on a battery reaction may be used. Examples of the optional component may include those exemplified as the optional components that the adhesive may contain. As the optional component, one type thereof may be solely used, and two or more types thereof may also be used in combination at any ratio.

[3.2.5. Thickness of Porous Membrane]

The thickness of the porous membrane is preferably 0.1 μm or more, more preferably 0.2 μm or more, and particularly preferably 0.3 μm or more, and is preferably 20 μm or less, more preferably 15 μm or less, and particularly preferably 10 μm or less. When the thickness of the porous membrane is equal to or more than the lower limit of the aforementioned range, heat resistance of the porous membrane can be enhanced. When it is equal to or less than the upper limit thereof, a decrease in the ion conductivity by the porous membrane can be suppressed.

[3.2.6. Method for Producing Porous Membrane]

The porous membrane can be produced by, for example, preparing a slurry for a porous membrane containing components of the porous membrane (i.e., the non-conductive particles, the binder for a porous membrane, the water-soluble polymer, and the optional component), and applying the slurry for a porous membrane onto an appropriate substrate, followed by drying, if necessary. Specifically, the porous membrane can be produced by a production method including steps of preparing a slurry for a porous membrane, applying the slurry for a porous membrane onto a substrate to obtain a layer of the slurry for a porous membrane, and if necessary, removing a solvent such as water from the layer by drying.

The slurry for a porous membrane can be produced by, for example, mixing the non-conductive particles, the binder for a porous membrane, the water-soluble polymer, the optional component, and the solvent. The order of mixing the respective components is not particularly limited. The mixing method therefor is not either particularly limited. As a mixer, a disperser is usually used for mixing in order to rapidly disperse the particles. Examples of the disperser may include those exemplified as the dispersers used for the production of the adhesive.

As the solvent for the slurry for a porous membrane, for example, a solvent selected from the same range as described as those the adhesive may contain may be used. As the solvent, one type thereof may be solely used, and two or more types thereof may also be used in combination at any ratio. In particular, water is preferably used as the solvent.

It is preferable that the amount of the solvent in the slurry for a porous membrane is set so that the solid content concentration of the slurry for a porous membrane falls within a desired range. Specifically, the solid content concentration of the slurry for a porous membrane is preferably 10% by weight or more, more preferably 15% by weight or more, and particularly preferably 20% by weight or more, and is preferably 80% by weight or less, more preferably 75% by weight or less, and particularly preferably 70% by weight or less.

By the application of the aforementioned slurry for a porous membrane onto a substrate, the layer of the slurry for a porous membrane is formed. The substrate used herein is a member that is a subject forming the layer of the slurry for a porous membrane. The substrate is not limited. For example, the layer of the slurry for a porous membrane may be formed on a surface of a release film, the solvent may be removed from the layer to form the porous membrane, and the porous membrane may be separated from the release film. However, the separator substrate is usually used as the substrate since the production efficiency is enhanced by omission of a step of separating the porous membrane.

Examples of the application method may include the same examples as described in the method for producing the adhesive layer. Among them, a dip coating method and a gravure method are preferred since a uniform porous membrane can be obtained.

Examples of the drying method may include the same examples as described in the method for producing the adhesive layer.

In the method for producing the porous membrane, an optional operation other than the aforementioned operations may be performed.

For example, the porous membrane may be subjected to a pressurization treatment by a press method such as metal mold press and roll press. By the pressurization treatment, adhesion property of the substrate to the porous membrane can be enhanced. However, it is preferable that a pressure and a pressurization time are appropriately controlled so that they are not excessively large in order to keep the porosity of the porous membrane within a preferable range.

In order to remove residual water, for example, drying under vacuum and drying in a drying room are preferred.

Further, a heating treatment is also preferred. By the heating treatment, a thermal crosslinking group contained in the polymer component can be cross-linked to enhance the adhesion force.

[3.3. Adhesive Layer Provided to Separator of Invention]

The separator of the present invention has the aforementioned adhesive layer on the separator substrate directly or indirectly via an optional layer such as the porous membrane. Such a separator can be produced by, for example, using the separator substrate as a substrate, or using a layered body having the separator substrate and the optional layer as a substrate. For example, the separator of the present invention can be produced by preparing a layered body having the separator substrate and the porous membrane, and forming the adhesive layer on the porous membrane on the layered body by the aforementioned method for producing an adhesive layer using this layered body as a substrate. At that time, the adhesive layer may be provided on one face of the separator, or on both faces.

[4. Lithium Ion Secondary Battery]

The lithium ion secondary battery of the present invention includes a positive electrode, a negative electrode, an electrolytic solution, and a separator. As the separator, the lithium ion secondary battery of the present invention includes the aforementioned separator according to the present invention.

Since the lithium ion secondary battery of the present invention includes the separator according to the present invention, the battery has excellent low-temperature output property. In addition, the lithium ion secondary battery of the present invention usually has excellent high-temperature cycle property.

[4.1. Electrode]

The lithium ion secondary battery of the present invention includes a positive electrode and a negative electrode as electrodes. In a lithium ion secondary battery, an adhesive layer is disposed between the electrode and the separator substrate of the separator or the porous membrane, and the particulate polymer in the adhesive layer exhibits adhesion property in the electrolytic solution. Therefore, the electrode and the separator are tightly bonded.

In general, a lithium ion secondary battery is produced by producing a layered body in which the positive electrode, the separator, and the negative electrode are layered in this order, and putting the layered body in an outer package of the battery. In this case, when a separator having a conventional adhesive layer is used as the separator, the separator is bonded to the positive electrode and the negative electrode at the time point of layering the positive electrode, the separator, and the negative electrode. Therefore, even when the positive electrode, the separator, and the negative electrode are shifted during layering, the shift is hardly eliminated. This is because the positive electrode and the separator and the negative electrode and the separator are each fixed. On the other hand, the adhesive layer provided to the separator of the present invention exhibits low adhesion property in a state where the adhesive layer does not swell, and exhibits high adhesion property in a state where the adhesive layer swells in the electrolytic solution. Therefore, at the time point when the positive electrode, the separator, and the negative electrode are layered, the separator is not bonded to the positive electrode and the negative electrode. Therefore, even when the positive electrode, the separator, and the negative electrode are shifted during layering, the shift can be easily eliminated. Accordingly, a yield rate can be improved.

The positive electrode and the negative electrode each usually have a current collector and an electrode active material layer. Specifically, the positive electrode has a current collector and a positive electrode active material layer, and the negative electrode has a current collector and a negative electrode active material layer.

[4.1.1. Current Collector]

As the material of the current collector, a material having electrical conductivity and electrochemical durablity may be used. As this material of the current collector, a metal material is usually used. Examples of the metal material may include iron, copper, aluminum, nickel, stainless steel, titanium, tantalum, gold, and platinum. Among these, aluminum is preferable as the current collector for positive electrodes, and copper is preferable as the current collector for negative electrodes. One type of the aforementioned materials may be solely used, and two or more types thereof may also be used in combination at any ratio.

The shape of the current collector is not particularly limited, but is preferably a sheet-like shape having a thickness of approximately 0.001 mm to 0.5 mm.

It is preferable that the surface of the current collector is previously subjected to a roughening treatment for increasing adhesion strength with the electrode active material layer. Examples of the roughening method may include a mechanical polishing method, an electrolytic polishing method, and a chemical polishing method. In the mechanical polishing method, for example, coated abrasives including fixed abrasive particles, grindstone, emery wheel, and wire brush with steel wire are used. In addition, for increasing adhesion strength and conductivity of the electrode active material layer, an intermediate layer may be formed on the surface of the current collector.

[4.1.2. Electrode Active Material Layer]

The electrode active material layer is a layer provided on the current collector, and contains the electrode active material.

As the electrode active material of the lithium ion secondary battery, one in which lithium ions can be reversely intercalated or deintercalated by application of electrical potential in the electrolytic solution may be used.

A positive electrode active material is classified into a material formed of an inorganic compound and a material formed of an organic compound. Examples of the positive electrode active materials formed of an inorganic compound may include a transition metal oxide, a complex oxide of lithium and transition metal, and a transition metal sulfide. As the aforementioned transition metal, for example, Fe, Co, Ni, Mn, or the like is used. Specific examples of the inorganic compound used for the positive electrode active material may include lithium-containing metal complex oxides such as $LiCoO_2$, $LiNiO_2$, $LiMnO_2$, $LiMn_2O_4$, $LiFePO_4$, and $LiFeVO_4$; transition metal sulfides such as $TiS_2$, $TiS_3$, and amorphous $MoS_2$; and transition metal oxides such as $Cu_2V_2O_3$, amorphous $V_2O$—$P_2O_5$, $MoO_3$, $V_2O_5$, and $V_6O_{13}$. Examples of the positive electrode active material formed of an organic compound may include conductive polymers such as polyacetylene and poly-p-phenylene.

Further, a positive electrode active material formed of a composite material including a combination of an inorganic compound and an organic compound may also be used.

Further, for example, an iron-based oxide may be subjected to reduction firing in the presence of a carbon source substance to produce a composite material covered with a carbon material, and this composite material may be used as the positive electrode active material. The iron-based oxide tends to have poor electroconductivity, but can be used as a high-performance positive electrode active material by forming the composite material as described above.

Further, a material obtained by partial substitution of the aforementioned compound with an element may also be used as the positive electrode active material.

As the positive electrode active material, one type thereof may be solely used, and two or more types thereof may also be used in combination at any ratio. In addition, a mixture of the inorganic compound and the organic compound described above may also be used as the positive electrode active material.

The particle diameter of the positive electrode active material may be selected considering other constituents of the lithium ion secondary battery. From the viewpoints of improvement of battery properties such as load property and cycle property, the volume average particle diameter of the positive electrode active material is preferably 0.1 µm or more, and more preferably 1 µm or more, and is preferably 50 µm or less, and more preferably 20 µm or less. When the volume average particle diameter of the positive electrode active material falls within this range, a battery having a large charging and discharging capacity can be obtained, and the positive electrode active material is easily handled during production of a slurry for a positive electrode and the electrode.

The ratio of the positive electrode active material in the electrode active material layer is preferably 90% by weight or more, and more preferably 95% by weight or more, and is preferably 99.9% by weight or less, and more preferably 99% by weight or less. When the amount of the positive electrode active material falls within the aforementioned range, capacity of the lithium ion secondary battery can be increased, and flexibility of the positive electrode and the adhesion property of the current collector to the positive electrode active material layer can be improved.

Examples of the negative electrode active material may include carbonaceous materials such as amorphous carbon, graphite, natural graphite, mezo carbon micro beads, and pitch-based carbon fibers; and conductive polymers such as polyacene. Further examples thereof may include metals such as silicon, tin, zinc, manganese, iron, and nickel, and alloys thereof; oxides of the aforementioned metals or alloys; and sulfates of the aforementioned metals or alloys. Further, metal lithium; lithium alloys such as Li—Al, Li—Bi—Cd, and Li—Sn—Cd; a lithium transition metal nitride; silicon or the like may be used. As the electrode active material, a material having a surface in which a conductive material is attached by a mechanical modifying method may also be used. As the negative electrode active material, one type thereof may be solely used, and two or more types thereof may also be used in combination at any ratio.

The particle diameter of the negative electrode active material is appropriately selected considering other constituents of the lithium ion secondary battery. From the viewpoints of improvement in battery properties such as initial efficiency, load property, and cycle property, the volume average particle diameter of the negative electrode active material is preferably 0.1 µm or more, more preferably 1 µm or more, and further preferably 5 µm or more, and is preferably 100 µm or less, more preferably 50 µm or less, and further preferably 20 µm or less.

The specific surface area of the negative electrode active material is, from the viewpoint of improved power density, preferably 2 $m^2/g$ or more, more preferably 3 $m^2/g$ or more, and further preferably 5 $m^2/g$ or more, and is preferably 20 $m^2/g$ or less, more preferably 15 $m^2/g$ or less, and further preferably 10 $m^2/g$ or less. The specific surface area of the negative electrode active material can be measured by, for example, a BET method.

The ratio of the negative electrode active material in the electrode active material layer is preferably 85% by weight or more, and more preferably 88% by weight or more, and is preferably 99% by weight or less, and more preferably 97% by weight or less. When the amount of the negative electrode active material falls within the aforementioned range, a negative electrode that exhibits high capacity and excellent flexibility and adhesion property can be achieved.

In addition to the electrode active material, it is preferable that the electrode active material layer contains a binder for an electrode. When the electrode active material layer contains the binder for an electrode, adhesion property of the electrode active material layer are improved, and strength against mechanical force applied at a step of winding the electrode or the like is increased. Further, since the electrode active material layer is unlikely to be separated from the current collector, risk of short circuit caused by separated materials decreases.

As the binder for an electrode, for example, a polymer may be used. Examples of the polymer to be used as the binder for an electrode may include polymers selected from the same range as that of the polymers described as the binder for an adhesive layer.

Further, particles of a soft polymer exemplified in the following may also be used as the binder for an electrode. Examples of the soft polymer may include:

(i) acrylic-based soft polymers which are acrylic acid or methacrylic acid derivative homopolymers or copolymers of acrylic acid or methacrylic acid derivative homopolymer and a monomer copolymerizable therewith, such as polybutyl acrylate, polybutyl methacrylate, polyhydroxyethyl methacrylate, polyacrylamide, polyacrylonitrile, a butyl acrylate•styrene copolymer, a butyl acrylate•acrylonitrile copolymer, and a butyl acrylate•acrylonitrile•glycidyl methacrylate copolymer;

(ii) isobutylene-based soft polymers such as polyisobutylene, an isobutylene•isoprene rubber, and an isobutylene•styrene copolymer;

(iii) diene-based soft polymers such as polybutadiene, polyisoprene, a butadiene•styrene random copolymer, an isoprene•styrene random copolymer, an acrylonitrile•butadiene copolymer, an acrylonitrile•butadiene•styrene copolymer, a butadiene•styrene•block copolymer, a styrene•butadiene•styrene•block copolymer, an isoprene•styrene•block copolymer, and a styrene•isoprene•styrene•block copolymer;

(iv) silicon-containing soft polymers such as dimethylpolysiloxane, diphenylpolysiloxane, and dihydroxypolysiloxane;

(v) olefin-based soft polymers such as liquid polyethylene, polypropylene, poly-1-butene, an ethylene•α-olefin copolymer, a propylene•α-olefin copolymer, an ethylene•propylene•diene copolymer (EPDM), and an ethylene•propylene•styrene copolymer;

(vi) vinyl-based soft polymers such as polyvinyl alcohol, polyvinyl acetate, polyvinyl stearate, and a vinyl acetate•styrene copolymer;

(vii) epoxy-based soft polymers such as polyethylene oxide, polypropylene oxide, and an epichlorohydrin rubber;

(viii) fluorine-containing soft polymers such as a vinylidene fluoride-based rubber and a tetrafluoroethylene-propylene rubber; and (ix) other soft polymers such as natural rubber, polypeptide, protein, a polyester-based thermoplastic elastomer, a vinyl chloride-based thermoplastic elastomer, and a polyamide-based thermoplastic elastomer. Among these, diene-based soft polymers and acrylic-based soft polymers are preferable. Furthermore, these soft polymers may have a crosslinked structure or may be modified to introduce a functional group.

As the binder for an electrode, one type thereof may be solely used, and two or more types thereof may also be used in combination at any ratio.

The amount of the binder for an electrode in the electrode active material layer relative to 100 parts by weight of the electrode active material is preferably 0.1 parts by weight or more, more preferably 0.2 parts by weight or more, and particularly preferably 0.5 parts by weight or more, and is preferably 5 parts by weight or less, and more preferably 3 parts by weight or less. When the amount of the binder for an electrode falls within the aforementioned range, separation of the electrode active material from the electrode can be prevented without inhibiting the battery reaction.

In addition to the electrode active material and the binder for an electrode, the electrode active material layer may contain an optional component as long as the effects of the present invention are not significantly impaired. Examples of the component may include conductive materials and reinforcement materials. As the optional component, one type thereof may be solely used, and two or more types thereof may also be used in combination at any ratio.

Examples of the conductive material may include conductive carbon such as acetylene black, ketjen black, carbon black, graphite, vapor grown carbon fibers, and carbon nanotube; carbon powder such as graphite; and fibers and foils of a variety of metals. The use of the conductive material can improve electric contact between the electrode active materials, and battery properties such as cycle property can be improved.

The specific surface area of the conductive material is preferably 50 m$^2$/g or more, more preferably 60 m$^2$/g or more, and particularly preferably 70 m$^2$/g or more, and is preferably 1500 m$^2$/g or less, more preferably 1200 m$^2$/g or less, and particularly preferably 1000 m$^2$/g or less. When the specific surface area of the conductive material is equal to or more than the lower limit of the aforementioned range, the lithium ion secondary battery can have improved low temperature output property. When the specific surface area thereof is equal to or less than the upper limit value, adhesion property between the electrode active material layer and the current collector can be enhanced.

As the reinforcement material, for example, a variety of inorganic or organic fillers in a spherical shape, a plate shape, a rod shape, or a fiber shape may be used. The use of the reinforcement material can provide a tough and flexible electrode, and impart excellent long-term cycle property.

The amounts of the conductive material and the reinforcement agent to be used relative to 100 parts by weight of the electrode active material are each usually 0 parts by weight or more, and preferably 1 part by weight or more, and are each preferably 20 parts by weight or less, and more preferably 10 parts by weight or less.

In both the positive electrode and the negative electrode, the thickness of the electrode active material layer is preferably 5 μm or more, and more preferably 10 μm or more, and is preferably 300 μm or less, and more preferably 250 μm or less.

The method for producing the electrode active material layer is not particularly limited. The electrode active material layer may be produced by, for example, preparing a slurry for an electrode containing the electrode active material, a solvent, and if necessary, the binder for an electrode and an optional component, and applying the slurry onto the current collector, followed by drying. As the solvent, either water or an organic solvent may be used.

[4.2. Electrolytic Solution]

As the electrolytic solution, one that allows the polymer of the core portion and the polymer of the shell portion of the particulate polymer to be swelled at a swelling degree falling within the aforementioned specific range may be used. As such an electrolytic solution, an organic electrolytic solution containing an organic solvent and a supporting electrolyte that is dissolved in the organic solvent is preferably used.

As the supporting electrolyte, for example, a lithium salt is used. Examples of the lithium salt may include LiPF$_6$, LiAsF$_6$, LiBF$_4$, LiSbF$_6$, LiAlCl$_4$, LiClO$_4$, CF$_3$SO$_3$Li, C$_4$F$_9$SO$_3$Li, CF$_3$COOLi, (CF$_3$CO)$_2$NLi, (CF$_3$SO$_2$)$_2$NLi, and (C$_2$F$_5$SO$_2$)NLi. Among them, LiPF$_6$, LiClO$_4$, and CF$_3$SO$_3$Li are preferable since they are soluble in a solvent and exhibit high dissociation degree. As the supporting electrolyte, one type thereof may be solely used, and two or more types thereof may also be used in combination at any ratio. The use of a supporting electrolyte having high dissociation degree tends to increase the lithium ion conductivity. Therefore, the lithium ion conductivity can be adjusted by the type of supporting electrolyte.

The concentration of the supporting electrolyte in the electrolytic solution is preferably 1% by weight or more, and more preferably 5% by weight or more, and is preferably 30% by weight or less, and more preferably 20% by weight or less. Further, the supporting electrolyte is used preferably at a concentration of 0.5 mol/L to 2.5 mol/L depending on the type of the supporting electrolyte. When the amount of the supporting electrolyte falls within this range, ion conductivity can be increased. Therefore, the charging property and discharging property of the lithium ion secondary battery can be improved.

As the organic solvent used for the electrolytic solution, an organic solvent in which the supporting electrolyte can be dissolved may be used. Suitable examples of the organic solvent may include carbonate compounds such as dimethyl carbonate (DMC), ethylene carbonate (EC), diethyl carbonate (DEC), propylene carbonate (PC), butylene carbonate (BC), methylethyl carbonate (MEC), and vinylene carbonate (VC); ester compounds such as γ-butyrolactone and methyl formate; ether compounds such as 1,2-dimethoxyethane and tetrahydrofuran; and sulfur-containing compounds such as sulfolane and dimethyl sulfoxide. One type of them may be solely used, and two or more types thereof may also be used in combination at any ratio. Among them, a carbonate compound is preferable since the compound has high permittivity and a stable potential area over a wide range. As the viscosity of the used solvent is lower, the lithium ion conductivity tends to be higher. Therefore, the lithium ion conductivity can be adjusted depending on the type of the solvent.

The electrolytic solution may contain an additive, if necessary. As the additive, one type thereof may be solely used, and two or more types thereof may also be used in combination at any ratio.

In the aforementioned electrolytic solution, a solvent having a desired SP value is preferably used as the solvent for the electrolytic solution since the degrees of swelling of the polymer of the core portion and the polymer of the shell portion of the particulate polymer are easily controlled. Specifically, the SP value of the solvent for the electrolytic solution is preferably 8 (cal/cm$^3$)$^{1/2}$ or more, and more preferably 9 (cal/cm$^3$)$^{1/2}$ or more, and is preferably 15 (cal/cm$^3$)$^{1/2}$ or less, and more preferably 14 (cal/cm$^3$)$^{1/2}$ or less. Examples of the solvent having an SP value falling within the aforementioned range may include cyclic ester compounds such as ethylene carbonate and propylene carbonate; and linear ester compounds such as ethyl methyl carbonate and diethyl carbonate.

[4.3. Method for Producing Lithium Ion Secondary Battery]

The method for producing the lithium ion secondary battery according to the present invention is not particularly limited. For example, the aforementioned negative electrode and positive electrode may be stacked via a separator, and the obtained product may be, for example, wound or folded into a battery shape, and placed in a battery container. Then, an electrolytic solution may be injected into the battery container, and the battery container may be sealed. Furthermore, expanded metal; an overcurrent prevention element such as fuse and PTC element; lead wire plates; and the like may be put in the battery container to prevent pressure increase inside the battery and excessive charging and discharging. Examples of the shape of the battery may include a laminate cell type, a coin type, a button type, a sheet type, a cylindrical type, a rectangle type, and a flat type.

EXAMPLES

The present invention will be specifically described hereinbelow with reference to Examples. However, the present invention is not limited to the following Examples, which can be optionally modified without departing from the scope of claims and equivalents thereto.

In the following description, "%" and "parts" both indicating quantity are based on weight, unless otherwise stated. Furthermore, the operations in the following explanation were performed under the condition of normal temperature and normal pressure, unless otherwise stated.

[I. Description of Examples and Comparative Examples of Group 1]

Examples and Comparative Examples of Group 1 will be described hereinbelow. Examples and Comparative Examples of Group 1 are Examples and Comparative Examples about an adhesive not containing non-conductive fibers.

[Evaluation Method in Examples and Comparative Examples of Group 1]

[I-1. Method for Measuring Volume Change of Cell Before and after High-Temperature Cycle Test]

A lithium ion secondary battery of 800-mAh wound-type cell produced in each of Examples and Comparative Examples was allowed to stand for 24 hours in an environment of 25° C. After that, a charging and discharging operation in which the lithium ion secondary battery was charged to 4.35 V at 0.1 C and discharged to 2.75 V at 0.1 C was performed in an environment of 25° C. This wound-type cell was immersed in liquid paraffin, and the volume $X0$ of the cell was measured.

The charging and discharging operation was repeated for 1,000 cycles in an environment of 60° C. under the same conditions as described above. The wound-type cell after the 1,000 cycle operations was immersed in liquid paraffin, and the volume $X1$ of the cell was measured.

The volume change ratio $\Delta X$ of the cell before and after a high-temperature cycle test in which the charging and discharging were repeated for 1,000 cycles was calculated by $\Delta X (\%)=(X1-X0)/X0 \times 100$. Smaller value of this voltage change ratio $\Delta X$ of the cell is indicative of better ability of suppressing the generation of gas.

[I-2. Method for Measuring Peel Strength Between Porous Membrane and Electrode]

A layered body having a positive electrode and a separator and a layered body having a negative electrode and a separator, which were produced in each of Examples and Comparative Examples, were each cut into a width of 10 mm, to obtain a sample piece. The sample piece was immersed in an electrolytic solution at 60° C. for 3 days. At that time, as the electrolytic solution, a solution in which $LiPF_6$ as a supporting electrolyte was dissolved in a mixed solvent of ethylene carbonate, diethyl carbonate, and vinylene carbonate (volume mixing ratio EC/DEC/VC=68.5/30/1.5; SP value=12.7 $(cal/cm^3)^{1/2}$) at a concentration relative to the solvent of 1 mol/L was used.

The sample piece was then taken out, and the electrolytic solution attached to the surface of the sample piece was wiped off. A cellophane tape was then attached to the surface of the electrode (positive electrode or negative electrode) with the surface of the electrode facing downward. As the cellophane tape, the one defined by JIS Z1522 was used. The cellophane tape was fixed on a horizontal test board. The stress at which the cellophane tape was peeled by pulling an end of the separator vertically upward at a tensile speed of 50 mm/min was then measured. This measurement was performed 3 times for each of the layered body having the positive electrode and the separator and the layered body having the negative electrode and the separator, therefore 6 times in total. The average value of the stresses was calculated and taken as peel strength.

[I-3. Method for Evaluating High-Temperature Cycle Property]

The lithium ion secondary battery of 800-mAh wound-type cell produced in each of Examples and Comparative Examples was allowed to stand for 24 hours in an environment of 25° C. After that, a charging and discharging operation in which the lithium ion secondary battery was charged to 4.35 V at 0.1 C and discharged to 2.75 V at 0.1 C was performed in an environment of 25° C., and initial capacity $C0$ was measured.

Further, the charging and discharging operation was repeated for 1,000 cycles in an environment of 60° C. under the same conditions as described above, and capacity $C1$ after the 1,000 cycle operations was measured.

The capacity keeping ratio $\Delta C$ was calculated by $\Delta C=C1/C0 \times 100(\%)$. Higher value of this capacity keeping ratio $\Delta C$ is indicative of better high-temperature cycle property of the lithium ion secondary battery, and longer lifetime of the battery.

[I-4. Method for Evaluating Blocking Resistance]

The separator produced in each of Examples and Comparative Examples was cut into a square having a width of 5 cm and a length of 5 cm and a square having a width of 4 cm and a length of 4 cm as sample pieces. A sample in which the sample pieces were stacked (non-pressed sample) and a sample in which the sample pieces were stacked and pressurized at 40° C. under a pressure of 10 $g/cm^2$ (pressed sample) were prepared. The samples were each left for 24 hours. The adhesion state (blocking state) between the separators in each sample after the leaving for 24 hours was visually observed, and evaluated in accordance with the following criteria.

A: In a pressed sample, blocking of separators does not occur.

B: In a pressed sample, blocking of separators occurs, but the separators are peeled.

C: In a pressed sample, blocking of separators occurs, and the separators are not peeled.

D: In a non-pressed sample, blocking of separators occurs.

[I-5. Method for Evaluating Low-Temperature Output Property]

The 800-mAh wound-type lithium ion secondary battery produced in each of Examples and Comparative Examples was allowed to stand for 24 hours in an environment of 25° C. After that, the battery was charged at a charging rate of 0.1 C in an environment of 25° C. for 5 hours, and voltage $V0$ at the charging was measured. The battery was then discharged at a discharging rate of 1 C under an environment of −10° C. Fifteen seconds after initiation of discharging, voltage $V1$ was measured.

The voltage change $\Delta V$ was calculated by $\Delta V=V0-V1$. Smaller value of the voltage change $\Delta V$ is indicative of better low-temperature output property.

[I-6. Method for Measuring Swelling Degree of Polymer of Core Portion]

An aqueous dispersion liquid containing a polymer constituting a core portion was produced in the same manner as the method for producing an aqueous dispersion liquid containing a polymer constituting a core portion in Examples and Comparative Examples. This aqueous dispersion liquid was placed in a polytetrafluoroethylene dish, and dried under conditions of 25° C. and 48 hours to produce a film with a thickness of 0.5 mm.

This film was cut into a 1-cm square piece to obtain a sample piece. The weight of this sample piece W0 was measured.

The aforementioned sample piece was immersed in an electrolytic solution at 60° C. for 72 hours. The sample piece was then taken out of the electrolytic solution, and the electrolytic solution on the surface of the sample piece was wiped off, and the weight of the sample piece after the immersion test W1 was measured.

The swelling degree S (times) was calculated using the weights W0 and W1 by S=W1/W0.

At that time, as the electrolytic solution, a solution in which $LiPF_6$ as a supporting electrolyte was dissolved in a mixed solvent of ethylene carbonate, diethyl carbonate, and vinylene carbonate (volume mixing ratio EC/DEC/VC=68.5/30/1.5; SP value=12.7 $(cal/cm^3)^{1/2}$) at a concentration of 1 mol/L relative to the solvent was used.

[I-7. Method for Measuring Swelling Degree of Polymer of Shell Portion]

An aqueous dispersion liquid containing a particulate polymer including a polymer constituting a shell portion was produced in the same manner as a method for producing an aqueous dispersion liquid containing a particulate polymer in Examples and Comparative Examples except that the monomer composition used in production of the shell portion was used in place of the monomer composition used in production of the core portion. The swelling degree S of the polymer of the shell portion was measured in the same manner as the method for measuring the swelling degree of the polymer of the core portion except that the aqueous dispersion liquid containing the particulate polymer including the polymer constituting the shell portion was used as an aqueous dispersion liquid for production of the sample piece.

[I-8. Method for Measuring Average Ratio of Outer Surface of Core Portion Covered with Shell Portion in Particulate Polymer]

The particulate polymer was sufficiently dispersed in a visible light-curable resin ("D-800" available from JEOL Ltd.), and embedded to produce a block piece containing the particulate polymer. The block piece was then cut into a thin section with a thickness of 100 nm by a microtome equipped with a diamond blade, to produce a sample for measurement. The sample for measurement was then subjected to a dyeing treatment using ruthenium tetroxide.

Subsequently, the dyed sample for measurement was placed on a transmission electron microscope ("JEM-3100F" manufactured by JEOL Ltd.) and the cross-sectional structure of the particulate polymer was photographed at an accelerating voltage of 80 kV. The magnification of the electron microscope was set to a magnification at which a cross section of one particle of the particulate polymer was set in a visual field.

In the cross-sectional structure of the photographed particulate polymer, a length D1 of circumference of the core portion, and a length D2 of a portion where the outer surface of the core portion was into contact with the shell portion were measured. A ratio Rc of the outer surface of the core portion covered with the shell portion in the particulate polymer was calculated by the following equation (1).

$$\text{Covering ratio } Rc\ (\%) = D2/D1 \times 100 \quad (1)$$

The aforementioned covering ratios Rc of randomly selected 20 particles of the particulate polymer were measured, and the average thereof was calculated as the average ratio of the outer surface of the core portion covered with the shell portion.

[I-9. Method for Measuring Volume Average Particle Diameter of Particulate Polymer]

The volume average particle diameter of the particulate polymer was defined as a particle diameter at which a cumulative volume calculated from a small-diameter side in a particle diameter distribution measured by a laser diffraction particle diameter distribution measurement device ("SALD-3100" manufactured by Shimadzu Corporation) reached 50%.

[I-10. Method for Measuring Core Shell Ratio]

The average thickness of the shell portion of the particulate polymer was measured by the following procedure.

When the shell portion was composed of polymer particles, the cross-sectional structure of the particulate polymer was observed by a transmission electron microscope in the same manner as described in the section of the method for measuring the average ratio of the outer surface of the core portion covered with the shell portion. From the observed cross-sectional structure of the particulate polymer, the longest diameter of the polymer particles constituting the shell portion was measured. The longest diameters of particles of the polymer constituting the shell portion in randomly selected 20 particles of the particulate polymer were measured by the aforementioned method. The average thereof was taken as the average thickness of the shell portion.

When the shell portion had a shape other than particle shape, the cross-sectional structure of the particulate polymer was observed by a transmission electron microscope in the same manner as described in the section of the method for measuring the average ratio of the outer surface of the core portion covered with the shell portion. From the observed cross-sectional structure of the particulate polymer, the maximum thickness of the shell portion was measured. The maximum thicknesses of shell portions in randomly selected 20 particles of the particulate polymer were measured by the aforementioned method, and the average of the maximum thicknesses was taken as the average thickness of the shell portion.

The core shell ratio was then calculated by dividing the measured average thickness of the shell portion by the volume average particle diameter of the particulate polymer.

[I-11. Method for Evaluating Deposition of Metal on Negative Electrode]

The lithium ion secondary battery of 800-mAh wound-type cell produced in each of Examples and Comparative Examples was allowed to stand for 24 hours in an environment of 25° C. After that, a charging and discharging operation in which the lithium ion secondary battery was charged to 4.35 V at 0.1 C and discharged to 2.75 V at 0.1 C was performed in an environment of 25° C. The charging and discharging operation was repeated for 1,000 cycles in an environment of 60° C. under the same conditions as described above. Subsequently, the battery was disassembled and the negative electrode was taken out, for evaluating the deposition of metal on the negative electrode.

The deposition of metal on the negative electrode was evaluated on the basis of the ratio of cobalt based on weight in the negative electrode by an ICP optical emission spectrophotometer "SPS3000" (manufactured by SII NanoTechnology Inc.).

Large weight of cobalt in the negative electrode is indicative of occurrence of deposition of metal on the negative electrode.

[I-12. Method for Measuring Glass Transition Temperature]

10 mg of measurement sample was weighed in an aluminum pan, and a DSC curve thereof was determined by a differential thermal analysis device ("EXSTAR DSC6220" manufactured by SII NanoTechnology Inc.) at a measurement temperature range of −100° C. to 500° C. and a temperature increasing rate of 10° C./min under normal temperature and normal humidity. At this time, an empty aluminum pan was used as a reference. As a glass transition point, the intersection of a baseline immediately before an endothermic peak of the DSC curve in which a differential signal (DDSC) was 0.05 mW/min/mg or more during the temperature increasing process and a tangent line of the DSC curve at an inflection point that firstly appeared after the endothermic peak was determined.

Example I-1

(I-1-1. Production of Binder for Porous Membrane)

To a reaction vessel equipped with a stirrer, 70 parts of ion-exchanged water, 0.15 parts of sodium laurylsulfate (product name "EMAL 2F" available from Kao Chemicals) as an emulsifier, and 0.5 parts of ammonium persulfate were each supplied, a gas phase was replaced with nitrogen gas, and the temperature was increased to 60° C.

In another container, 50 parts of ion-exchanged water, 0.5 parts of sodium dodecylbenzenesulfonate as a dispersant, and 94 parts of butyl acrylate, 2 parts of acrylonitrile, 2 parts of methacrylic acid, 1 part of N-methylolacrylamide, and 1 part of acrylamide as polymerizable monomers were mixed to obtain a monomer mixture. This monomer mixture was continuously added to the aforementioned reaction vessel over 4 hours, to perform polymerization. During the addition, the reaction was performed at 60° C. After completion of the addition, the mixture was further stirred at 70° C. for 3 hours, and the reaction was terminated. Thus, an aqueous dispersion liquid containing an acrylic polymer as the binder for a porous membrane was produced.

The volume average particle diameter D50 of the obtained acrylic polymer was 0.36 μm. The glass transition temperature was −45° C.

(I-1-2. Production of Slurry for Porous Membrane)

As non-conductive particles, alumina particles (product name "AKP-3000" available from Sumitomo Chemical Co., Ltd., volume average particle diameter D50=0.45 μm, tetrapod-shaped particles) were prepared.

As a water-soluble polymer, carboxymethyl cellulose having a etherification degree of 0.8 to 1.0 (product name "Daicel 1220" available from Daicel FineChem Ltd.) was prepared. The viscosity of 1% aqueous solution of this water-soluble polymer was 10 mPa·s to 20 mPa·s.

100 parts of the non-conductive particles and 1.5 parts of the water-soluble polymer were mixed. To the mixture, ion-exchanged water was added so that the solid content concentration was 40% by weight. Thus, the non-conductive particles were dispersed. To the mixture, 6 parts in terms of solid content of the aforementioned aqueous dispersion liquid containing the acrylic polymer as a binder for a porous membrane and 0.2 parts of polyethylene glycol-based surfactant (product name "SN WET 366" available from SAN NOPCO Limited) as a leveling agent were added to produce a slurry for a porous membrane.

(I-1-3. Production of Particulate Polymer)

In a 5-MPa pressure-resistant container equipped with a stirrer, 75 parts of methyl methacrylate, 4 parts of methacrylic acid, and 1 part of ethylene dimethacrylate as a monomer composition used in production of a core portion; 1 part of sodium dodecylbenzenesulfonate as an emulsifier; 150 parts of ion-exchanged water; and 0.5 parts of potassium persulfate as a polymerization initiator were charged, and sufficiently stirred. After that, the mixture was heated to 60° C. to initiate polymerization. The polymerization was continued until the polymerization conversion ratio reached 96%. Thus, an aqueous dispersion liquid containing a particulate polymer constituting the core portion was obtained.

Subsequently, this aqueous dispersion liquid was heated to 70° C. 20 parts of styrene as a monomer composition used in production of a shell portion was continuously supplied for 30 minutes to the aforementioned aqueous dispersion liquid, and the polymerization was continued. When the polymerization conversion ratio reached 96%, the reaction was stopped by cooling. Thus, an aqueous dispersion liquid containing a particulate polymer was produced. The volume average particle diameter D50 of the obtained particulate polymer was 0.45 μm. A cross section of the obtained particulate polymer was observed, and it was found that the shell portion was composed of particles of the polymer. Regarding the obtained particulate polymer, a core shell ratio and the average ratio of the outer surface of the core portion covered with the shell portion were measured by the aforementioned methods.

(I-1-4. Production of Adhesive)

100 parts in terms of solid content of the aforementioned aqueous dispersion liquid containing the particulate polymer, 6 parts in terms of solid content of the aforementioned aqueous dispersion liquid containing the acrylic polymer produced as the binder a porous membrane as a binder for an adhesive layer, and 0.5 parts of carboxymethyl cellulose having a etherification degree of 0.8 to 1.0 (product name "Daicel 1200" available from Daicel FineChem Ltd.) were mixed. To the mixture, ion-exchanged water was added so that the solid content concentration became 20%, to obtain an adhesive in a slurry form.

(I-1-5. Production of Separator)

An organic porous substrate made of polyethylene (thickness: 16 μm, Gurley value: 210 s/100 cc) was prepared as a separator substrate. The aforementioned slurry for a porous membrane was applied onto both faces of the prepared separator substrate, and dried at 50° C. for 3 minutes to form a porous membrane on both the faces of the separator substrate. The thickness of the porous membrane per layer was 3 μm.

Subsequently, the aforementioned adhesive in a slurry form was applied onto each porous membrane by a spray-coating method, and dried at 50° C. for 1 minute. Thus, an adhesive layer having a thickness of 2 μm per layer was formed on the porous membrane, to obtain a separator. This separator had the adhesive layer, the porous membrane, the separator substrate, the porous membrane, and the adhesive layer in this order.

The blocking resistance of this separator was evaluated by the aforementioned method.

(I-1-6. Production of Particulate Binder for Negative Electrode)

In a 5-MPa pressure-resistant container equipped with a stirrer, 33.5 parts of 1,3-butadiene, 3.5 parts of itaconic acid, 62 parts of styrene, 1 part of 2-hydroxyethyl acrylate, 0.4 parts of sodium dodecylbenzenesulfonate as an emulsifier, 150 parts of ion-exchanged water, and 0.5 parts of potassium persulfate as a polymerization initiator were charged, sufficiently stirred, and then heated to 50° C. to initiate polymerization. When the polymerization conversion ratio reached 96%, the reaction was stopped by cooling. Thus, a mixture containing a particulate binder (SBR) was obtained. To the aforementioned mixture containing the particulate binder, a 5% sodium hydroxide aqueous solution was added to adjust the pH to 8. After that, unreacted monomers were removed from the aforementioned mixture by distillation under heating and reduced pressure, and the residue was cooled to 30° C. or lower to obtain an aqueous dispersion liquid containing the desired particulate binder.

(I-1-7. Production of Slurry Composition for Negative Electrode)

100 parts of artificial graphite (volume average particle diameter: 15.6 μm) and 1 part in terms of solid content of a 2% aqueous solution of carboxymethyl cellulose sodium salt ("MAC350HC" available from Nippon Paper Industries Co., Ltd.) as a thickener were mixed. To the mixture, ion-exchanged water was further added to adjust the solid content concentration to 68%. The mixture was mixed at 25° C. for 60 minutes. To the thus obtained mixture, ion-exchanged water was added to adjust the solid content concentration to 62%. The mixture was further mixed at 25° C. for 15 minutes. To this mixture, 1.5 parts in terms of solid content of the aforementioned aqueous dispersion liquid containing the particulate binder was added, and ion-exchanged water was further added to adjust the final solid content concentration to 52%. The mixture was further mixed for 10 minutes. This mixture was defoamed under reduced pressure to obtain a slurry for a negative electrode having good fluidity.

(I-1-8. Production of Negative Electrode)

The aforementioned slurry for a negative electrode was applied onto copper foil having a thickness of 20 μm as a current collector by a comma coater so that a film thickness after drying was about 150 μm, and dried. This drying was performed by conveying the copper foil at a speed of 0.5 m/min in an oven at 60° C. over 2 minutes. The copper foil was then heat-treated at 120° C. for 2 minutes to obtain an unpressed raw material for a negative electrode. The unpressed raw material for a negative electrode was rolled by a roll press to obtain a pressed negative electrode having a negative electrode active material layer with a thickness of 80 μm.

(I-1-9. Production of Slurry for Positive Electrode)

100 Parts of $LiCoO_2$ having a volume average particle diameter of 12 μm as a positive electrode active material, 2 parts of acetylene black (product name "HS-100" available from Denki Kagaku Kogyo Kabushiki Kaisha) as a conductive material, and 2 parts in terms of solid content of polyvinylidene fluoride as a binder for a positive electrode (product name "#7208" available from Kureha Corporation) were mixed. To the mixture, N-methylpyrrolidone was added to adjust the total solid content concentration to 70%. The mixture was mixed by a planetary mixer to obtain a slurry for a positive electrode.

(I-1-10. Production of Positive Electrode)

The aforementioned slurry for a positive electrode was applied onto aluminum foil having a thickness of 20 μm as a current collector by a comma coater so that a film thickness after drying was about 150 μm, and dried. This drying was performed by conveying the aluminum foil at a speed of 0.5 m/min in an oven at 60° C. over 2 minutes. The aluminum foil was then heat-treated at 120° C. for 2 minutes to obtain an unpressed raw material for a positive electrode. The unpressed raw material for a positive electrode was rolled by a roll press to obtain a positive electrode.

(I-1-11. Production of Layered Body Having Positive Electrode and Separator and Layered Body Having Negative Electrode and Separator)

The aforementioned positive electrode was cut into a disc form with a diameter of 13 mm to obtain a disc positive electrode. The aforementioned negative electrode was cut into a disc form with a diameter of 14 mm to obtain a disc negative electrode. The aforementioned separator was cut into a disc form with a diameter of 18 mm to obtain a disc separator.

On a face of the disc separator, the negative electrode alone or the positive electrode alone was placed in a direction in which the face on an electrode active material layer side was in contact with the separator. After that, the separator and the positive electrode, and the separator and the negative electrode were subjected to a heat-pressing treatment at a temperature of 80° C. and a pressure of 0.5 MPa for 10 seconds, so that the positive electrode and the negative electrode were each pressure-bonded to the separator. Thus, a layered body having the positive electrode and the separator and a layered body having the negative electrode and the separator were obtained. The peel strength of the porous membrane and the electrode was measured using these layered bodies by the aforementioned method.

(I-1-12. Production of Lithium Ion Secondary Battery)

The pressed positive electrode was cut into 49×5 $cm^2$. The separator was cut into 55×5.5 $cm^2$, and disposed on a positive electrode active material layer of the cut positive electrode. The pressed negative electrode was cut into a rectangle of 50×5.2 $cm^2$, and the cut negative electrode was disposed on the aforementioned separator on an opposite side of the positive electrode so that the surface on the negative electrode active material layer side faces to the separator. This stacked body was wound by a winding device to obtain a wound body. This wound body was pressed at 60° C. and 0.5 MPa to form a flat body. This flat body was packaged with an outer package made of an aluminum packing material as an outer package of a battery. An electrolytic solution (solvent: EC/DEC/VC=68.5/30/1.5 (by volume), electrolyte: $LiPF_6$ in a concentration of 1 M) was injected thereinto so as not to include remaining air therein. The aluminum outer package was closed by heat sealing at 150° C. so as to seal an opening of the aluminum packing material. Thus, a 800-mAh wound-type lithium ion secondary battery was produced.

Regarding the thus obtained lithium ion secondary battery, the volume change of cell before and after the high-temperature cycle test, the high-temperature cycle property, the low-temperature output property, and the deposition of metal on the negative electrode were evaluated by the aforementioned methods.

Example I-2

In the monomer composition used in production of the core portion in the aforementioned step (I-1-3), the amount of methyl methacrylate was changed to 75.85 parts and the amount of ethylene dimethacrylate was changed to 0.15 parts.

A lithium ion secondary battery was produced and evaluated in the same manner as in Example I-1 except for the aforementioned matters.

Example I-3

In the monomer composition used in production of the core portion in the aforementioned step (I-1-3), the amount of methyl methacrylate was changed to 71.5 parts and the amount of ethylene dimethacrylate was changed to 4.5 parts.

A lithium ion secondary battery was produced and evaluated in the same manner as in Example I-1 except for the aforementioned matters.

Example I-4

In the monomer composition used in production of the core portion in the aforementioned step (I-1-3), the amount of methyl methacrylate was changed to 75.95 parts and the amount of ethylene dimethacrylate was changed to 0.05 parts.

A lithium ion secondary battery was produced and evaluated in the same manner as in Example I-1 except for the aforementioned matters.

Example I-5

In the monomer composition used in production of the core portion in the aforementioned step (I-1-3), a combination of 55 parts of methyl methacrylate and 20 parts of 2-ethylhexyl acrylate was used in place of 75 parts of methyl methacrylate.

A lithium ion secondary battery was produced and evaluated in the same manner as in Example I-1 except for the aforementioned matters.

Example I-6

In the monomer composition used in production of the core portion in the aforementioned step (I-1-3), 75 parts of acrylonitrile was used in place of 75 parts of methyl methacrylate.

A lithium ion secondary battery was produced and evaluated in the same manner as in Example I-1 except for the aforementioned matter.

Example I-7

In the monomer composition used in production of the core portion in the aforementioned step (I-1-3), a combination of 65 parts of acrylonitrile and 10 parts of 2-ethylhexyl acrylate was used in place of 75 parts of methyl methacrylate.

A lithium ion secondary battery was produced and evaluated in the same manner as in Example I-1 except for the aforementioned matters.

Example I-8

In the monomer composition used in production of the core portion in the aforementioned step (I-1-3), 72 parts of acrylonitrile was used in place of 75 parts of methyl methacrylate and the amount of ethylene dimethacrylate was changed to 4.0 parts.

A lithium ion secondary battery was produced and evaluated in the same manner as in Example I-1 except for the aforementioned matters.

Example I-9

In the monomer composition used in production of the shell portion in the aforementioned step (I-1-3), a combination of 10 parts of styrene and 10 parts of acrylonitrile was used in place of 20 parts of styrene.

A lithium ion secondary battery was produced and evaluated in the same manner as in Example I-1 except for the aforementioned matters.

Example I-10

In the monomer composition used in production of the shell portion in the aforementioned step (I-1-3), a combination of 5 parts of styrene and 15 parts of acrylonitrile was used in place of 20 parts of styrene.

A lithium ion secondary battery was produced and evaluated in the same manner as in Example I-1 except for the aforementioned matters.

Example I-11

In the monomer composition used in production of the shell portion in the aforementioned step (I-1-3), 20 parts of sodium salt of styrenesulfonic acid was used in place of 20 parts of styrene.

A lithium ion secondary battery was produced and evaluated in the same manner as in Example I-1 except for the aforementioned matter.

Example I-12

In the monomer composition used in production of the shell portion in the aforementioned step (I-1-3), a combination of 15 parts of sodium salt of styrenesulfonic acid and 5 parts of acrylonitrile was used in place of 20 parts of styrene.

A lithium ion secondary battery was produced and evaluated in the same manner as in Example I-1 except for the aforementioned matters.

Example I-13

In the monomer composition used in production of the core portion in the aforementioned step (I-1-3), the amount of methyl methacrylate was changed to 72.5 parts and ethylene dimethacrylate was not used.

Furthermore, in the monomer composition used in production of the shell portion in the aforementioned step (I-1-3), 3.5 parts of ethylene dimethacrylate was used in addition to 20 parts of styrene.

A lithium ion secondary battery was produced and evaluated in the same manner as in Example I-1 except for the aforementioned matters.

Example I-14

In the monomer composition used in production of the core portion in the aforementioned step (I-1-3), the amount of methyl methacrylate was changed to 90 parts.

Furthermore, in the monomer composition used in production of the shell portion in the aforementioned step (I-1-3), the amount of styrene was changed to 5 parts.

A lithium ion secondary battery was produced and evaluated in the same manner as in Example I-1 except for the aforementioned matters.

Example I-15

In the monomer composition used in production of the core portion in the aforementioned step (I-1-3), the amount of methyl methacrylate was changed to 52.5 parts and the amount of ethylene dimethacrylate was changed to 3.5 parts.

Furthermore, in the monomer composition used in production of the shell portion in the aforementioned step (I-1-3), the amount of styrene was changed to 40 parts.

A lithium ion secondary battery was produced and evaluated in the same manner as in Example I-1 except for the aforementioned matters.

Example I-16

In the aforementioned step (I-1-5), the applied amount of the adhesive slurry was changed, thereby changing the thickness of the adhesive layer to 0.5 µm per layer.

A lithium ion secondary battery was produced and evaluated in the same manner as in Example I-1 except for the aforementioned matter.

Example I-17

In the aforementioned step (I-1-5), the applied amount of the adhesive slurry was changed, thereby changing the thickness of the adhesive layer to 4 μm per layer.

A lithium ion secondary battery was produced and evaluated in the same manner as in Example I-1 except for the aforementioned matter.

Example I-18

In the aforementioned step (I-1-5), the separator substrate was changed to an organic porous substrate made of polypropylene (thickness: 15 μm, Gurley value: 560 s/100 cc).

A lithium ion secondary battery was produced and evaluated in the same manner as in Example I-1 except for the aforementioned matter.

Example I-19

In the aforementioned step (I-1-5), the separator substrate was changed to nonwoven fabric made of cellulose (thickness: 25 μm, Gurley value: 0.03 s/100 cc).

A lithium ion secondary battery was produced and evaluated in the same manner as in Example I-1 except for the aforementioned matter.

Example I-20

In the aforementioned step (I-1-3), the amount of sodium dodecylbenzenesulfonate as the emulsifier was changed to 2 parts.

A lithium ion secondary battery was produced and evaluated in the same manner as in Example I-1 except for the aforementioned matter.

Example I-21

In the aforementioned step (I-1-3), the amount of sodium dodecylbenzenesulfonate as the emulsifier was changed to 0.5 parts.

A lithium ion secondary battery was produced and evaluated in the same manner as in Example I-1 except for the aforementioned matter.

Example I-22

In the aforementioned step (I-1-4), 50 parts of alumina particles which were the same as those used in the slurry for a porous membrane in Example I-1 was added to the adhesive slurry.

A lithium ion secondary battery was produced and evaluated in the same manner as in Example I-1 except for the aforementioned matter.

Example I-23

In the aforementioned step (I-1-2), polystyrene particles (volume average particle diameter: 0.45 μm) was used in place of alumina particles.

Further, in the aforementioned step (I-1-4), 50 parts of the aforementioned polystyrene particles was added to the adhesive slurry.

A lithium ion secondary battery was produced and evaluated in the same manner as in Example I-1 except for the aforementioned matters.

Example I-24

In the monomer composition used in production of the shell portion in the aforementioned step (I-1-3), a combination of 19 parts of styrene and 1 part of methacrylic acid was used in place of 20 parts of styrene.

A lithium ion secondary battery was produced and evaluated in the same manner as in Example I-1 except for the aforementioned matters.

Example I-25

In the aforementioned step (I-1-4), 0.05 parts of a polyethylene glycol-based surfactant (product name "SN WET 366" available from SAN NOPCO Limited) as a leveling agent was further added to the adhesive slurry.

A lithium ion secondary battery was produced and evaluated in the same manner as in Example I-1 except for the aforementioned matter.

Example I-26

In the aforementioned step (I-1-4), 1.0 part of the polyethylene glycol-based surfactant (product name "SN WET 366" available from SAN NOPCO Limited) as a leveling agent was further added to the adhesive slurry.

A lithium ion secondary battery was produced and evaluated in the same manner as in Example I-1 except for the aforementioned matter.

Example I-27

In the aforementioned step (I-1-7), a combination of 90 parts of artificial graphite and 10 parts of silicon oxide ("KSC-1064" available from Shin-Etsu Chemical Co., Ltd.) was used in place of 100 parts of artificial graphite.

A lithium ion secondary battery was produced and evaluated in the same manner as in Example I-1 except for the aforementioned matters.

Example I-28

In the aforementioned step (I-1-7), a combination of 70 parts of artificial graphite and 30 parts of silicon oxide ("KSC-1064" available from Shin-Etsu Chemical Co., Ltd.) was used in place of 100 parts of artificial graphite.

A lithium ion secondary battery was produced and evaluated in the same manner as in Example I-1 except for the aforementioned matters.

Example I-29

In the monomer composition used in production of the core portion in the aforementioned step (I-1-3), 79 parts of acrylonitrile was used in place of 75 parts of methyl methacrylate and 4 parts of methacrylic acid.

A lithium ion secondary battery was produced and evaluated in the same manner as in Example I-1 except for the aforementioned matters.

Comparative Example I-1

In the aforementioned step (I-1-5), an NMP solution of polyvinylidene fluoride (concentration: 12% by weight) was used in place of the adhesive to form a polyvinylidene fluoride layer with a thickness of 2 μm per layer on the porous membrane in place of the adhesive layer.

A lithium ion secondary battery was produced and evaluated in the same manner as in Example I-1 except for the aforementioned matters.

Comparative Example I-2

In the monomer composition used in production of the core portion in the aforementioned step (I-1-3), the amount of methyl methacrylate was changed to 70 parts, the amount of methacrylic acid was changed to 5 parts, and 25 parts of acrylonitrile was used in place of ethylene dimethacrylate.

Furthermore, the monomer composition used in production of the shell portion was not added in the aforementioned step (I-1-3).

In the aforementioned step (I-1-4), 50 parts of alumina particles which were the same as those used in the slurry for a porous membrane in Example I-1 was added to the adhesive slurry.

A lithium ion secondary battery was produced and evaluated in the same manner as in Example I-1 except for the aforementioned matters.

Comparative Example I-3

In the aforementioned step (I-1-4), 100 parts of an aqueous dispersion liquid containing polystyrene particles (volume average particle diameter of the polystyrene particles: 45 μm) was used in place of the aqueous dispersion liquid of the particulate polymer.

A lithium ion secondary battery was produced and evaluated in the same manner as in Example I-1 except for the aforementioned matter.

Comparative Example I-4

In the monomer composition used in production of the core portion in the aforementioned step (I-1-3), 60 parts of 2-ethylhexyl acrylate, 15 parts of styrene, and 5 parts of methacrylic acid were used in place of 75 parts of methyl methacrylate, 4 parts of methacrylic acid, and 1 part of ethylene dimethacrylate.

A lithium ion secondary battery was produced and evaluated in the same manner as in Example I-1 except for the aforementioned matters.

Comparative Example I-5

In the monomer composition used in production of the core portion in the aforementioned step (I-1-3), 50 parts of methyl methacrylate, 25 parts of acrylonitrile, and 5 parts of methacrylic acid were used in place of 75 parts of methyl methacrylate, 4 parts of methacrylic acid, and 1 part of ethylene dimethacrylate.

A lithium ion secondary battery was produced and evaluated in the same manner as in Example I-1 except for the aforementioned matters.

Comparative Example I-6

In the monomer composition used in production of the core portion in the aforementioned step (I-1-3), 50 parts of methyl methacrylate, 25 parts of 2-ethylhexyl acrylate, and 5 parts of methacrylic acid were used in place of 75 parts of methyl methacrylate, 4 parts of methacrylic acid, and 1 part of ethylene dimethacrylate.

Furthermore, in the monomer composition used in production of the shell portion in the aforementioned step (I-1-3), 20 parts of acrylonitrile was used in place of 20 parts of styrene.

A lithium ion secondary battery was produced and evaluated in the same manner as in Example I-1 except for the aforementioned matters.

Comparative Example I-7

In a 5-MPa pressure-resistant container equipped with a stirrer, 75 parts of methyl methacrylate, 4 parts of methacrylic acid, and 1 part of ethylene dimethacrylate as a monomer composition used in production of the core portion; 1 part of sodium dodecylbenzenesulfonate as an emulsifier; 150 parts of ion-exchanged water; and 0.5 parts of potassium persulfate as a polymerization initiator were charged, and sufficiently stirred. After that, the mixture was heated to 60° C. to initiate polymerization. The polymerization was continued until the polymerization conversion ratio reached 96%. Thus, an aqueous dispersion liquid containing a particulate polymer was obtained. The obtained particulate polymer was the same as the particulate polymer constituting the core portion in Example I-1. This particulate polymer is referred to hereinbelow as a core polymer as appropriate.

In another 5-MPa pressure-resistant container equipped with a stirrer, 1 part of sodium dodecylbenzenesulfonate as an emulsifier; 150 parts of ion-exchanged water; and 0.5 parts of potassium persulfate as a polymerization initiator were charged, and sufficiently stirred. The reaction liquid in the pressure-resistant container was heated to 60° C., and 20 parts of styrene was continuously supplied as a monomer composition over 30 minutes, to thereby perform polymerization. The polymerization was continued until the polymerization conversion ratio reached 96%. Thus, an aqueous dispersion liquid containing a particulate polymer was obtained. The obtained particulate polymer was a particulate polymer composed of the same polymer as the polymer of the shell portion in Example I-1. This particulate polymer is referred to hereinbelow as shell polymer as appropriate.

The total amount of the aqueous dispersion liquid containing the particulate core polymer and the total amount of the aqueous dispersion liquid containing the particulate shell polymer were mixed to obtain a mixed dispersion liquid.

The lithium ion secondary battery was produced and evaluated in the same manner as in Example I-1 except that this mixed dispersion liquid was used in place of the aqueous dispersion liquid of the particulate polymer for an adhesive.

[Results]

Results in Examples and Comparative Examples of Group 1 described above are shown in the following Tables. Abbreviations in the following Tables mean as follows. In the following Tables, each value written next to the abbreviation of each monomer in a section of the monomer represents the amount of the monomer by parts by weight.

PE: polyethylene

PP: polypropylene

PST: polystyrene

BA: butyl acrylate

AN: acrylonitrile

MAA: methacrylic acid

NMA: N-methylolacrylamide

AAm: acrylamide

EDMA: ethylene dimethacrylate

MMA: methyl methacrylate

2-EHA: 2-ethylhexyl acrylate

Tg: glass transition temperature

ST: styrene

NaSS: sodium salt of styrenesulfonic acid

"Core shell ratio": ratio of average thickness of shell portion relative to volume average particle diameter of particulate polymer MV: volume average particle diameter "Covering ratio": average ratio of outer surface of core portion covered with the shell portion PVDF: polyvinylidene fluoride

TABLE 1

[Constitution of Examples I-1 to I-4]

|  |  |  | Ex. I-1 | Ex. I-2 | Ex. I-3 | Ex. I-4 |
|---|---|---|---|---|---|---|
| Negative electrode active material |  |  | Graphite | Graphite | Graphite | Graphite |
| Separator substrate | Material |  | PE | PE | PE | PE |
|  | Form |  | Porous substrate | Porous substrate | Porous substrate | Porous substrate |
| Porous membrane | Non-conductive particles |  | $Al_2O_3$ | $Al_2O_3$ | $Al_2O_3$ | $Al_2O_3$ |
|  | Binder | Monomer | BA 94<br>AN 2<br>MAA 2<br>NMA 1<br>AAm 1 | BA 94<br>AN 2<br>MAA 2<br>NMA 1<br>AAm 1 | BA 94<br>AN 2<br>MAA 2<br>NMA 1<br>AAm 1 | BA 94<br>AN 2<br>MAA 2<br>NMA 1<br>AAm 1 |
|  |  | Amount | 6 parts | 6 parts | 6 parts | 6 parts |
|  | Water-soluble polymer | Type | Daicel 1220 | Daicel 1220 | Daicel 1220 | Daicel 1220 |
|  |  | Amount | 1.5 parts | 1.5 parts | 1.5 parts | 1.5 parts |
| Adhesive layer |  |  |  |  |  |  |
| Particulate polymer | Cross-linkable monomer unit | Type | EDMA | EDMA | EDMA | EDMA |
|  |  | Amount | 1 wt % | 0.15 wt % | 4.5 wt % | 0.05 wt % |
|  | Core portion | Swelling degree | 9.6 times | 19.5 times | 5.2 times | 28.5 times |
|  |  | Monomer | MMA 75<br>MAA 4<br>EDMA 1 | MMA 75.85<br>MAA 4<br>EDMA 0.15 | MMA 71.5<br>MAA 4<br>EDMA 4.5 | MMA 75.95<br>MAA 4<br>EDMA 0.05 |
|  |  | Tg | 70° C. | 71° C. | 69° C. | 71° C. |
|  | Shell portion | Swelling degree | 1.3 times | 1.3 times | 1.3 times | 1.3 times |
|  |  | Monomer | ST 20 | ST 20 | ST 20 | ST 20 |
|  |  | Tg | 100° C. | 100° C. | 100° C. | 100° C. |
|  | Core shell Ratio |  | 10% | 10% | 10% | 10% |
|  | MV |  | 0.45 μm | 0.45 μm | 0.45 μm | 0.45 μm |
|  | Covering ratio |  | 65% | 64% | 64% | 61% |
|  | Shell portion constitution |  | Fine particles | Fine particles | Fine particles | Fine particles |
| Binder for Adhesive layer | Monomer |  | BA 94<br>AN 2<br>MAA 2<br>NMA 1<br>AAm 1 | BA 94<br>AN 2<br>MAA 2<br>NMA 1<br>AAm 1 | BA 94<br>AN 2<br>MAA 2<br>NMA 1<br>AAm 1 | BA 94<br>AN 2<br>MAA 2<br>NMA 1<br>AAm 1 |
|  | Amount |  | 6 parts | 6 parts | 6 parts | 6 parts |
| Particles |  |  | — | — | — | — |
| Water-soluble polymer | Type |  | Daicel 1220 | Daicel 1220 | Daicel 1220 | Daicel 1220 |
|  | Amount |  | 0.5 part | 0.5 part | 0.5 part | 0.5 part |
| Optional component |  |  | — | — | — | — |
| Thickness |  |  | 2 μm | 2 μm | 2 μm | 2 μm |

TABLE 2

[Constitution of Examples I-5 to I-8]

|  |  | Ex. I-5 | Ex. I-6 | Ex. I-7 | Ex. I-8 |
|---|---|---|---|---|---|
| Negative electrode active material |  | Graphite | Graphite | Graphite | Graphite |
| Separator substrate | Material | PE | PE | PE | PE |
|  | Form | Porous substrate | Porous substrate | Porous substrate | Porous substrate |

TABLE 2-continued

[Constitution of Examples I-5 to I-8]

| | | | Ex. I-5 | Ex. I-6 | Ex. I-7 | Ex. I-8 |
|---|---|---|---|---|---|---|
| Porous membrane | Non-conductive particles | | Al₂O₃ | Al₂O₃ | Al₂O₃ | Al₂O₃ |
| | Binder | Monomer | BA 94 | BA 94 | BA 94 | BA 94 |
| | | | AN 2 | AN 2 | AN 2 | AN 2 |
| | | | MAA 2 | MAA 2 | MAA 2 | MAA 2 |
| | | | NMA 1 | NMA 1 | NMA 1 | NMA 1 |
| | | | AAm 1 | AAm 1 | AAm 1 | AAm 1 |
| | | Amount | 6 parts | 6 parts | 6 parts | 6 parts |
| | Water-soluble polymer | Type | Daicel 1220 | Daicel 1220 | Daicel 1220 | Daicel 1220 |
| | | Amount | 1.5 parts | 1.5 parts | 1.5 parts | 1.5 parts |
| Adhesive layer | | | | | | |
| Particulate polymer | Cross-linkable monomer unit | Type | EDMA | EDMA | EDMA | EDMA |
| | | Amount | 1 wt % | 1 wt % | 1 wt % | 4.0 wt % |
| | Core portion | Swelling degree | 6.5 times | 8.8 times | 7.1 times | 4.4 times |
| | | Monomer | MMA 55 | AN 75 | AN 65 | AN 72 |
| | | | 2-EHA 20 | MAA 4 | 2-EHA 10 | MAA 4 |
| | | | MAA 4 | EDMA 1 | MAA 4 | EDMA 4.0 |
| | | | EDMA 1 | | EDMA 1 | |
| | | Tg | 35° C. | 55° C. | 47° C. | 43° C. |
| | Shell portion | Swelling degree | 1.3 times | 1.3 times | 1.3 times | 1.3 times |
| | | Monomer | ST 20 | ST 20 | ST 20 | ST 20 |
| | | Tg | 100° C. | 100° C. | 100° C. | 100° C. |
| | Core shell Ratio | | 10% | 10% | 10% | 10% |
| | MV | | 0.45 μm | 0.45 μm | 0.45 μm | 0.45 μm |
| | Covering ratio | | 55% | 56% | 58% | 58% |
| | Shell portion constitution | | Fine particles | Fine particles | Fine particles | Fine particles |
| Binder for Adhesive layer | Monomer | | BA 94 | BA 94 | BA 94 | BA 94 |
| | | | AN 2 | AN 2 | AN 2 | AN 2 |
| | | | MAA 2 | MAA 2 | MAA 2 | MAA 2 |
| | | | NMA 1 | NMA 1 | NMA 1 | NMA 1 |
| | | | AAm 1 | AAm 1 | AAm 1 | AAm 1 |
| | Amount | | 6 parts | 6 parts | 6 parts | 6 parts |
| Particles | | | — | — | — | — |
| Water-soluble polymer | Type | | Daicel 1220 | Daicel 1220 | Daicel 1220 | Daicel 1220 |
| | Amount | | 0.5 part | 0.5 part | 0.5 part | 0.5 part |
| Optional component | | | — | — | — | — |
| Thickness | | | 2 μm | 2 μm | 2 μm | 2 μm |

TABLE 3

[Constitution of Examples I-9 to I-12]

| | | | Ex. I-9 | Ex. I-10 | Ex. I-11 | Ex. I-12 |
|---|---|---|---|---|---|---|
| Negative electrode active material | | | Graphite | Graphite | Graphite | Graphite |
| Separator substrate | Material | | PE | PE | PE | PE |
| | Form | | Porous substrate | Porous substrate | Porous substrate | Porous substrate |
| Porous membrane | Non-conductive particles | | Al₂O₃ | Al₂O₃ | Al₂O₃ | Al₂O₃ |
| | Binder | Monomer | BA 94 | BA 94 | BA 94 | BA 94 |
| | | | AN 2 | AN 2 | AN 2 | AN 2 |
| | | | MAA 2 | MAA 2 | MAA 2 | MAA 2 |
| | | | NMA 1 | NMA 1 | NMA 1 | NMA 1 |
| | | | AAm 1 | AAm 1 | AAm 1 | AAm 1 |

TABLE 3-continued

[Constitution of Examples I-9 to I-12]

|  |  |  | Ex. I-9 | Ex. I-10 | Ex. I-11 | Ex. I-12 |
|---|---|---|---|---|---|---|
|  |  | Amount | 6 parts | 6 parts | 6 parts | 6 parts |
|  | Water-soluble polymer | Type | Daicel 1220 | Daicel 1220 | Daicel 1220 | Daicel 1220 |
|  |  | Amount | 1.5 parts | 1.5 parts | 1.5 parts | 1.5 parts |
| Adhesive layer |  |  |  |  |  |  |
| Particulate polymer | Cross-linkable monomer unit | Type | EDMA | EDMA | EDMA | EDMA |
|  |  | Amount | 1 wt % | 1 wt % | 1 wt % | 1 wt % |
|  | Core portion | Swelling degree | 9.6 times | 9.6 times | 9.6 times | 9.6 times |
|  |  | Monomer | MMA 75 MAA 4 EDMA 1 | MMA 75 MAA 4 EDMA 1 | MMA 75 MAA 4 EDMA 1 | MMA 75 MAA 4 EDMA 1 |
|  |  | Tg | 70° C. | 70° C. | 70° C. | 70° C. |
|  | Shell portion | Swelling degree | 2.7 times | 3.5 times | 1.7 times | 2.1 times |
|  |  | Monomer | ST 10 AN 10 | ST 5 AN 15 | NaSS 20 | NaSS 15 AN 5 |
|  |  | Tg | 101° C. | 102° C. | 80° C. | 82° C. |
|  | Core shell Ratio |  | 10% | 10% | 10% | 10% |
|  | MV |  | 0.45 μm | 0.45 μm | 0.45 μm | 0.45 μm |
|  | Covering ratio |  | 61% | 60% | 37% | 44% |
|  | Shell portion constitution |  | Fine particles | Fine particles | Fine particles | Fine particles |
| Binder for Adhesive layer | Monomer |  | BA 94 AN 2 MAA 2 NMA 1 AAm 1 | BA 94 AN 2 MAA 2 NMA 1 AAm 1 | BA 94 AN 2 MAA 2 NMA 1 AAm 1 | BA 94 AN 2 MAA 2 NMA 1 AAm 1 |
|  | Amount |  | 6 parts | 6 parts | 6 parts | 6 parts |
| Particles |  |  | — | — | — | — |
| Water-soluble polymer | Type |  | Daicel 1220 | Daicel 1220 | Daicel 1220 | Daicel 1220 |
|  | Amount |  | 0.5 part | 0.5 part | 0.5 part | 0.5 part |
| Optional component |  |  | — | — | — | — |
| Thickness |  |  | 2 μm | 2 μm | 2 μm | 2 μm |

TABLE 4

[Constitution of Examples I-13 to I-16]

|  |  |  | Ex. I-13 | Ex. I-14 | Ex. I-15 | Ex. I-16 |
|---|---|---|---|---|---|---|
| Negative electrode active material |  |  | Graphite | Graphite | Graphite | Graphite |
| Separator substrate | Material |  | PE | PE | PE | PE |
|  | Form |  | Porous substrate | Porous substrate | Porous substrate | Porous substrate |
| Porous membrane | Non-conductive particles |  | $Al_2O_3$ | $Al_2O_3$ | $Al_2O_3$ | $Al_2O_3$ |
|  | Binder | Monomer | BA 94 AN 2 MAA 2 NMA 1 AAm 1 | BA 94 AN 2 MAA 2 NMA 1 AAm 1 | BA 94 AN 2 MAA 2 NMA 1 AAm 1 | BA 94 AN 2 MAA 2 NMA 1 AAm 1 |
|  |  | Amount | 6 parts | 6 parts | 6 parts | 6 parts |
|  | Water-soluble polymer | Type | Daicel 1220 | Daicel 1220 | Daicel 1220 | Daicel 1220 |
|  |  | Amount | 1.5 parts | 1.5 parts | 1.5 parts | 1.5 parts |
| Adhesive layer |  |  |  |  |  |  |
| Particulate polymer | Cross-linkable monomer unit | Type | EDMA | EDMA | EDMA | EDMA |
|  |  | Amount | 3.5 wt % | 1 wt % | 3.5 wt % | 1 wt % |

TABLE 4-continued

[Constitution of Examples I-13 to I-16]

|  |  |  | Ex. I-13 | Ex. I-14 | Ex. I-15 | Ex. I-16 |
|---|---|---|---|---|---|---|
|  | Core portion | Swelling degree | 27.5 times | 13.5 times | 4.1 times | 9.6 times |
|  |  | Monomer | MMA 72.5 MAA 4 | MMA 90 MAA 4 EDMA 1 | MMA 52.5 MAA 4 EDMA 3.5 | MMA 75 MAA 4 EDMA 1 |
|  |  | Tg | 68° C. | 78° C. | 53° C. | 70° C. |
|  | Shell portion | Swelling degree | 1.2 times | 1.3 times | 1.3 times | 1.3 times |
|  |  | Monomer | ST 20 EDMA 3.5 | ST 5 | ST 40 | ST 20 |
|  |  | Tg | 103° C. | 100° C. | 100° C. | 100° C. |
|  | Core shell | Ratio | 10% | 1.50% | 28% | 10% |
|  |  | MV | 0.45 μm | 0.45 μm | 0.45 μm | 0.45 μm |
|  |  | Covering ratio | 61% | 25% | 87% | 65% |
|  |  | Shell portion constitution | Fine particles | Fine particles | Fine particles | Fine particles |
| Binder for Adhesive layer | Monomer |  | BA 94 AN 2 MAA 2 NMA 1 AAm 1 | BA 94 AN 2 MAA 2 NMA 1 AAm 1 | BA 94 AN 2 MAA 2 NMA 1 AAm 1 | BA 94 AN 2 MAA 2 NMA 1 AAm 1 |
|  | Amount |  | 6 parts | 6 parts | 6 parts | 6 parts |
| Particles |  |  | — | — | — | — |
| Water-soluble polymer | Type |  | Daicel 1220 | Daicel 1220 | Daicel 1220 | Daicel 1220 |
|  | Amount |  | 0.5 part | 0.5 part | 0.5 part | 0.5 part |
| Optional component |  |  | — | — | — | — |
| Thickness |  |  | 2 μm | 2 μm | 2 μm | 0.5 μm |

TABLE 5

[Constitution of Examples I-17 to I-20]

|  |  |  | Ex. I-17 | Ex. I-18 | Ex. I-19 | Ex. I-20 |
|---|---|---|---|---|---|---|
| Negative electrode active material |  |  | Graphite | Graphite | Graphite | Graphite |
| Separator substrate | Material |  | PE | PP | Cellulose | PE |
|  | Form |  | Porous substrate | Porous substrate | Non-woven fabric | Porous substrate |
| Porous membrane | Non-conductive particles |  | Al$_2$O$_3$ | Al$_2$O$_3$ | Al$_2$O$_3$ | Al$_2$O$_3$ |
|  | Binder | Monomer | BA 94 AN 2 MAA 2 NMA 1 AAm 1 | BA 94 AN 2 MAA 2 NMA 1 AAm 1 | BA 94 AN 2 MAA 2 NMA 1 AAm 1 | BA 94 AN 2 MAA 2 NMA 1 AAm 1 |
|  |  | Amount | 6 parts | 6 parts | 6 parts | 6 parts |
|  | Water-soluble polymer | Type | Daicel 1220 | Daicel 1220 | Daicel 1220 | Daicel 1220 |
|  |  | Amount | 1.5 parts | 1.5 parts | 1.5 parts | 1.5 parts |
| Adhesive layer |  |  |  |  |  |  |
| Particulate polymer | Cross-linkable monomer unit | Type | EDMA | EDMA | EDMA | EDMA |
|  |  | Amount | 1 wt % | 1 wt % | 1 wt % | 1 wt % |
|  | Core portion | Swelling degree | 9.6 times | 9.6 times | 9.6 times | 9.6 times |
|  |  | Monomer | MMA 75 MAA 4 EDMA 1 | MMA 75 MAA 4 EDMA 1 | MMA 75 MAA 4 EDMA 1 | MMA 75 MAA 4 EDMA 1 |
|  |  | Tg | 70° C. | 70° C. | 70° C. | 70° C. |

TABLE 5-continued

[Constitution of Examples I-17 to I-20]

|  |  |  | Ex. I-17 | Ex. I-18 | Ex. I-19 | Ex. I-20 |
|---|---|---|---|---|---|---|
|  | Shell portion | Swelling degree | 1.3 times | 1.3 times | 1.3 times | 1.3 times |
|  |  | Monomer | ST 20 | ST 20 | ST 20 | ST 20 |
|  |  | Tg | 100° C. | 100° C. | 100° C. | 100° C. |
|  | Core shell Ratio |  | 10% | 10% | 10% | 26% |
|  | MV |  | 0.45 μm | 0.45 μm | 0.45 μm | 0.05 μm |
|  | Covering ratio |  | 65% | 65% | 65% | 86% |
|  | Shell portion constitution |  | Fine particles | Fine particles | Fine particles | Fine particles |
| Binder for Adhesive layer | Monomer |  | BA 94 AN 2 MAA 2 NMA 1 AAm 1 | BA 94 AN 2 MAA 2 NMA 1 AAm 1 | BA 94 AN 2 MAA 2 NMA 1 AAm 1 | BA 94 AN 2 MAA 2 NMA 1 AAm 1 |
|  | Amount |  | 6 parts | 6 parts | 6 parts | 6 parts |
| Particles | — |  | — | — | — | — |
| Water-soluble polymer | Type |  | Daicel 1220 | Daicel 1220 | Daicel 1220 | Daicel 1220 |
|  | Amount |  | 0.5 part | 0.5 part | 0.5 part | 0.5 part |
| Optional component |  |  | — | — | — | — |
| Thickness |  |  | 4 μm | 2 μm | 2 μm | 2 μm |

TABLE 6

[Constitution of Examples I-21 to I-24]

|  |  |  | Ex. I-21 | Ex. I-22 | Ex. I-23 | Ex. I-24 |
|---|---|---|---|---|---|---|
| Negative electrode active material |  |  | Graphite | Graphite | Graphite | Graphite |
| Separator substrate | Material |  | PE | PE | PE | PE |
|  | Form |  | Porous substrate | Porous substrate | Porous substrate | Porous substrate |
| Porous membrane | Non-conductive particles |  | $Al_2O_3$ | $Al_2O_3$ | PST | $Al_2O_3$ |
|  | Binder | Monomer | BA 94 AN 2 MAA 2 NMA 1 AAm 1 | BA 94 AN 2 MAA 2 NMA 1 AAm 1 | BA 94 AN 2 MAA 2 NMA 1 AAm 1 | BA 94 AN 2 MAA 2 NMA 1 AAm 1 |
|  |  | Amount | 6 parts | 6 parts | 6 parts | 6 parts |
|  | Water-soluble polymer | Type | Daicel 1220 | Daicel 1220 | Daicel 1220 | Daicel 1220 |
|  |  | Amount | 1.5 parts | 1.5 parts | 1.5 parts | 1.5 parts |
| Adhesive layer |  |  |  |  |  |  |
| Particulate polymer | Cross-linkable monomer unit | Type | EDMA | EDMA | EDMA | EDMA |
|  |  | Amount | 1 wt % | 1 wt % | 1 wt % | 1 wt % |
|  | Core portion | Swelling degree | 9.6 times | 9.6 times | 9.6 times | 9.6 times |
|  |  | Monomer | MMA 75 MAA 4 EDMA 1 | MMA 75 MAA 4 EDMA 1 | MMA 75 MAA 4 EDMA 1 | MMA 75 MAA 4 EDMA 1 |
|  |  | Tg | 70° C. | 70° C. | 70° C. | 70° C. |
|  | Shell portion | Swelling degree | 1.3 times | 1.3 times | 1.3 times | 1.3 times |
|  |  | Monomer | ST 20 | ST 20 | ST 20 | ST 19 MAA 1 |
|  |  | Tg | 100° C. | 100° C. | 100° C. | 100° C. |
|  | Core shell Ratio |  | 2% | 10% | 10% | 10% |
|  | MV |  | 0.85 μm | 0.45 μm | 0.45 μm | 0.45 μm |
|  | Covering ratio |  | 21% | 65% | 65% | 64% |
|  | Shell portion constitution |  | Fine particles | Fine particles | Fine particles | Fine particles |

TABLE 6-continued

[Constitution of Examples I-21 to I-24]

|  |  | Ex. I-21 | Ex. I-22 | Ex. I-23 | Ex. I-24 |
|---|---|---|---|---|---|
| Binder for Adhesive layer | Monomer | BA 94<br>AN 2<br>MAA 2<br>NMA 1<br>AAm 1 | BA 94<br>AN 2<br>MAA 2<br>NMA 1<br>AAm 1 | BA 94<br>AN 2<br>MAA 2<br>NMA 1<br>AAm 1 | BA 94<br>AN 2<br>MAA 2<br>NMA 1<br>AAm 1 |
|  | Amount | 6 parts | 6 parts | 6 parts | 6 parts |
| Particles |  | — | $Al_2O_3$ | PST | — |
| Water-soluble polymer | Type | Daicel 1220 | Daicel 1220 | Daicel 1220 | Daicel 1220 |
|  | Amount | 0.5 part | 0.5 part | 0.5 part | 0.5 part |
| Optional component |  | — | — | — | — |
| Thickness |  | 2 μm | 2 μm | 2 μm | 2 μm |

TABLE 7

[Constitution of Examples I-25 to I-28]

|  |  |  | Ex. I-25 | Ex. I-26 | Ex. I-27 | Ex. I-28 |
|---|---|---|---|---|---|---|
| Negative electrode active material |  |  | Graphite | Graphite | Graphite/SiOx = 90/10 | Graphite/SiOx = 70/30 |
| Separator substrate | Material |  | PE | PE | PE | PE |
|  | Form |  | Porous substrate | Porous substrate | Porous substrate | Porous substrate |
| Porous membrane | Non-conductive particles |  | $Al_2O_3$ | $Al_2O_3$ | $Al_2O_3$ | $Al_2O_3$ |
|  | Binder | Monomer | BA 94<br>AN 2<br>MAA 2<br>NMA 1<br>AAm 1 | BA 94<br>AN 2<br>MAA 2<br>NMA 1<br>AAm 1 | BA 94<br>AN 2<br>MAA 2<br>NMA 1<br>AAm 1 | BA 94<br>AN 2<br>MAA 2<br>NMA 1<br>AAm 1 |
|  |  | Amount | 6 parts | 6 parts | 6 parts | 6 parts |
|  | Water-soluble polymer | Type | Daicel 1220 | Daicel 1220 | Daicel 1220 | Daicel 1220 |
|  |  | Amount | 1.5 parts | 1.5 parts | 1.5 parts | 1.5 parts |
| Adhesive layer |  |  |  |  |  |  |
| Particulate polymer | Cross-linkable monomer unit | Type | EDMA | EDMA | EDMA | EDMA |
|  |  | Amount | 1 wt % | 1 wt % | 1 wt % | 1 wt % |
|  | Core portion | Swelling degree | 9.6 times | 9.6 times | 9.6 times | 9.6 times |
|  |  | Monomer | MMA 75<br>MAA 4<br>EDMA 1 | MMA 75<br>MAA 4<br>EDMA 1 | MMA 75<br>MAA 4<br>EDMA 1 | MMA 75<br>MAA 4<br>EDMA 1 |
|  |  | Tg | 70° C. | 70° C. | 70° C. | 70° C. |
|  | Shell portion | Swelling degree | 1.3 times | 1.3 times | 1.3 times | 1.3 times |
|  |  | Monomer | ST 20 | ST 20 | ST 20 | ST 20 |
|  |  | Tg | 100° C. | 100° C. | 100° C. | 100° C. |
|  | Core shell Ratio |  | 10% | 10% | 10% | 10% |
|  | MV |  | 0.45 μm | 0.45 μm | 0.45 μm | 0.45 μm |
|  | Covering ratio |  | 65% | 65% | 65% | 65% |
|  | Shell portion constitution |  | Fine particles | Fine particles | Fine particles | Fine particles |
| Binder for Adhesive layer | Monomer |  | BA 94<br>AN 2<br>MAA 2<br>NMA 1<br>AAm 1 | BA 94<br>AN 2<br>MAA 2<br>NMA 1<br>AAm 1 | BA 94<br>AN 2<br>MAA 2<br>NMA 1<br>AAm 1 | BA 94<br>AN 2<br>MAA 2<br>NMA 1<br>AAm 1 |
|  | Amount |  | 6 parts | 6 parts | 6 parts | 6 parts |
| Particles |  |  | — | — | — | — |
| Water-soluble polymer | Type |  | Daicel 1220 | Daicel 1220 | Daicel 1220 | Daicel 1220 |
|  | Amount |  | 0.5 part | 0.5 part | 0.5 part | 0.5 part |
| Optional component |  |  | Leveling agent | Leveling agent | — | — |
| Thickness |  |  | 2 μm | 2 μm | 2 μm | 2 μm |

TABLE 8

[Constitution of Example I-29 and Comparative Examples I-1 to I-3]

| | | | Ex. I-29 | Comp. Ex. I-1 | Comp. Ex. I-2 | Comp. Ex. I-3 |
|---|---|---|---|---|---|---|
| Negative electrode active material | | | Graphite | Graphite | Graphite | Graphite |
| Separator substrate | Material | | PE | PE | PE | PE |
| | Form | | Porous substrate | Porous substrate | Porous substrate | Porous substrate |
| Porous membrane | Non-conductive particles | | $Al_2O_3$ | $Al_2O_3$ | $Al_2O_3$ | $Al_2O_3$ |
| | Binder | Monomer | BA 94 AN 2 MAA 2 NMA 1 AAm 1 | BA 94 AN 2 MAA 2 NMA 1 AAm 1 | BA 94 AN 2 MAA 2 NMA 1 AAm 1 | BA 94 AN 2 MAA 2 NMA 1 AAm 1 |
| | | Amount | 6 parts | 6 parts | 6 parts | 6 parts |
| | Water-soluble polymer | Type | Daicel 1220 | Daicel 1220 | Daicel 1220 | Daicel 1220 |
| | | Amount | 1.5 parts | 1.5 parts | 1.5 parts | 1.5 parts |
| Adhesive layer | | | | | | |
| Particulate polymer | Cross-linkable monomer unit | Type | EDMA | PVDF | — | — |
| | | Amount | 1 wt % | | 0 wt % | 0 wt % |
| | Core portion | Swelling degree | 10.5 times | | 32 times | 1.3 times |
| | | Monomer | AN 79 EDMA 1 | | MMA 70 AN 25 MAA 5 | PST |
| | | Tg | 103° C. | | | |
| | Shell portion | Swelling degree | 1.3 times | | | |
| | | Monomer | ST 20 | | | |
| | | Tg | 100° C. | | 105° C. | 100° C. |
| | Core shell Ratio | | 10% | | — | — |
| | MV | | 0.45 μm | | 0.45 μm | 0.45 μm |
| | Covering ratio | | 65% | | — | — |
| | Shell portion constitution | | Fine particles | | Fine particles | Fine particles |
| Binder for Adhesive layer | Monomer | | BA 94 AN 2 MAA 2 NMA 1 AAm 1 | | BA 94 AN 2 MAA 2 NMA 1 AAm 1 | BA 94 AN 2 MAA 2 NMA 1 AAm 1 |
| | Amount | | 6 parts | | 6 parts | 6 parts |
| Particles | | | — | | $Al_2O_3$ | — |
| Water-soluble polymer | Type | | Daicel 1220 | | Daicel 1220 | Daicel 1220 |
| | Amount | | 0.5 part | | 0.5 part | 0.5 part |
| Optional component | | | — | | — | — |
| Thickness | | | 2 μm | 2 μm | 2 μm | 2 μm |

TABLE 9

[Constitution of Comparative Examples I-4 to I-7]

| | | Comp. Ex. I-4 | Comp. Ex. I-5 | Comp. Ex. I-6 | Comp. Ex. I-7 |
|---|---|---|---|---|---|
| Negative electrode active material | | Graphite | Graphite | Graphite | Graphite |
| Separator substrate | Material | PE | PE | PE | PE |
| | Form | Porous substrate | Porous substrate | Porous substrate | Porous substrate |

TABLE 9-continued

[Constitution of Comparative Examples I-4 to I-7]

|  |  |  | Comp. Ex. I-4 | Comp. Ex. I-5 | Comp. Ex. I-6 | Comp. Ex. I-7 |
|---|---|---|---|---|---|---|
| Porous membrane | Non-conductive particles |  | $Al_2O_3$ | $Al_2O_3$ | $Al_2O_3$ | $Al_2O_3$ |
|  | Binder | Monomer | BA 94 AN 2 MAA 2 NMA 1 AAm 1 | BA 94 AN 2 MAA 2 NMA 1 AAm 1 | BA 94 AN 2 MAA 2 NMA 1 AAm 1 | BA 94 AN 2 MAA 2 NMA 1 AAm 1 |
|  |  | Amount | 6 parts | 6 parts | 6 parts | 6 parts |
|  | Water-soluble polymer | Type | Daicel 1220 | Daicel 1220 | Daicel 1220 | Daicel 1220 |
|  |  | Amount | 1.5 parts | 1.5 parts | 1.5 parts | 1.5 parts |
| Adhesive layer |  |  |  |  |  |  |
| Particulate polymer | Cross-linkable monomer unit | Type | — | — | — | EDMA |
|  |  | Amount | 0 wt % | 0 wt % | 0 wt % | 1 wt % |
|  | Core portion | Swelling degree | 3.8 times | 32 times | 10.5 times | 9.6 times |
|  |  | Monomer | 2-EHA 60 ST 15 MAA 5 | MMA 50 AN 25 MAA 5 | MMA 50 2-EHA 25 MAA 5 | MMA 75 MAA 4 EDMA 1 |
|  |  | Tg | −25° C. | 70° C. | 20° C. | 70° C. |
|  | Shell portion | Swelling degree | 1.3 times | 1.3 times | 4.5 times | 1.3 times |
|  |  | Monomer | ST 20 | ST 20 | AN 20 | ST 20 |
|  |  | Tg | 100° C. | 100° C. | 100° C. | 100° C. |
|  | Core shell Ratio |  | 10% | 10% | 10% | — |
|  | MV |  | 0.45 μm | 0.45 μm | 0.45 μm | — |
|  | Covering ratio |  | 51% | 52% | 54% | — |
|  | Shell portion constitution |  | Fine particles | Fine particles | Fine particles | — |
| Binder for Adhesive layer | Monomer |  | BA 94 AN 2 MAA 2 NMA 1 AAm 1 | BA 94 AN 2 MAA 2 NMA 1 AAm 1 | BA 94 AN 2 MAA 2 NMA 1 AAm 1 | BA 94 AN 2 MAA 2 NMA 1 AAm 1 |
|  | Amount |  | 6 parts | 6 parts | 6 parts | 6 parts |
| Particles |  |  | — | — | — | — |
| Water-soluble polymer | Type |  | Daicel 1220 | Daicel 1220 | Daicel 1220 | Daicel 1220 |
|  | Amount |  | 0.5 part | 0.5 part | 0.5 part | 0.5 part |
| Optional component |  |  | — | — | — | — |
| Thickness |  |  | 2 μm | 2 μm | 2 μm | 2 μm |

TABLE 10

[Results of Examples I-1 to I-4]

|  |  |  | Ex. I-1 | Ex. I-2 | Ex. I-3 | Ex. I-4 |
|---|---|---|---|---|---|---|
| Adhesion property | Peel strength | (N/m) | 7.8 | 6.9 | 7.1 | 6.8 |
| Blocking resistance |  |  | A | A | A | A |
| High-temperature cycle property | ΔC |  | 86.2% | 86.0% | 84.2% | 83.1% |
| Change in volume of cell | ΔX |  | 18% | 19% | 19% | 23% |
| Low-temperature output property | ΔV | (mV) | 340 | 345 | 355 | 355 |
| Deposition of metal on negative electrode |  | (%) | 0.16 | 0.18 | 0.19 | 0.19 |

TABLE 11

[Results of Examples I-5 to I-8]

|  |  |  | Ex. I-5 | Ex. I-6 | Ex. I-7 | Ex. I-8 |
|---|---|---|---|---|---|---|
| Adhesion property | Peel strength | (N/m) | 6.5 | 6.7 | 6.8 | 6.2 |
| Blocking resistance |  |  | A | A | A | B |
| High-temperature cycle property | ΔC |  | 82.2% | 83.2% | 83.00% | 81.50% |
| Change in volume of cell | ΔX |  | 23% | 23% | 25% | 28% |
| Low-temperature output property | ΔV | (mV) | 345 | 355 | 330 | 330 |
| Deposition of metal on negative electrode |  | (%) | 0.24 | 0.25 | 0.25 | 0.26 |

TABLE 12

[Results of Examples I-9 to I-12]

| | | | Ex. I-9 | Ex. I-10 | Ex. I-11 | Ex. I-12 |
|---|---|---|---|---|---|---|
| Adhesion property | Peel strength | (N/m) | 5.3 | 5.1 | 4.2 | 4.4 |
| Blocking resistance | | | A | A | B | B |
| High-temperature cycle property | ΔC | | 82.2% | 82.5% | 82.5% | 82.1% |
| Change in volume of cell | ΔX | | 25% | 27% | 25% | 26% |
| Low-temperature output property | ΔV | (mV) | 370 | 385 | 320 | 310 |
| Deposition of metal on negative electrode | | (%) | 0.28 | 0.24 | 0.24 | 0.24 |

TABLE 13

[Results of Examples I-13 to I-16]

| | | | Ex. I-13 | Ex. I-14 | Ex. I-15 | Ex. I-16 |
|---|---|---|---|---|---|---|
| Adhesion property | Peel strength | (N/m) | 6.3 | 3.3 | 7.1 | 4.1 |
| Blocking resistance | | | A | B | A | B |
| High-temperature cycle property | ΔC | | 80.2% | 82.4% | 82.7% | 82.70% |
| Change in volume of cell | ΔX | | 27% | 23% | 23% | 24% |
| Low-temperature output property | ΔV | (mV) | 340 | 410 | 435 | 370 |
| Deposition of metal on negative electrode | | (%) | 0.24 | 0.24 | 0.26 | 0.28 |

TABLE 14

[Results of Examples I-17 to I-20]

| | | | Ex. I-17 | Ex. I-18 | Ex. I-19 | Ex. I-20 |
|---|---|---|---|---|---|---|
| Adhesion property | Peel strength | (N/m) | 8.5 | 3.7 | 3.5 | 4.8 |
| Blocking resistance | | | A | A | A | A |
| High-temperature cycle property | ΔC | | 84.50% | 83.50% | 82.7% | 83.60% |
| Change in volume of cell | ΔX | | 20% | 23% | 18% | 24% |
| Low-temperature output property | ΔV | (mV) | 380 | 390 | 310 | 395 |
| Deposition of metal on negative electrode | | (%) | 0.25 | 0.22 | 0.22 | 0.24 |

TABLE 15

[Results of Examples I-21 to I-24]

| | | | Ex. I-21 | Ex. I-22 | Ex. I-23 | Ex. I-24 |
|---|---|---|---|---|---|---|
| Adhesion property | Peel strength | (N/m) | 3.7 | 4.1 | 4.4 | 7.9 |
| Blocking resistance | | | B | A | A | A |
| High-temperature cycle property | ΔC | | 81.50% | 81.50% | 82.50% | 86.0% |
| Change in volume of cell | ΔX | | 24% | 28% | 29% | 19% |
| Low-temperature output property | ΔV | (mV) | 315 | 395 | 310 | 345 |
| Deposition of metal on negative electrode | | (%) | 0.27 | 0.28 | 0.30 | 0.17 |

TABLE 16

[Results of Examples I-25 to I-28)

| | | | Ex. I-25 | Ex. I-26 | Ex. I-27 | Ex. I-28 |
|---|---|---|---|---|---|---|
| Adhesion property | Peel strength | (N/m) | 6.9 | 6.8 | 6.7 | 6.1 |
| Blocking resistance | | | A | A | A | A |
| High-temperature cycle property | ΔC | | 84.8% | 84.2% | 81.5% | 79.5% |
| Change in volume of cell | ΔX | | 19% | 20% | 23% | 28% |
| Low-temperature output property | ΔV | (mV) | 360 | 340 | 340 | 330 |
| Deposition of metal on negative electrode | | (%) | 0.20 | 0.21 | 0.21 | 0.24 |

TABLE 17

[Results of Example I-29 and Comparative Examples I-1 to I-3)

| | | | Ex. I-29 | Comp. Ex. I-1 | Comp. Ex. I-2 | Comp. Ex. I-3 |
|---|---|---|---|---|---|---|
| Adhesion property | Peel strength | (N/m) | 6.9 | 0.5 | 0.2 | 6.5 |
| Blocking resistance | | | A | D | C | C |
| High-temperature cycle property | ΔC | | 83.5% | 72.20% | 71.80% | 71.50% |
| Change in volume of cell | ΔX | | 22% | 46% | 55% | 50% |

TABLE 17-continued

[Results of Example I-29 and Comparative Examples I-1 to I-3]

| | | | Ex. I-29 | Comp. Ex. I-1 | Comp. Ex. I-2 | Comp. Ex. I-3 |
|---|---|---|---|---|---|---|
| Low-temperature output property | ΔV | (mV) | 380 | 650 | 730 | 680 |
| Deposition of metal on negative electrode | | (%) | 0.2 | 0.51 | 0.48 | 0.64 |

TABLE 18

[Results of Comparative Examples I-4 to I-7]

| | | | Comp. Ex. I-4 | Comp. Ex. I-5 | Comp. Ex. I-6 | Comp. Ex. I-7 |
|---|---|---|---|---|---|---|
| Adhesion property | Peel strength | (N/m) | 0.7 | 0.7 | 0.3 | 0.1 |
| Blocking resistance | | | C | C | C | C |
| High-temperature cycle property | ΔC | | 71.80% | 72% | 73% | 70.5% |
| Change in volume of cell | ΔX | | 52% | 48% | 48% | 49% |
| Low-temperature output property | ΔV | (mV) | 700 | 670 | 650 | 620 |
| Deposition of metal on negative electrode | | (%) | 0.65 | 0.61 | 0.64 | 0.65 |

[Discussion]

In Examples of Group 1, it was confirmed that the electrode and the porous membrane in the separator were tightly bonded by the adhesive layer containing the particulate polymer that swelled in the electrolytic solution. Therefore, it was confirmed that the adhesive layer produced using the adhesive according to the present invention had high adhesion property to a member for constituting the battery in the electrolytic solution.

In Examples of Group 1, voltage changes ΔV lower than those in Comparative Examples of Group 1 were obtained. Accordingly, it was confirmed that the lithium ion secondary battery according to the present invention had excellent low-temperature output property.

As clear from the results of Examples and Comparative Examples of Group 1 described above, it was confirmed that the blocking resistance of the adhesive layer according to the present invention was excellent, the generation of gas by charging and discharging of the lithium ion secondary battery of the present invention was decreased, and the lithium ion secondary battery of the present invention had excellent high-temperature cycle property.

[III. Description of Examples and Comparative Examples of Group 2]

Examples and Comparative Examples of Group 2 will be described hereinbelow. Examples and Comparative Examples of Group 2 are Examples and Comparative Examples about an adhesive containing non-conductive fibers.

[Evaluation Method in Examples and Comparative Examples of Group 2]

[II-1. Method for Measuring Volume Change of Cell Before and after High-Temperature Cycle Test]

The volume change ratio ΔX of a cell before and after a high-temperature cycle test in which charging and discharging were repeated for 1,000 cycles was measured by the same method as described in the section of [I-1. Method for Measuring Volume Change of Cell before and after High-Temperature Cycle Test] regarding Examples and Comparative Examples of Group 1. Smaller value of this volume change ratio ΔX of the cell is indicative of lower tendency of swelling of the adhesive layer in the battery, and lower tendency of occurrence of a gap between the electrode and the separator.

[II-2. Method for Measuring Peel Strength]

Peel strength was measured by the same method as described in the section of [I-2. Method for Measuring Peel Strength between Porous Membrane and Electrode] regarding Examples and Comparative Examples of Group 1.

[II-3. Method for Evaluating High-Temperature Cycle Property]

The capacity keeping ratio ΔC was measured by the same method as described in the section of [I-3. Method for Evaluating High-Temperature Cycle Property] regarding Examples and Comparative Examples of Group 1. Higher value of this capacity keeping ratio ΔC is indicative of better high-temperature cycle property of the lithium ion secondary battery, and longer lifetime of the battery.

[II-4. Method for Evaluating Blocking Resistance]

The adhesion state (blocking state) between the separators was visually observed by the same method as described in the section of [I-4. Method for Evaluating Blocking Resistance] regarding Examples and Comparative Examples of Group 1.

[II-5. Method for Evaluating Low-Temperature Output Property]

The voltage change ΔV was measured by the same method as described in the section of [I-5. Method for Evaluating Low-Temperature Output Property] regarding Examples and Comparative Examples of Group 1. Smaller value of this voltage change ΔV is indicative of better low-temperature output property.

[II-6. Method for Measuring Swelling Degree of Polymer of Core Portion]

The swelling degree S (times) of a polymer of a core portion was measured by the same method as described in the section of [I-6. Method for Measuring Swelling Degree of Polymer of Core portion] regarding Examples and Comparative Examples of Group 1.

[II-7. Method for Measuring Swelling Degree of Polymer of Shell Portion]

The swelling degree S of a polymer of a shell portion was measured by the same method as described in the section of [I-7. Method for Measuring Swelling Degree of Polymer of Shell portion] regarding Examples and Comparative Examples of Group 1.

[II-8. Method for Measuring Average Ratio of Outer Surface of Core Portion Covered with Shell Portion of Particulate Polymer]

The average ratio of outer surface of the core portion covered with the shell portion was measured by the same method as described in the section of [I-8. Method for Measuring Average Ratio of Outer Surface of Core Portion Covered with Shell Portion of Particulate Polymer] regarding Examples and Comparative Examples of Group 1.

[II-9. Method for Measuring Volume Average Particle Diameter of Particulate Polymer]

The volume average particle diameter of particulate polymer was measured by the same method as described in the section of [I-9. Method for Measuring Volume Average Particle Diameter of Particulate Polymer] regarding Examples and Comparative Examples of Group 1.

[II-10. Method for Measuring Core Shell Ratio]

The core shell ratio was measured by the same method as described in the section of [I-10. Method for Measuring Core Shell Ratio] regarding Examples and Comparative Examples of Group 1.

[II-11. Method for Evaluating Deposition of Metal on Negative Electrode]

The ratio of cobalt based on weight in the negative electrode was evaluated by the same method as described in the section of [I-11. Method for Evaluating Deposition of Metal on Negative Electrode] regarding Examples and Comparative Examples of Group 1.

Large weight of cobalt in the negative electrode is indicative of occurrence of deposition of metal on the negative electrode.

Example II-1

(II-1-1. Production of Binder for Porous Membrane)

An aqueous dispersion liquid containing an acrlylic polymer as the binder for a porous membrane was produced in the same manner as in the step (I-1-1) in Example I-1.

The volume average particle diameter D50 of the obtained acrylic polymer was 0.36 μm. The glass transition temperature was −45° C.

(II-1-2. Production of Slurry for Porous Membrane)

A slurry for a porous membrane was produced in the same manner as in the step (I-1-2) in Example I-1.

(II-1-3. Production of Particulate Polymer)

An aqueous dispersion liquid containing a particulate polymer was produced in the same manner as in the step (I-1-3) in Example I-1. The volume average particle diameter D50 of the obtained particulate polymer was 0.45 μm. A cross section of the obtained particulate polymer was observed, and it was found that the shell portion was composed of particles of the polymer. Regarding the obtained particulate polymer, a core shell ratio and the average ratio of the outer surface of the core portion covered with the shell portion were measured by the aforementioned methods.

(II-1-4. Production of Adhesive)

100 parts in terms of solid content of the aforementioned aqueous dispersion liquid containing the particulate polymer, 30 parts of cellulose fibers ("CELISH KY-100G" available from Daicel Corporation, fiber diameter: 0.07 μm) as non-conductive fibers, 6 parts in terms of solid content of the aforementioned aqueous dispersion liquid containing the acrylic polymer produced as the binder for a porous membrane as a binder for an adhesive layer, and 0.5 parts of carboxymethyl cellulose having a etherification degree of 0.8 to 1.0 (product name "Daicel 1200" available from Daicel FineChem Ltd.) were mixed. To the mixture, ion-exchanged water was further added so that the solid content concentration became 20%, to obtain an adhesive in a slurry form.

(II-1-5. Production of Separator)

A separator was produced using the aforementioned adhesive by the same method as in the step (I-1-5) in Example I-1. The blocking resistance of this separator was evaluated by the aforementioned method.

(II-1-6. Production of Particulate Binder for Negative Electrode)

An aqueous dispersion liquid containing a desired particulate binder was produced in the same manner as in the step (I-1-6) in Example I-1.

(II-1-7. Production of Slurry Composition for Negative Electrode)

A slurry for a negative electrode was produced in the same manner as in the step (I-1-7) in Example I-1.

(II-1-8. Production of Negative Electrode)

A negative electrode was produced in the same manner as in the step (I-1-8) in Example I-1.

(II-1-9. Production of Slurry for Positive Electrode)

A slurry for a positive electrode was produced in the same manner as in the step (I-1-9) in Example I-1.

(II-1-10. Production of Positive Electrode)

A positive electrode was produced in the same manner as in the step (I-1-10) in Example I-1.

[II-1-11. Production of Layered Body of Negative Electrode and Separator and Layered Body of Positive Electrode and Separator]

A layered body having a positive electrode and a separator and a layered body having a negative electrode and a separator were obtained by the same manner as in the step (I-1-11) in Example I-1. The peel strength was measured using these layered bodies by the aforementioned method.

(II-1-12. Production of Lithium Ion Secondary Battery)

The wound-type lithium ion secondary battery was produced in the same manner as in the step (I-1-12) in Example I-1.

Regarding the thus obtained lithium ion secondary battery, the volume change of cell before and after the high-temperature cycle test, the high-temperature cycle property, the low-temperature output property, and the deposition of metal on the negative electrode were evaluated by the aforementioned methods.

Example II-2

In the monomer composition used in production of the core portion in the aforementioned step (II-1-3), the amount of methyl methacrylate was changed to 75.85 parts and the amount of ethylene dimethacrylate was changed to 0.15 parts.

A lithium ion secondary battery was produced and evaluated in the same manner as in Example II-1 except for the aforementioned matters.

Example II-3

In the monomer composition used in production of the core portion in the aforementioned step (II-1-3), the amount of methyl methacrylate was changed to 71.5 parts and the amount of ethylene dimethacrylate was changed to 4.5 parts.
A lithium ion secondary battery was produced and evaluated in the same manner as in Example II-1 except for the aforementioned matters.

Example II-4

In the monomer composition used in production of the core portion in the aforementioned step (II-1-3), the amount of methyl methacrylate was changed to 75.95 parts and the amount of ethylene dimethacrylate was changed to 0.05 parts.
A lithium ion secondary battery was produced and evaluated in the same manner as in Example II-1 except for the aforementioned matters.

Example II-5

In the monomer composition used in production of the core portion in the aforementioned step (II-1-3), a combination of 55 parts of methyl methacrylate and 20 parts of 2-ethylhexyl acrylate was used in place of 75 parts of methyl methacrylate.
A lithium ion secondary battery was produced and evaluated in the same manner as in Example II-1 except for the aforementioned matters.

Example II-6

In the monomer composition used in production of the core portion in the aforementioned step (II-1-3), 75 parts of acrylonitrile was used in place of 75 parts of methyl methacrylate.
A lithium ion secondary battery was produced and evaluated in the same manner as in Example II-1 except for the aforementioned matter.

Example II-7

In the monomer composition used in production of the core portion in the aforementioned step (II-1-3), a combination of 65 parts of acrylonitrile and 10 parts of 2-ethylhexyl acrylate was used in place of 75 parts of methyl methacrylate.
A lithium ion secondary battery was produced and evaluated in the same manner as in Example II-1 except for the aforementioned matters.

Example II-8

In the monomer composition used in production of the core portion in the aforementioned step (II-1-3), 72 parts of acrylonitrile was used in place of 75 parts of methyl methacrylate and the amount of ethylene dimethacrylate was changed to 4.0 parts.
A lithium ion secondary battery was produced and evaluated in the same manner as in Example II-1 except for the aforementioned matters.

Example II-9

In the monomer composition used in production of the shell portion in the aforementioned step (II-1-3), a combination of 10 parts of styrene and 10 parts of acrylonitrile was used in place of 20 parts of styrene.
A lithium ion secondary battery was produced and evaluated in the same manner as in Example II-1 except for the aforementioned matters.

Example II-10

In the monomer composition used in production of the shell portion in the aforementioned step (II-1-3), a combination of 5 parts of styrene and 15 parts of acrylonitrile was used in place of 20 parts of styrene.
A lithium ion secondary battery was produced and evaluated in the same manner as in Example II-1 except for the aforementioned matters.

Example II-11

In the monomer composition used in production of the shell portion in the aforementioned step (II-1-3), 20 parts of sodium salt of styrenesulfonic acid was used in place of 20 parts of styrene.
A lithium ion secondary battery was produced and evaluated in the same manner as in Example II-1 except for the aforementioned matter.

Example II-12

In the monomer composition used in production of the shell portion in the aforementioned step (II-1-3), a combination of 15 parts of sodium salt of styrenesulfonic acid and 5 parts of acrylonitrile was used in place of 20 parts of styrene.
A lithium ion secondary battery was produced and evaluated in the same manner as in Example II-1 except for the aforementioned matters.

Example II-13

In the monomer composition used in production of the core portion in the aforementioned step (II-1-3), the amount of methyl methacrylate was changed to 72.5 parts and ethylene dimethacrylate was not used.
Furthermore, in the monomer composition used in production of the shell portion in the aforementioned step (II-1-3), 3.5 parts of ethylene dimethacrylate was used in addition to 20 parts of styrene.
A lithium ion secondary battery was produced and evaluated in the same manner as in Example II-1 except for the aforementioned matters.

Example II-14

In the monomer composition used in production of the core portion in the aforementioned step (II-1-3), the amount of methyl methacrylate was changed to 90 parts.
Furthermore, in the monomer composition used in production of the shell portion in the aforementioned step (II-1-3), the amount of styrene was changed to 5 parts.
A lithium ion secondary battery was produced and evaluated in the same manner as in Example II-1 except for the aforementioned matters.

Example II-15

In the monomer composition used in production of the core portion in the aforementioned step (II-1-3), the amount of methyl methacrylate was changed to 52.5 parts and the amount of ethylene dimethacrylate was changed to 3.5 parts.

Furthermore, in the monomer composition used in production of the shell portion in the aforementioned step (II-1-3), the amount of styrene was changed to 40 parts.

A lithium ion secondary battery was produced and evaluated in the same manner as in Example II-1 except for the aforementioned matters.

Example II-16

In the aforementioned step (II-1-5), the applied amount of the adhesive slurry was changed, thereby changing the thickness of the adhesive layer to 0.5 μm per layer.

A lithium ion secondary battery was produced and evaluated in the same manner as in Example II-1 except for the aforementioned matter.

Example II-17

In the aforementioned step (II-1-5), the applied amount of the adhesive slurry was changed, thereby changing the thickness of the adhesive layer to 4 μm per layer.

A lithium ion secondary battery was produced and evaluated in the same manner as in Example II-1 except for the aforementioned matter.

Example II-18

In the aforementioned step (II-1-4), the amount of the non-conductive fibers relative to 100 parts of the solid content of the aqueous dispersion liquid containing the particulate polymer was changed to 0.5 parts.

A lithium ion secondary battery was produced and evaluated in the same manner as in Example II-1 except for the aforementioned matter.

Example II-19

In the aforementioned step (II-1-4), the amount of the non-conductive fibers relative to 100 parts of the solid content of the aqueous dispersion liquid containing the particulate polymer was changed to 9.5 parts.

A lithium ion secondary battery was produced and evaluated in the same manner as in Example II-1 except for the aforementioned matter.

Example II-20

In the aforementioned step (II-1-5), the separator substrate was changed to an organic porous substrate made of polypropylene (thickness: 15 μm, Gurley value: 560 s/100 cc).

A lithium ion secondary battery was produced and evaluated in the same manner as in Example II-1 except for the aforementioned matter.

Example II-21

In the aforementioned step (II-1-5), the separator substrate was changed to nonwoven fabric made of cellulose (thickness: 25 μm, Gurley value: 0.03 s/100 cc).

A lithium ion secondary battery was produced and evaluated in the same manner as in Example II-1 except for the aforementioned matter.

Example II-22

In the aforementioned step (II-1-4), cellulose fibers ("BiNFIs-cellulose" available from Sugino Machine Limited, fiber diameter: 0.02 μm) was used in place of "CELISH KY-100G" available from Daicel Corporation as the non-conductive fibers.

A lithium ion secondary battery was produced and evaluated in the same manner as in Example II-1 except for the aforementioned matter.

Example II-23

In the aforementioned step (II-1-3), the amount of sodium dodecylbenzenesulfonate as the emulsifier was changed to 2 parts.

A lithium ion secondary battery was produced and evaluated in the same manner as in Example II-1 except for the aforementioned matter.

Example II-24

In the aforementioned step (II-1-3), the amount of sodium dodecylbenzenesulfonate as the emulsifier was changed to 0.5 parts.

A lithium ion secondary battery was produced and evaluated in the same manner as in Example II-1 except for the aforementioned matter.

Example II-25

In the aforementioned step (II-1-4), 50 parts of alumina particles which were the same as those used in the slurry for a porous membrane in Example II-1 was added to the adhesive slurry.

A lithium ion secondary battery was produced and evaluated in the same manner as in Example II-1 except for the aforementioned matter.

Example II-26

In the aforementioned step (II-1-2), polystyrene particles (volume average particle diameter: 0.45 μm) was used in place of alumina particles.

Further, in the aforementioned step (II-1-4), 50 parts of the aforementioned polystyrene particles was added to the adhesive slurry.

A lithium ion secondary battery was produced and evaluated in the same manner as in Example II-1 except for the aforementioned matters.

Comparative Example II-1

In the aforementioned step (II-1-5), an NMP solution of polyvinylidene fluoride (concentration: 12% by weight) was used in place of the adhesive to form a polyvinylidene fluoride layer with a thickness of 2 μm per layer in place of the adhesive layer.

A lithium ion secondary battery was produced and evaluated in the same manner as in Example II-1 except for the aforementioned matter.

Comparative Example II-2

In the monomer composition used in production of the core portion in the aforementioned step (II-1-3), the amount of methyl methacrylate was changed to 70 parts, the amount of methacrylic acid was changed to 5 parts, and 25 parts of acrylonitrile was used in place of ethylene dimethacrylate.

Furthermore, the monomer composition used in production of the shell portion was not added in the aforementioned step (II-1-3).

In the aforementioned step (II-1-4), 50 parts of alumina particles which were the same as those used in the slurry for a porous membrane in Example II-1 was mixed to the adhesive slurry.

A lithium ion secondary battery was produced and evaluated in the same manner as in Example II-1 except for the aforementioned matters.

Comparative Example II-3

In the aforementioned step (II-1-4), 100 parts of an aqueous dispersion liquid containing polystyrene particles (volume average particle diameter of the polystyrene particles: 45 μm) was used in place of the aqueous dispersion liquid of the particulate polymer.

A lithium ion secondary battery was produced and evaluated in the same manner as in Example II-1 except for the aforementioned matter.

Comparative Example II-4

In the monomer composition used in production of the core portion in the aforementioned step (II-1-3), 60 parts of 2-ethylhexyl acrylate, 15 parts of styrene, and 5 parts of methacrylic acid were used in place of 75 parts of methyl methacrylate, 4 parts of methacrylic acid, and 1 part of ethylene dimethacrylate.

A lithium ion secondary battery was produced and evaluated in the same manner as in Example II-1 except for the aforementioned matters.

Comparative Example II-5

In the monomer composition used in production of the core portion in the aforementioned step (II-1-3), 50 parts of methyl methacrylate, 25 parts of acrylonitrile, and 5 parts of methacrylic acid were used in place of 75 parts of methyl methacrylate, 4 parts of methacrylic acid, and 1 part of ethylene dimethacrylate.

A lithium ion secondary battery was produced and evaluated in the same manner as in Example II-1 except for the aforementioned matters.

Comparative Example II-6

In the monomer composition used in production of the core portion in the aforementioned step (II-1-3), 50 parts of methyl methacrylate, 25 parts of 2-ethylhexyl acrylate, and 5 parts of methacrylic acid were used in place of 75 parts of methyl methacrylate, 4 parts of methacrylic acid, and 1 part of ethylene dimethacrylate.

Furthermore, in the monomer composition used in production of the shell portion in the aforementioned step (II-1-3), 20 parts of acrylonitrile was used in place of 20 parts of styrene.

A lithium ion secondary battery was produced and evaluated in the same manner as in Example II-1 except for the aforementioned matters.

[Results]

Results in Examples and Comparative Examples of Group 2 described above are shown in the following Tables. Abbreviations in the following Tables mean as follows. In the following Tables, each value written next to the abbreviation of each monomer in a section of the monomer represents the amount of the monomer by parts by weight.

PE: polyethylene
PP: polypropylene
PST: polystyrene
BA: butyl acrylate
AN: acrylonitrile
MAA: methacrylic acid
NMA: N-methylolacrylamide
AAm: acrylamide
EDMA: ethylene dimethacrylate
MMA: methyl methacrylate
2-EHA: 2-ethylhexyl acrylate
ST: styrene
Tg: glass transition temperature
NaSS: sodium salt of styrenesulfonic acid
"Core shell ratio": ratio of average thickness of shell portion relative to volume average particle diameter of particulate polymer
"Covering ratio": average ratio of outer surface of core portion covered with the shell portion
MV: volume average particle diameter
KY-100G: cellulose fibers ("CELISH KY-100G" available from Daicel Corporation)
BiNFIs: cellulose fibers ("BiNFIs-cellulose" available from Sugino Machine Limited)
PVDF: polyvinylidene fluoride

TABLE 19

| | | [Constitution of Examples II-1 to II-4] | | | |
|---|---|---|---|---|---|
| | | Ex. II-1 | Ex. II-2 | Ex. II-3 | Ex. II-4 |
| Separator substrate | Material | PE | PE | PE | PE |
| | Form | Porous substrate | Porous substrate | Porous substrate | Porous substrate |
| Porous Membrane | Non-conductive particles | $Al_2O_3$ | $Al_2O_3$ | $Al_2O_3$ | $Al_2O_3$ |
| | Binder Amount | 6 parts | 6 parts | 6 parts | 6 parts |
| | Water-soluble polymer Type | Daicel 1220 | Daicel 1220 | Daicel 1220 | Daicel 1220 |
| | Amount | 1.5 parts | 1.5 parts | 1.5 parts | 1.5 parts |

TABLE 19-continued

[Constitution of Examples II-1 to II-4]

|  |  |  | Ex. II-1 | Ex. II-2 | Ex. II-3 | Ex. II-4 |
|---|---|---|---|---|---|---|
| Adhesive layer |  |  |  |  |  |  |
| Particulate polymer | Cross-linkable monomer | Type | EDMA | EDMA | EDMA | EDMA |
|  |  | Amount | 1 wt % | 0.15 wt % | 4.5 wt % | 0.05 wt % |
|  | Core portion | Swelling degree | 9.6 times | 19.5 times | 5.2 times | 28.5 times |
|  |  | Monomer | MMA 75<br>MAA 4<br>EDMA 1 | MMA 75.85<br>MAA 4<br>EDMA 0.15 | MMA 71.5<br>MAA 4<br>EDMA 4.5 | MMA 75.95<br>MAA 4<br>EDMA 0.05 |
|  |  | Tg | 70° C. | 71° C. | 69° C. | 71° C. |
|  | Shell portion | Swelling degree | 1.3 times | 1.3 times | 1.3 times | 1.3 times |
|  |  | Monomer | ST 20 | ST 20 | ST 20 | ST 20 |
|  |  | Tg | 100° C. | 100° C. | 100° C. | 100° C. |
|  | Core shell Ratio |  | 10% | 10% | 10% | 10% |
|  | Covering ratio |  | 65% | 64% | 64% | 61% |
|  | MV |  | 0.45 μm | 0.45 μm | 0.45 μm | 0.45 μm |
| Non-conductive fiber | Type |  | KY-100G | KY-100G | KY-100G | KY-100G |
|  | Fiber diameter |  | 0.07 μm | 0.07 μm | 0.07 μm | 0.07 μm |
|  | Amount |  | 30 parts | 30 parts | 30 parts | 30 parts |
| Binder for adhesive layer | Monomer |  | BA 94<br>AN 2<br>MAA 2<br>NMA 1<br>AAm 1 | BA 94<br>AN 2<br>MAA 2<br>NMA 1<br>AAm 1 | BA 94<br>AN 2<br>MAA 2<br>NMA 1<br>AAm 1 | BA 94<br>AN 2<br>MAA 2<br>NMA 1<br>AAm 1 |
|  | Amount |  | 6 parts | 6 parts | 6 parts | 6 parts |
| Particles |  |  | — | — | — | — |
| Water-soluble polymer | Type |  | Daicel 1220 | Daicel 1220 | Daicel 1220 | Daicel 1220 |
|  | Amount (parts) |  | 0.5 | 0.5 | 0.5 | 0.5 |
| Thickness |  |  | 2 μm | 2 μm | 2 μm | 2 μm |

TABLE 20

[Constitution of Examples II-5 to II-8]

|  |  |  | Ex. II-5 | Ex. II-6 | Ex. II-7 | Ex. II-8 |
|---|---|---|---|---|---|---|
| Separator substrate | Material |  | PE | PE | PE | PE |
|  | Form |  | Porous substrate | Porous substrate | Porous substrate | Porous substrate |
| Porous Membrane | Non-conductive particles |  | $Al_2O_3$ | $Al_2O_3$ | $Al_2O_3$ | $Al_2O_3$ |
|  | Binder | Amount | 6 parts | 6 parts | 6 parts | 6 parts |
|  | Water-soluble polymer | Type | Daicel 1220 | Daicel 1220 | Daicel 1220 | Daicel 1220 |
|  |  | Amount | 1.5 parts | 1.5 parts | 1.5 parts | 1.5 parts |
| Adhesive layer |  |  |  |  |  |  |
| Particulate polymer | Cross-linkable monomer | Type | EDMA | EDMA | EDMA | EDMA |
|  |  | Amount | 1 wt % | 1 wt % | 1 wt % | 4.0 wt % |
|  | Core portion | Swelling degree | 6.5 times | 8.8 times | 7.1 times | 4.4 times |
|  |  | Monomer | MMA 55<br>2-EHA 20<br>MAA 4<br>EDMA 1 | AN 75<br>MAA 4<br>EDMA 1 | AN 65<br>2-EHA 10<br>MAA 4<br>EDMA 1 | AN 72<br>MAA 4<br>EDMA 4.0 |
|  |  | Tg | 35° C. | 55° C. | 47° C. | 43° C. |
|  | Shell portion | Swelling degree | 1.3 times | 1.3 times | 1.3 times | 1.3 times |
|  |  | Monomer | ST 20 | ST 20 | ST 20 | ST 20 |
|  |  | Tg | 100° C. | 100° C. | 100° C. | 100° C. |

TABLE 20-continued

[Constitution of Examples II-5 to II-8]

|  |  |  | Ex. II-5 | Ex. II-6 | Ex. II-7 | Ex. II-8 |
|---|---|---|---|---|---|---|
|  |  | Core shell Ratio | 10% | 10% | 10% | 10% |
|  |  | Covering ratio | 55% | 56% | 58% | 58% |
|  |  | MV | 0.45 μm | 0.45 μm | 0.45 μm | 0.45 μm |
| Non-conductive fiber | | Type | KY-100G | KY-100G | KY-100G | KY-100G |
| | | Fiber diameter | 0.07 μm | 0.07 μm | 0.07 μm | 0.07 μm |
| | | Amount | 30 parts | 30 parts | 30 parts | 30 parts |
| Binder for adhesive layer | Monomer | | BA 94<br>AN 2<br>MAA 2<br>NMA 1<br>AAm 1 | BA 94<br>AN 2<br>MAA 2<br>NMA 1<br>AAm 1 | BA 94<br>AN 2<br>MAA 2<br>NMA 1<br>AAm 1 | BA 94<br>AN 2<br>MAA 2<br>NMA 1<br>AAm 1 |
| | Amount | | 6 parts | 6 parts | 6 parts | 6 parts |
| Particles | | | — | — | — | — |
| Water-soluble polymer | Type | | Daicel 1220 | Daicel 1220 | Daicel 1220 | Daicel 1220 |
| | Amount (parts) | | 0.5 | 0.5 | 0.5 | 0.5 |
| Thickness | | | 2 μm | 2 μm | 2 μm | 2 μm |

TABLE 21

[Constitution of Examples II-9 to II-12]

|  |  |  |  | Ex. II-9 | Ex. II-10 | Ex. II-11 | Ex. II-12 |
|---|---|---|---|---|---|---|---|
| Separator substrate | Material | | | PE | PE | PE | PE |
| | Form | | | Porous substrate | Porous substrate | Porous substrate | Porous substrate |
| Porous Membrane | Non-conductive particles | | | $Al_2O_3$ | $Al_2O_3$ | $Al_2O_3$ | $Al_2O_3$ |
| | Binder | Amount | | 6 parts | 6 parts | 6 parts | 6 parts |
| | Water-soluble polymer | Type | | Daicel 1220 | Daicel 1220 | Daicel 1220 | Daicel 1220 |
| | | Amount | | 1.5 parts | 1.5 parts | 1.5 parts | 1.5 parts |
| Adhesive layer | | | | | | | |
| Particulate polymer | Cross-linkable monomer | Type | | EDMA | EDMA | EDMA | EDMA |
| | | Amount | | 1 wt % | 1 wt % | 1 wt % | 1 wt % |
| | Core portion | Swelling degree | | 9.6 times | 9.6 times | 9.6 times | 9.6 times |
| | | Monomer | | MMA 75<br>MAA 4<br>EDMA 1 | MMA 75<br>MAA 4<br>EDMA 1 | MMA 75<br>MAA 4<br>EDMA 1 | MMA 75<br>MAA 4<br>EDMA 1 |
| | | Tg | | 70° C. | 70° C. | 70° C. | 70° C. |
| | Shell portion | Swelling degree | | 2.7 times | 3.5 times | 1.7 times | 2.1 times |
| | | Monomer | | ST 10<br>AN 10 | ST 5<br>AN 15 | NaSS 20 | NaSS 15<br>AN 5 |
| | | Tg | | 101° C. | 102° C. | 80° C. | 82° C. |
| | Core shell Ratio | | | 10% | 10% | 10% | 10% |
| | Covering ratio | | | 61% | 60% | 35% | 42% |
| | MV | | | 0.45 μm | 0.45 μm | 0.45 μm | 0.45 μm |
| Non-conductive fiber | Type | | | KY-100G | KY-100G | KY-100G | KY-100G |
| | Fiber diameter | | | 0.07 μm | 0.07 μm | 0.07 μm | 0.07 μm |
| | Amount | | | 30 parts | 30 parts | 30 parts | 30 parts |
| Binder for adhesive layer | Monomer | | | BA 94<br>AN 2<br>MAA 2<br>NMA 1<br>AAm 1 | BA 94<br>AN 2<br>MAA 2<br>NMA 1<br>AAm 1 | BA 94<br>AN 2<br>MAA 2<br>NMA 1<br>AAm 1 | BA 94<br>AN 2<br>MAA 2<br>NMA 1<br>AAm 1 |
| | Amount | | | 6 parts | 6 parts | 6 parts | 6 parts |

TABLE 21-continued

[Constitution of Examples II-9 to II-12]

| | | Ex. II-9 | Ex. II-10 | Ex. II-11 | Ex. II-12 |
|---|---|---|---|---|---|
| Particles | | — | — | — | — |
| Water-soluble polymer | Type | Daicel 1220 | Daicel 1220 | Daicel 1220 | Daicel 1220 |
| | Amount (parts) | 0.5 | 0.5 | 0.5 | 0.5 |
| Thickness | | 2 μm | 2 μm | 2 μm | 2 μm |

TABLE 22

[Constitution of Examples II-13 to II-16]

| | | | Ex. II-13 | Ex. II-14 | Ex. II-15 | Ex. II-16 |
|---|---|---|---|---|---|---|
| Separator substrate | Material | | PE | PE | PE | PE |
| | Form | | Porous substrate | Porous substrate | Porous substrate | Porous substrate |
| Porous Membrane | Non-conductive particles | | $Al_2O_3$ | $Al_2O_3$ | $Al_2O_3$ | $Al_2O_3$ |
| | Binder | Amount | 6 parts | 6 parts | 6 parts | 6 parts |
| | Water-soluble polymer | Type | Daicel 1220 | Daicel 1220 | Daicel 1220 | Daicel 1220 |
| | | Amount | 1.5 parts | 1.5 parts | 1.5 parts | 1.5 parts |
| Adhesive layer | | | | | | |
| Particulate polymer | Cross-linkable monomer | Type | EDMA | EDMA | EDMA | EDMA |
| | | Amount | 3.5 wt % | 1 wt % | 3.5 wt % | 1 wt % |
| | Core portion | Swelling degree | 27.5 times | 13.5 times | 4.1 times | 9.6 times |
| | | Monomer | MMA 72.5 MAA 4 | MMA 90 MAA 4 EDMA 1 | MMA 52.5 MAA 4 EDMA 3.5 | MMA 75 MAA 4 EDMA 1 |
| | | Tg | 68° C. | 78° C. | 53° C. | 70° C. |
| | Shell portion | Swelling degree | 1.2 times | 1.3 times | 1.3 times | 1.3 times |
| | | Monomer | ST 20 EDMA 3.5 | ST 5 | ST 40 | ST 20 |
| | | Tg | 103° C. | 100° C. | 100° C. | 100° C. |
| | Core shell Ratio | | 10% | 1.5% | 28% | 10% |
| | Covering ratio | | 61% | 25% | 87% | 65% |
| | MV | | 0.45 μm | 0.45 μm | 0.45 μm | 0.45 μm |
| Non-conductive fiber | Type | | KY-100G | KY-100G | KY-100G | KY-100G |
| | Fiber diameter | | 0.07 μm | 0.07 μm | 0.07 μm | 0.07 μm |
| | Amount | | 30 parts | 30 parts | 30 parts | 30 parts |
| Binder for adhesive layer | Monomer | | BA 94 AN 2 MAA 2 NMA 1 AAm 1 | BA 94 AN 2 MAA 2 NMA 1 AAm 1 | BA 94 AN 2 MAA 2 NMA 1 AAm 1 | BA 94 AN 2 MAA 2 NMA 1 AAm 1 |
| | Amount | | 6 parts | 6 parts | 6 parts | 6 parts |
| Particles | | | — | — | — | — |
| Water-soluble polymer | Type | | Daicel 1220 | Daicel 1220 | Daicel 1220 | Daicel 1220 |
| | Amount (parts) | | 0.5 | 0.5 | 0.5 | 0.5 |
| Thickness | | | 2 μm | 2 μm | 2 μm | 0.5 μm |

TABLE 23

[Constitution of Examples II-17 to II-20]

| | | Ex. II-17 | Ex. II-18 | Ex. II-19 | Ex. II-20 |
|---|---|---|---|---|---|
| Separator substrate | Material | PE | PE | PE | PP |
| | Form | Porous substrate | Porous substrate | Porous substrate | Porous substrate |

TABLE 23-continued

[Constitution of Examples II-17 to II-20]

| | | | Ex. II-17 | Ex. II-18 | Ex. II-19 | Ex. II-20 |
|---|---|---|---|---|---|---|
| Porous Membrane | Non-conductive particles | | $Al_2O_3$ | $Al_2O_3$ | $Al_2O_3$ | $Al_2O_3$ |
| | Binder | Amount | 6 parts | 6 parts | 6 parts | 6 parts |
| | Water-soluble polymer | Type | Daicel 1220 | Daicel 1220 | Daicel 1220 | Daicel 1220 |
| | | Amount | 1.5 parts | 1.5 parts | 1.5 parts | 1.5 parts |
| Adhesive layer | | | | | | |
| Particulate polymer | Cross-linkable monomer | Type | EDMA | EDMA | EDMA | EDMA |
| | | Amount | 1 wt % | 1 wt % | 1 wt % | 1 wt % |
| | Core portion | Swelling degree | 9.6 times | 9.6 times | 9.6 times | 9.6 times |
| | | Monomer | MMA 75 MAA 4 EDMA 1 | MMA 75 MAA 4 EDMA 1 | MMA 75 MAA 4 EDMA 1 | MMA 75 MAA 4 EDMA 1 |
| | | Tg | 70° C. | 70° C. | 70° C. | 70° C. |
| | Shell portion | Swelling degree | 1.3 times | 1.3 times | 1.3 times | 1.3 times |
| | | Monomer | ST 20 | ST 20 | ST 20 | ST 20 |
| | | Tg | 100° C. | 100° C. | 100° C. | 100° C. |
| | Core shell Ratio | | 10% | 10% | 10% | 10% |
| | Covering ratio | | 65% | 65% | 65% | 65% |
| | MV | | 0.45 μm | 0.45 μm | 0.45 μm | 0.45 μm |
| Non-conductive fiber | Type | | KY-100G | KY-100G | KY-100G | KY-100G |
| | Fiber diameter | | 0.07 μm | 0.07 μm | 0.07 μm | 0.07 μm |
| | Amount | | 30 parts | 0.5 part | 95 parts | 30 parts |
| Binder for adhesive layer | Monomer | | BA 94 AN 2 MAA 2 NMA 1 AAm 1 | BA 94 AN 2 MAA 2 NMA 1 AAm 1 | BA 94 AN 2 MAA 2 NMA 1 AAm 1 | BA 94 AN 2 MAA 2 NMA 1 AAm 1 |
| | Amount | | 6 parts | 6 parts | 6 parts | 6 parts |
| Particles | | | — | — | — | — |
| Water-soluble polymer | Type | | Daicel 1220 | Daicel 1220 | Daicel 1220 | Daicel 1220 |
| | Amount (parts) | | 0.5 | 0.5 | 0.5 | 0.5 |
| Thickness | | | 4 μm | 2 μm | 2 μm | 2 μm |

TABLE 24

[Constitution of Examples II-21 to II-24]

| | | | Ex. II-21 | Ex. II-22 | Ex. II-23 | Ex. II-24 |
|---|---|---|---|---|---|---|
| Separator substrate | Material Form | | Cellulose Non-woven fabric | PE Porous substrate | PE Porous substrate | PE Porous substrate |
| Porous Membrane | Non-conductive particles | | $Al_2O_3$ | $Al_2O_3$ | $Al_2O_3$ | $Al_2O_3$ |
| | Binder | Amount | 6 parts | 6 parts | 6 parts | 6 parts |
| | Water-soluble polymer | Type | Daicel 1220 | Daicel 1220 | Daicel 1220 | Daicel 1220 |
| | | Amount | 1.5 parts | 1.5 parts | 1.5 parts | 1.5 parts |
| Adhesive layer | | | | | | |
| Particulate polymer | Cross-linkable monomer | Type | EDMA | EDMA | EDMA | EDMA |
| | | Amount | 1 wt % | 1 wt % | 1 wt % | 1 wt % |
| | Core portion | Swelling degree | 9.6 times | 9.6 times | 9.6 times | 9.6 times |
| | | Monomer | MMA 75 MAA 4 EDMA 1 | MMA 75 MAA 4 EDMA 1 | MMA 75 MAA 4 EDMA 1 | MMA 75 MAA 4 EDMA 1 |
| | | Tg | 70° C. | 70° C. | 70° C. | 70° C. |

TABLE 24-continued

[Constitution of Examples II-21 to II-24]

|  |  |  | Ex. II-21 | Ex. II-22 | Ex. II-23 | Ex. II-24 |
|---|---|---|---|---|---|---|
|  | Shell portion | Swelling degree | 1.3 times | 1.3 times | 1.3 times | 1.3 times |
|  |  | Monomer | ST 20 | ST 20 | ST 20 | ST 20 |
|  |  | Tg | 100° C. | 100° C. | 100° C. | 100° C. |
|  | Core shell Ratio |  | 10% | 10% | 26% | 2% |
|  | Covering ratio |  | 65% | 65% | 86% | 21% |
|  | MV |  | 0.45 μm | 0.45 μm | 0.05 μm | 0.85 μm |
| Non-conductive fiber | Type |  | KY-100G | BiNFIs | KY-100G | KY-100G |
|  | Fiber diameter |  | 0.07 μm | 0.02 μm | 0.07 μm | 0.07 μm |
|  | Amount |  | 30 parts | 30 parts | 30 parts | 30 parts |
| Binder for adhesive layer | Monomer |  | BA 94 AN 2 MAA 2 NMA 1 AAm 1 | BA 94 AN 2 MAA 2 NMA 1 AAm 1 | BA 94 AN 2 MAA 2 NMA 1 AAm 1 | BA 94 AN 2 MAA 2 NMA 1 AAm 1 |
|  | Amount |  | 6 parts | 6 parts | 6 parts | 6 parts |
| Particles |  |  | — | — | — | — |
| Water-soluble polymer | Type |  | Daicel 1220 | Daicel 1220 | Daicel 1220 | Daicel 1220 |
|  | Amount (parts) |  | 0.5 | 0.5 | 0.5 | 0.5 |
| Thickness |  |  | 2 μm | 2 μm | 2 μm | 2 μm |

TABLE 25

[Constitution of Examples II-25 to II-26 and Comparative Examples II-1 to II-2]

|  |  |  | Ex. II-25 | Ex. II-26 | Comp. Ex. II-1 | Comp. Ex. II-2 |
|---|---|---|---|---|---|---|
| Separator substrate | Material |  | PE | PE | PE | PE |
|  | Form |  | Porous substrate | Porous substrate | Porous substrate | Porous substrate |
| Porous Membrane | Non-conductive particles |  | Al$_2$O$_3$ | PST | Al$_2$O$_3$ | Al$_2$O$_3$ |
|  | Binder | Amount | 6 parts | 6 parts | 6 parts | 6 parts |
|  | Water-soluble polymer | Type | Daicel 1220 | Daicel 1220 | Daicel 1220 | Daicel 1220 |
|  |  | Amount | 1.5 parts | 1.5 parts | 1.5 parts | 1.5 parts |
| Adhesive layer |  |  |  |  |  |  |
| Particulate polymer | Cross-linkable monomer | Type | EDMA | EDMA | PVDF | — |
|  |  | Amount | 1 wt % | 1 wt % |  | 0 wt % |
|  | Core portion | Swelling degree | 9.6 times | 9.6 times |  | 32 times |
|  |  | Monomer | MMA 75 MAA 4 EDMA 1 | MMA 75 MAA 4 EDMA 1 |  | MMA 70 AN 25 MAA 5 |
|  |  | Tg | 70° C. | 70° C. |  |  |
|  | Shell portion | Swelling degree | 1.3 times | 1.3 times |  |  |
|  |  | Monomer | ST 20 | ST 20 |  |  |
|  |  | Tg | 100° C. | 100° C. |  | 110° C. |
|  | Core shell Ratio |  | 10% | 10% |  | — |
|  | Covering ratio |  | 65% | 65% |  | — |
|  | MV |  | 0.45 μm | 0.45 μm |  | 0.45 μm |
| Non-conductive fiber | Type |  | KY-100G | KY-100G |  | KY-100G |
|  | Fiber diameter |  | 0.07 μm | 0.07 μm |  | 0.07 μm |
|  | Amount |  | 30 parts | 30 parts |  | 30 parts |
| Binder for adhesive layer | Monomer |  | BA 94 AN 2 MAA 2 NMA 1 AAm 1 | BA 94 AN 2 MAA 2 NMA 1 AAm 1 |  | BA 94 AN 2 MAA 2 NMA 1 AAm 1 |
|  | Amount |  | 6 parts | 6 parts |  | 6 parts al |

TABLE 25-continued

[Constitution of Examples II-25 to II-26 and Comparative Examples II-1 to II-2]

|  |  | Ex. II-25 | Ex. II-26 | Comp. Ex. II-1 | Comp. Ex. II-2 |
|---|---|---|---|---|---|
| Particles |  | Al$_2$O$_3$ | PST | — | Al$_2$O$_3$ |
| Water-soluble polymer | Type | Daicel 1220 | Daicel 1220 | — | Daicel 1220 |
| | Amount (parts) | 0.5 | 0.5 | — | 0.5 |
| Thickness |  | 2 μm | 2 μm | 2 μm | 2 μm |

TABLE 26

[Constitution of Comparative Examples II-3 to II-6]

|  |  |  | Comp. Ex. II-3 | Comp. Ex. II-4 | Comp. Ex. II-5 | Comp. Ex. II-6 |
|---|---|---|---|---|---|---|
| Separator substrate | Material | | PE | PE | PE | PE |
| | Form | | Porous substrate | Porous substrate | Porous substrate | Porous substrate |
| Porous Membrane | Non-conductive particles | | Al$_2$O$_3$ | Al$_2$O$_3$ | Al$_2$O$_3$ | Al$_2$O$_3$ |
| | Binder | Amount | 6 parts | 6 parts | 6 parts | 6 parts |
| | Water-soluble polymer | Type | Daicel 1220 | Daicel 1220 | Daicel 1220 | Daicel 1220 |
| | | Amount | 1.5 parts | 1.5 parts | 1.5 parts | 1.5 parts |
| Adhesive layer | | | | | | |
| Particulate polymer | Cross-linkable monomer | Type | — | — | — | — |
| | | Amount | 0 wt % | 0 wt % | 0 wt % | 0 wt % |
| | Core portion | Swelling degree | 1.3 times | 3.8 times | 32 times | 10.5 times |
| | | Monomer | PST | 2-EHA 60 ST 15 MAA 5 | MMA 50 AN 25 MAA 5 | MMA 50 2-EHA 25 MAA 5 |
| | | Tg | | −25° C. | 110° C. | 20° C. |
| | Shell portion | Swelling degree | | 1.3 times | 1.3 times | 4.5 times |
| | | Monomer | | ST 20 | ST 20 | AN 20 |
| | | Tg | 100° C. | 100° C. | 100° C. | 105° C. |
| | Core shell Ratio | | — | 10% | 10% | 10% |
| | Covering ratio | | — | 67% | 58% | 62% |
| | MV | | 0.45 μm | 0.45 μm | 0.45 μm | |
| Non-conductive fiber | Type | | KY-100G | KY-100G | KY-100G | KY-100G |
| | Fiber diameter | | 0.07 μm | 0.07 μm | 0.07 μm | 0.07 μm |
| | Amount | | 30 parts | 30 parts | 30 parts | 30 parts |
| Binder for adhesive layer | Monomer | | BA 94 AN 2 MAA 2 NMA 1 AAm 1 | BA 94 AN 2 MAA 2 NMA 1 AAm 1 | BA 94 AN 2 MAA 2 NMA 1 AAm 1 | BA 94 AN 2 MAA 2 NMA 1 AAm 1 |
| | Amount | | 6 parts | 6 parts | 6 parts | 6 parts |
| Particles | | | — | — | — | — |
| Water-soluble polymer | Type | | Daicel 1220 | Daicel 1220 | Daicel 1220 | Daicel 1220 |
| | Amount (parts) | | 0.5 | 0.5 | 0.5 | 0.5 |
| Thickness | | | 2 μm | 2 μm | 2 μm | 2 μm |

TABLE 27

[Results of Examples II-1 to II-4]

|  |  |  | Ex. II-1 | Ex. II-2 | Ex. II-3 | Ex. II-4 |
|---|---|---|---|---|---|---|
| Adhesion property | Peel strength | (N/m) | 5.5 | 4.7 | 6.5 | 5.2 |
| Blocking resistance | | | A | A | A | A |

TABLE 27-continued

[Results of Examples II-1 to II-4]

| | | | Ex. II-1 | Ex. II-2 | Ex. II-3 | Ex. II-4 |
|---|---|---|---|---|---|---|
| Cycle property | ΔC | | 85.50% | 83.80% | 84.40% | 82.00% |
| Cell swelling property | ΔX | | 22% | 23% | 24% | 25% |
| Low-temperature output property | ΔV | (mV) | 355 | 330 | 370 | 330 |
| Cobalt deposition amount | | (%) | 0.24 | 0.25 | 0.26 | 0.25 |

TABLE 28

[Results of Examples II-5 to II-8]

| | | | Ex. II-5 | Ex. II-6 | Ex. II-7 | Ex. II-8 |
|---|---|---|---|---|---|---|
| Adhesion property | Peel strength | (N/m) | 5.7 | 5.6 | 5.1 | 4.8 |
| Blocking resistance | | | A | A | A | B |
| Cycle property | ΔC | | 81.50% | 82.00% | 82.00% | 80.50% |
| Cell swelling property | ΔX | | 25% | 25% | 26% | 27% |
| Low-temperature output property | ΔV | (mV) | 360 | 350 | 320 | 320 |
| Cobalt deposition amount | | (%) | 0.26 | 0.25 | 0.26 | 0.25 |

TABLE 29

[Results of Examples II-9 to II-12]

| | | | Ex. II-9 | Ex. II-10 | Ex. II-11 | Ex. II-12 |
|---|---|---|---|---|---|---|
| Adhesion property | Peel strength | (N/m) | 5.3 | 5.1 | 5.2 | 5.8 |
| Blocking resistance | | | B | B | A | A |
| Cycle property | ΔC | | 83.50% | 83% | 82% | 81% |
| Cell swelling property | ΔX | | 25% | 27% | 25% | 26% |
| Low-temperature output property | ΔV | (mV) | 370 | 385 | 320 | 310 |
| Cobalt deposition amount | | (%) | 0.26 | 0.26 | 0.25 | 0.26 |

TABLE 30

[Results of Examples II-13 to II-16]

| | | | Ex. II-13 | Ex. II-14 | Ex. II-15 | Ex. II-16 |
|---|---|---|---|---|---|---|
| Adhesion property | Peel strength | (N/m) | 6.3 | 6.7 | 8.2 | 3.8 |
| Blocking resistance | | | B | A | A | A |
| Cycle property | ΔC | | 80% | 82% | 83% | 84.70% |
| Cell swelling property | ΔX | | 27% | 23% | 23% | 24% |
| Low-temperature output property | ΔV | (mV) | 300 | 375 | 405 | 340 |
| Cobalt deposition amount | | (%) | 0.27 | 0.28 | 0.28 | 0.29 |

TABLE 31

[Results of Examples II-17 to II-20]

| | | | Ex. II-17 | Ex. II-18 | Ex. II-19 | Ex. II-20 |
|---|---|---|---|---|---|---|
| Adhesion property | Peel strength | (N/m) | 8.5 | 5.1 | 6.2 | 4.2 |
| Blocking resistance | | | A | A | A | A |
| Cycle property | ΔC | | 86.50% | 83.50% | 83.20% | 84.50% |
| Cell swelling property | ΔX | | 20% | 27% | 27% | 23% |
| Low-temperature output property | ΔV | (mV) | 365 | 370 | 320 | 380 |
| Cobalt deposition amount | | (%) | 0.26 | 0.21 | 0.27 | 0.27 |

TABLE 32

[Results of Examples II-21 to II-24]

| | | | Ex. II-21 | Ex. II-22 | Ex. II-23 | Ex. II-24 |
|---|---|---|---|---|---|---|
| Adhesion property | Peel strength | (N/m) | 3.5 | 3.6 | 4.8 | 6.9 |
| Blocking resistance | | | A | A | A | B |
| Cycle property | ΔC | | 84% | 84% | 84.60% | 83.50% |
| Cell swelling property | ΔX | | 18% | 22% | 24% | 23% |
| Low-temperature output property | ΔV | (mV) | 275 | 255 | 380 | 315 |
| Cobalt deposition amount | | (%) | 0.28 | 0.31 | 0.26 | 0.27 |

TABLE 33

[Results of Examples II-25 to II-26 and Comparative Examples II-1 to II-2]

|  |  |  | Ex. II-25 | Ex. II-26 | Comp. Ex. II-1 | Comp. Ex. II-2 |
|---|---|---|---|---|---|---|
| Adhesion property | Peel strength | (N/m) | 4.1 | 4.4 | 0.5 | 0.2 |
| Blocking resistance |  |  | A | A | D | C |
| Cycle property | ΔC |  | 82.50% | 83.50% | 75.20% | 71.80% |
| Cell swelling property | ΔX |  | 26% | 25% | 46% | 55% |
| Low-temperature output property | ΔV | (mV) | 395 | 310 | 650 | 660 |
| Cobalt deposition amount |  | (%) | 0.28 | 0.28 | 0.51 | 0.68 |

TABLE 34

[Results of Comparative Examples II-3 to II-6]

|  |  |  | Comp. Ex. II-3 | Comp. Ex. II-4 | Comp. Ex. II-5 | Comp. Ex. II-6 |
|---|---|---|---|---|---|---|
| Adhesion property | Peel strength | (N/m) | 0.1 | 0.7 | 0.7 | 0.3 |
| Blocking resistance |  |  | C | C | C | C |
| Cycle property | ΔC |  | 71.50% | 71.80% | 72% | 73% |
| Cell swelling property | ΔX |  | 50% | 52% | 48% | 48% |
| Low-temperature output property | ΔV | (mV) | 610 | 650 | 610 | 590 |
| Cobalt deposition amount |  | (%) | 0.72 | 0.67 | 0.71 | 0.74 |

Discussion

As can be seen from Examples and Comparative Examples of Group 2 described above, the adhesive of the present invention has excellent adhesion property in the electrolytic solution. Further, when the adhesive contains the non-conductive fibers, the swelling of the adhesive layer formed using the adhesive in the electrolytic solution can be suppressed. By means of the adhesive of the present invention, a lithium ion secondary battery having excellent low-temperature output property can be achieved.

REFERENCE SIGNS LIST

100 First particulate polymer
110 Core portion
110S Outer surface of core portion
120 Shell portion

The invention claimed is:

1. An adhesive for a lithium ion secondary battery, for bonding members for constituting a lithium ion secondary battery,
the adhesive comprising a particulate polymer, wherein
the particulate polymer has a core-shell structure including a core portion and a shell portion that partially covers an outer surface of the core portion,
the core portion is formed from a polymer having a swelling degree in an electrolytic solution of 5 times or more and 30 times or less,
the shell portion is formed from a polymer having a swelling degree in the electrolytic solution of more than 1 time and 4 times or less,
the amount of the particulate polymer is 50% by weight or more and 99.9% by weight or less with respect to solid content of the adhesive,
each of the swelling degrees represents a ratio (W1/W0) of W1 with respect to W0,
W0 represents a weight of a 1-cm square piece of a film having a thickness of 0.5 mm that is produced from the polymer of the core portion or the polymer of the shell portion,
W1 represents a weight of the 1-cm square piece that has been immersed in the electrolytic solution at 60° C. for 72 hours, and
the electrolytic solution consists of a mixed solvent of ethylene carbonate, diethyl carbonate and vinylene carbonate (volume mixing ratio of ethylene carbonate/diethyl carbonate/vinylene carbonate=68.5/30/1.5) and 1 mol/L of $LiPF_6$.

2. The adhesive for a lithium ion secondary battery according to claim 1, wherein
the polymer of the core portion has a glass transition temperature of 0° C. or higher and 150° C. or lower, and
the polymer of the shell portion has a glass transition temperature of 50° C. or higher and 200° C. or lower.

3. The adhesive for a lithium ion secondary battery according to claim 1, wherein the shell portion includes particles of the polymer having a swelling degree in the electrolytic solution of more than 1 time and 4 times or less.

4. The adhesive for a lithium ion secondary battery according to claim 1, further comprising non-conductive fibers, wherein
the non-conductive fibers have a fiber diameter of 0.01 µm or more and 1 µm or less.

5. The adhesive for a lithium ion secondary battery according to claim 1, wherein the adhesive is for bonding a separator and an electrode together.

6. A separator for a lithium ion secondary battery, comprising a separator substrate and an adhesive layer, wherein
the adhesive layer includes a particulate polymer,
the particulate polymer has a core-shell structure including a core portion and a shell portion that partially covers an outer surface of the core portion,
the core portion is formed from a polymer having a swelling degree in an electrolytic solution of 5 times or more and 30 times or less,
the shell portion is formed from a polymer having a swelling degree in the electrolytic solution of more than 1 time and 4 times or less,
the amount of the particulate polymer is 50% by weight or more and 99.9% by weight or less with respect to the adhesive layer,
each of the swelling degrees represents a ratio (W1/W0) of W1 with respect to W0,
W0 represents a weight of a 1-cm square piece of a film having a thickness of 0.5 mm that is produced from the polymer of the core portion or the polymer of the shell portion,
W1 represents a weight of the 1-cm square piece that has been immersed in the electrolytic solution at 60° C. for 72 hours, and the electrolytic solution consists of a mixed solvent of ethylene carbonate, diethyl carbonate and vinylene carbonate (volume mixing ratio of ethylene carbonate/diethyl carbonate/vinylene carbonate=68.5/30/1.5) and 1 mol/L of $LiPF_6$.

7. The separator for a lithium ion secondary battery according to claim 6, further comprising a porous membrane provided on a surface of the separator substrate, wherein
the porous membrane has a surface on which the adhesive layer is provided.

8. The separator for a lithium ion secondary battery according to claim 6, wherein
the adhesive layer further includes non-conductive fibers, and
the non-conductive fibers have a fiber diameter of 0.01 μm or more and 1 μm or less.

9. A lithium ion secondary battery comprising a positive electrode, a negative electrode, an electrolytic solution, and a separator, wherein
the separator is the separator for a lithium ion secondary battery according to claim 6.

* * * * *